United States Patent
Hamada et al.

(10) Patent No.: US 8,111,416 B2
(45) Date of Patent: Feb. 7, 2012

(54) IMAGE PROCESSING APPARATUS, IMAGE PROCESSING METHOD, AND IMAGE PROCESSING PROGRAM FOR PROCESSING A PREDETERMINED CODE IMAGE

(75) Inventors: Yuuta Hamada, Tokyo (JP); Naoki Kozuka, Kanagawa (JP); Tadashi Honda, Kanagawa (JP); Hirofumi Horikawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 966 days.

(21) Appl. No.: 12/046,868

(22) Filed: Mar. 12, 2008

(65) Prior Publication Data

US 2008/0225334 A1 Sep. 18, 2008

(30) Foreign Application Priority Data

Mar. 16, 2007 (JP) .................. 2007-067970

(51) Int. Cl.
*G06F 3/12* (2006.01)
(52) U.S. Cl. ............ 358/1.15; 358/1.18; 358/3.23; 358/537; 358/538; 358/539
(58) Field of Classification Search .............. 358/1.18, 358/3.23, 537–539
See application file for complete search history.

(56) References Cited

U.S. PATENT DOCUMENTS

| | | | |
|---|---|---|---|
| 6,634,559 B2 | 10/2003 | Shioda et al. | |
| 6,866,404 B2 | 3/2005 | Yamauchi et al. | |
| 6,948,654 B2 | 9/2005 | Shioda et al. | |
| 7,077,546 B2 | 7/2006 | Yamauchi et al. | |
| 7,215,815 B2 | 5/2007 | Honda | |
| 7,225,227 B2 | 5/2007 | Omura et al. | |
| 2005/0219616 A1* | 10/2005 | Furuta et al. | 358/1.18 |
| 2007/0067370 A1 | 3/2007 | Honda et al. | |
| 2007/0076984 A1 | 4/2007 | Takahashi et al. | |
| 2007/0153303 A1* | 7/2007 | Abe et al. | 358/1.8 |
| 2007/0195070 A1 | 8/2007 | Takahashi et al. | |
| 2007/0195370 A1 | 8/2007 | Suga et al. | |
| 2007/0198638 A1 | 8/2007 | Omura et al. | |

FOREIGN PATENT DOCUMENTS

| | | |
|---|---|---|
| JP | 2005-11226 | 1/2005 |
| JP | 2005-151127 | 6/2005 |
| JP | 2007-87322 | 4/2007 |
| JP | 2007-102545 | 4/2007 |

* cited by examiner

*Primary Examiner* — Benny Tieu
*Assistant Examiner* — Marcellus Augustin
(74) *Attorney, Agent, or Firm* — Oblon, Spivak, McClelland, Maier & Neustadt, L.L.P.

(57) ABSTRACT

In printing an electronic document on a paper, an MFP prints a code image created by encoding a paper ID including a local ID issued to the paper and stores paper information with the paper ID. The MFP determines a type of data format, creates a paper ID in the data format, and prints a code image created by encoding the paper ID. In copying a printed paper, the MFP decodes the code image printed on the paper to acquire the paper ID and retrieves paper information associated with the paper ID according to the data format. The MFP specifies the electronic document as a print source from retrieved paper information and performs printing using the electronic document.

17 Claims, 50 Drawing Sheets

FIG. 4

```
                                                    201
       ┌─────────────────────────────────────────────┐
       │  ┌─ PI1 ──────────────────────────────────┐ │
       │  │ INTERFACE UNIT                         │ │
       │  │  ┌──────────┐ ┌────────┐ ┌────────┐ ┌────────┐ │
       │  │  │  PAPER   │ │ PAPER  │ │ PAPER  │ │ PAPER  │ │
       │  │  │REGISTRATION│ │CHANGE│ │DELETION│ │ACQUISITION│ │
       │  │  └──────────┘ └────────┘ └────────┘ └────────┘ │
       │  └────────────────────────────────────────┘ │
       │                                        PI2  │
       │  ┌──────────────────────────────────────┐ │
       │  │PROCESSING                            │ │
       │  │FUNCTION UNIT  PI20  PI21  PI22  PI23 │ │
       │  │  ┌────────┐ ┌────────┐ ┌────────┐ ┌────────┐ │
       │  │  │ PAPER- │ │ PAPER- │ │ PAPER- │ │ PAPER- │ │
       │  │  │REGISTRATION│CHANGE│DELETION│ACQUISITION│
       │  │  │PROCESSING│PROCESSING│PROCESSING│PROCESSING│
       │  │  │ SECTION │ SECTION │ SECTION │ SECTION │ │
       │  │  └────────┘ └────────┘ └────────┘ └────────┘ │
       │  └──────────────────────────────────────┘ │
       └─────────────────────────────────────────────┘
                                301A ── PAPER-INFORMATION
                                         TABLE
                    301 ── PAPER-
                           INFORMATION DB
```

FIG. 5

| NAME | EXPLA-NATION | UUID OF PIDS | LOCAL ID | REGISTRATION DATE AND TIME | UPDATE DATE AND TIME | LINK TO ORIGINAL DOCUMENT | PRINT CONDITION |
|---|---|---|---|---|---|---|---|
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |

301A

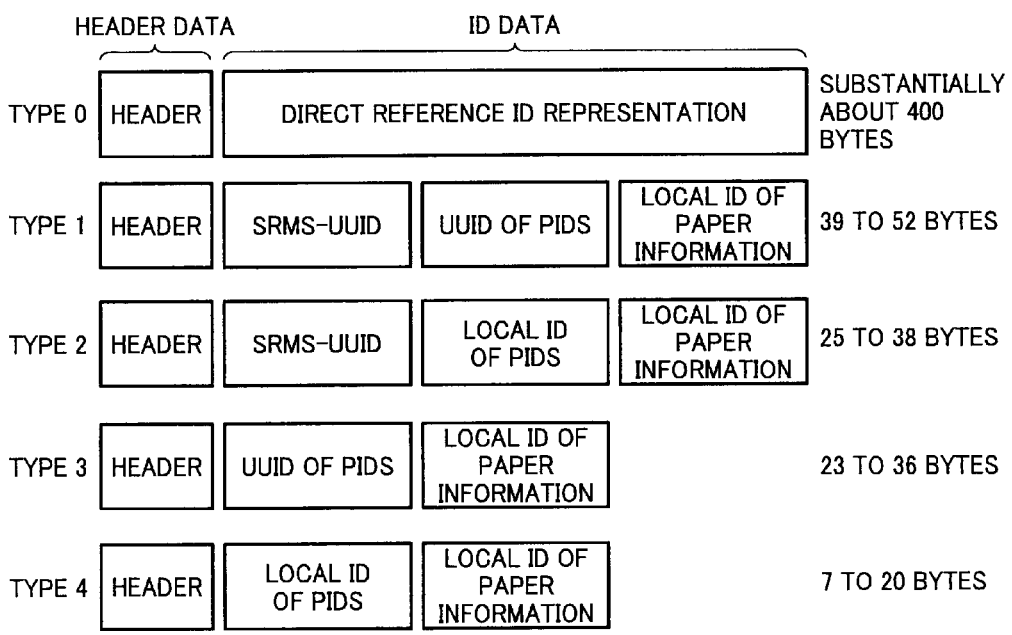

FIG. 9

TYPE 0

| INFORMATION TYPE | ELEMENT NAME | NUMBER OF BITS | REMARK |
|---|---|---|---|
| HEADER | DATA FORMAT IDENTIFICATION FLAG | 5 | IDENTIFY AT PROBABILITY OF 1/32 |
| | DATA FORMAT VERSION | 3 | MAXIMUM 8 VERSIONS |
| | DATA FORMAT TYPE | 4 | MAXIMUM 16 TYPES |
| | PRIORITY AMONG CARRIERS DURING DECODING | 3 | |
| | PAPER ID IDENTIFICATION FLAG | 1 | |
| | ID DATA LENGTH | 13 | UP TO 1024 BYTES |
| ID | DIRECT REFERENCE ID REPRESENTATION | 8 TO 8192 | CAN BE STORED UP TO 1024 BYTES |

HEADER LENGTH 32 (REMAINDER OF 3 BITS IS FILLED WITH 0)
ID LENGTH 8 TO 8192
TOTAL DATA LENGTH 40 TO 8224

FIG. 10

TYPE 1

| INFORMATION TYPE | ELEMENT NAME | NUMBER OF BITS | REMARK |
|---|---|---|---|
| HEADER | DATA FORMAT IDENTIFICATION FLAG | 5 | IDENTIFY AT PROBABILITY OF 1/32 |
| | DATA FORMAT VERSION | 3 | MAXIMUM 8 VERSIONS |
| | DATA FORMAT TYPE | 4 | MAXIMUM 16 TYPES |
| | PRIORITY AMONG CARRIERS DURING DECODING | 3 | |
| | PAPER ID IDENTIFICATION FLAG | 1 | |
| | ID DATA LENGTH | 9 | UP TO 512 BITS |
| ID | SRMS-UUID | 128 | |
| | UUID OF PIDS | 128 | |
| | LOCAL ID OF PAPER INFORMATION | 24 TO 128 | |

HEADER LENGTH 32 (REMAINDER OF 7 BITS IS FILLED WITH 0)
ID LENGTH 280 TO 384
TOTAL DATA LENGTH 312 TO 416

FIG. 11

TYPE 2

| INFORMATION TYPE | ELEMENT NAME | NUMBER OF BITS | REMARK |
|---|---|---|---|
| HEADER | DATA FORMAT IDENTIFICATION FLAG | 5 | IDENTIFY AT PROBABILITY OF 1/32 |
| | DATA FORMAT VERSION | 3 | MAXIMUM 8 VERSIONS |
| | DATA FORMAT TYPE | 4 | MAXIMUM 16 TYPES |
| | PRIORITY AMONG CARRIERS DURING DECODING | 3 | |
| | PAPER ID IDENTIFICATION FLAG | 1 | |
| | ID DATA LENGTH | 9 | UP TO 512 BITS |
| ID | SRMS-UUID | 128 | |
| | LOCAL ID OF PIDS | 16 | |
| | LOCAL ID OF PAPER INFORMATION | 24 TO 128 | |

HEADER LENGTH 32 (REMAINDER OF 7 BITS IS FILLED WITH 0)
ID LENGTH 168 TO 272
TOTAL DATA LENGTH 200 TO 304

FIG. 12

TYPE 3

| INFORMATION TYPE | ELEMENT NAME | NUMBER OF BITS | REMARK |
|---|---|---|---|
| HEADER | DATA FORMAT IDENTIFICATION FLAG | 5 | IDENTIFY AT PROBABILITY OF 1/32 |
| | DATA FORMAT VERSION | 3 | MAXIMUM 8 VERSIONS |
| | DATA FORMAT TYPE | 4 | MAXIMUM 16 TYPES |
| | PRIORITY AMONG CARRIERS DURING DECODING | 3 | |
| | PAPER ID IDENTIFICATION FLAG | 1 | |
| | ID DATA LENGTH | 9 | UP TO 512 BITS |
| ID | UUID OF PIDS | 128 | |
| | LOCAL ID OF PAPER INFORMATION | 24 TO 128 | |

HEADER LENGTH 32 (REMAINDER OF 7 BITS IS FILLED WITH 0)
ID LENGTH 152 TO 256
TOTAL DATA LENGTH 184 TO 288

FIG. 13

TYPE 4

| INFORMATION TYPE | ELEMENT NAME | NUMBER OF BITS | REMARK |
|---|---|---|---|
| HEADER | DATA FORMAT IDENTIFICATION FLAG | 5 | IDENTIFY AT PROBABILITY OF 1/32 |
| | DATA FORMAT VERSION | 3 | MAXIMUM 8 VERSIONS |
| | DATA FORMAT TYPE | 4 | MAXIMUM 16 TYPES |
| | PRIORITY AMONG CARRIERS DURING DECODING | 3 | |
| | PAPER ID IDENTIFICATION FLAG | 1 | |
| | ID DATA LENGTH | 8 | UP TO 256 BITS |
| ID | LOCAL ID OF PIDS | 16 | |
| | LOCAL ID OF PAPER INFORMATION | 24 TO 128 | |

HEADER LENGTH 24
ID LENGTH 40 TO 144
TOTAL DATA LENGTH 64 TO 168

FIG. 14

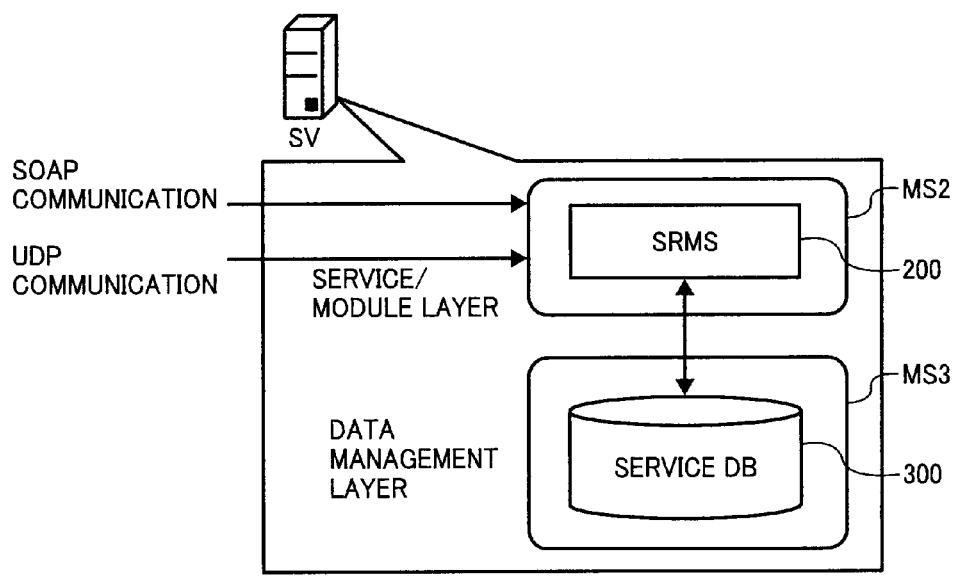

FIG. 16

| NAME | EXPLA-NATION | NAME SPACE | VERSION | URI | UUID OF SERVICE | LOCAL ID | MASTER ID | REGIS-TRATION DATE AND TIME | UPDATE DATE AND TIME |
|---|---|---|---|---|---|---|---|---|---|
| | | | | | | | | | |
| | | | | | | | | | |
| | | | | | | | | | |
| | | | | | | | | | |
| | | | | | | | | | |

| UUID |
|---|
| S001 |
| S004 |

FIG. 24

| NAME | EXPLA-NATION | NAME SPACE | VERSION | URI | UUID OF SERVICE | LOCAL ID | MASTER UUID | REGISTRATION DATE AND TIME | UPDATE DATE AND TIME |
|---|---|---|---|---|---|---|---|---|---|
| SRMS 200_1 | EXPLA-NATION | jp.co.xxxxx.srms | 1.00 | http://192.168.0.31/srms/ | S001 | | | 2006/8/3 9:00 | 2006/8/3 9:00 |
| PIDS 201_1 | EXPLA-NATION | jp.co.xxxxx.pids | 1.10 | http://192.168.0.11/pids/ | P001 | 1 | S001 | 2006/8/3 9:00 | 2006/8/3 9:00 |
| EIDS 202_1 | EXPLA-NATION | jp.co.xxxxx.eids | 1.20 | http://192.168.0.11/eids/ | E001 | 2 | S001 | 2006/8/3 9:00 | 2006/8/3 9:00 |
| PIDS 201_2 | EXPLA-NATION | jp.co.xxxxx.pids | 1.10 | http://192.168.0.12/pids/ | P002 | 3 | S001 | 2006/8/3 9:00 | 2006/8/3 9:00 |
| EIDS 202_2 | EXPLA-NATION | jp.co.xxxxx.eids | 1.20 | http://192.168.0.12/eids/ | E002 | 4 | S001 | 2006/8/3 9:00 | 2006/8/3 9:00 |
| SRMS 200_2 | EXPLA-NATION | jp.co.xxxxx.srms | 2.00 | http://192.168.1.32/srms/ | S002 | 5 | S001 | 2006/8/3 9:00 | 2006/8/4 9:00 |
| PIDS 201_3 | EXPLA-NATION | jp.co.xxxxx.pids | 2.10 | http://192.168.1.13/pids/ | P003 | 1 | S002 | 2006/8/4 9:00 | 2006/8/4 9:00 |
| EIDS 202_3 | EXPLA-NATION | jp.co.xxxxx.eids | 2.20 | http://192.168.1.13/eids/ | E003 | 2 | S002 | 2006/8/4 9:00 | 2006/8/4 9:00 |
| PIDS 201_4 | EXPLA-NATION | jp.co.xxxxx.pids | 2.10 | http://192.168.1.14/pids/ | P004 | 3 | S002 | 2006/8/4 9:00 | 2006/8/4 9:00 |
| EIDS 202_4 | EXPLA-NATION | jp.co.xxxxx.eids | 2.20 | http://192.168.1.14/eids/ | E004 | 4 | S002 | 2006/8/4 9:00 | 2006/8/4 9:00 |
| | | | | | | 5 | S002 | 2006/8/4 9:00 | 2006/8/4 9:00 |

| NAME | EXPLANATION | NAME SPACE | VER-SION | URI | UUID OF SERVICE | LOCAL ID | MASTER UUID | REGISTRATION DATE AND TIME | UPDATE DATE AND TIME |
|---|---|---|---|---|---|---|---|---|---|
| SRMS 200_2 | EXPLANATION | jp.co.xxxxx.srms | 2.00 | http://192.168.1.32/srms/ | S002 |  | S002 | 2006/8/4 9:00 | 2006/8/4 9:00 |
| PIDS 201_3 | EXPLANATION | jp.co.xxxxx.pids | 2.10 | http://192.168.1.13/pids/ | P003 | 2 | S002 | 2006/8/4 9:00 | 2006/8/4 9:00 |
| EIDS 202_3 | EXPLANATION | jp.co.xxxxx.eids | 2.20 | http://192.168.1.13/eids/ | E003 | 3 | S002 | 2006/8/4 9:00 | 2006/8/4 9:00 |
| PIDS 201_4 | EXPLANATION | jp.co.xxxxx.pids | 2.10 | http://192.168.1.14/pids/ | P004 | 4 | S002 | 2006/8/4 9:00 | 2006/8/4 9:00 |
| EIDS 202_4 | EXPLANATION | jp.co.xxxxx.eids | 2.20 | http://192.168.1.14/eids/ | E004 | 5 | S002 | 2006/8/4 9:00 | 2006/8/4 9:00 |
| SRMS 200_1 | EXPLANATION | jp.co.xxxxx.srms | 1.00 | http://192.168.0.31/srms/ | S001 | 1 | S001 | 2006/8/3 9:00 | 2006/8/3 9:00 |
| PIDS 201_1 | EXPLANATION | jp.co.xxxxx.pids | 1.10 | http://192.168.0.11/pids/ | P001 | 2 | S001 | 2006/8/3 9:00 | 2006/8/3 9:00 |
| EIDS 202_1 | EXPLANATION | jp.co.xxxxx.eids | 1.20 | http://192.168.0.11/eids/ | E001 | 3 | S001 | 2006/8/3 9:00 | 2006/8/3 9:00 |
| PIDS 201_2 | EXPLANATION | jp.co.xxxxx.pids | 1.10 | http://192.168.0.12/pids/ | P002 | 4 | S001 | 2006/8/3 9:00 | 2006/8/3 9:00 |
| EIDS 202_2 | EXPLANATION | jp.co.xxxxx.eids | 1.20 | http://192.168.0.12/eids/ | E002 | 5 | S001 | 2006/8/3 9:00 | 2006/8/3 9:00 |
| SRMS 200_4 | EXPLANATION | jp.co.xxxxx.srms | 4.00 | http://192.168.0.34/srms/ | S004 | 1 | S004 | 2006/8/6 9:00 | 2006/8/6 9:00 |
| PIDS 201_7 | EXPLANATION | jp.co.xxxxx.pids | 4.10 | http://192.168.0.17/pids/ | P007 | 2 | S004 | 2006/8/6 9:00 | 2006/8/6 9:00 |
| EIDS 202_7 | EXPLANATION | jp.co.xxxxx.eids | 4.20 | http://192.168.0.17/eids/ | E007 | 3 | S004 | 2006/8/6 9:00 | 2006/8/6 9:00 |
| PIDS 201_8 | EXPLANATION | jp.co.xxxxx.pids | 4.10 | http://192.168.0.18/pids/ | P008 | 4 | S004 | 2006/8/6 9:00 | 2006/8/6 9:00 |
| EIDS 202_8 | EXPLANATION | jp.co.xxxxx.eids | 4.20 | http://192.168.0.18/eids/ | E008 | 5 | S004 | 2006/8/6 9:00 | 2006/8/6 9:00 |

| NAME | EXPLA-NATION | NAME SPACE | VERSION | URI | UUID OF SERVICE | LOCAL ID | MASTER UUID | REGISTRATION DATE AND TIME | UPDATE DATE AND TIME |
|---|---|---|---|---|---|---|---|---|---|
| SRMS 200_3 | EXPLA-NATION | jp.co.xxxxx.srms | 3.00 | http://192.168.2.33/srms/ | S003 | 1 | S003 | 2006/8/5 9:00 | 2006/8/5 9:00 |
| PIDS 201_5 | EXPLA-NATION | jp.co.xxxxx.pids | 3.10 | http://192.168.2.15/pids/ | P005 | 2 | S003 | 2006/8/5 9:00 | 2006/8/5 9:00 |
| EIDS 202_5 | EXPLA-NATION | jp.co.xxxxx.eids | 3.20 | http://192.168.2.15/eids/ | E005 | 3 | S003 | 2006/8/5 9:00 | 2006/8/5 9:00 |
| PIDS 201_6 | EXPLA-NATION | jp.co.xxxxx.pids | 3.10 | http://192.168.2.16/pids/ | P006 | 4 | S003 | 2006/8/5 9:00 | 2006/8/5 9:00 |
| EIDS 202_6 | EXPLA-NATION | jp.co.xxxxx.eids | 3.20 | http://192.168.2.16/eids/ | E006 | 5 | S003 | 2006/8/5 9:00 | 2006/8/5 9:00 |
| SRMS 200_4 | EXPLA-NATION | jp.co.xxxxx.srms | 4.00 | http://192.168.0.34/srms/ | S004 | 1 | S004 | 2006/8/6 9:00 | 2006/8/6 9:00 |
| PIDS 201_7 | EXPLA-NATION | jp.co.xxxxx.pids | 4.10 | http://192.168.0.17/pids/ | P007 | 2 | S004 | 2006/8/6 9:00 | 2006/8/6 9:00 |
| EIDS 202_7 | EXPLA-NATION | jp.co.xxxxx.eids | 4.20 | http://192.168.0.17/eids/ | E007 | 3 | S004 | 2006/8/6 9:00 | 2006/8/6 9:00 |
| PIDS 201_8 | EXPLA-NATION | jp.co.xxxxx.pids | 4.10 | http://192.168.0.18/pids/ | P008 | 4 | S004 | 2006/8/6 9:00 | 2006/8/6 9:00 |
| EIDS 202_8 | EXPLA-NATION | jp.co.xxxxx.eids | 4.20 | http://192.168.0.18/eids/ | E008 | 5 | S004 | 2006/8/6 9:00 | 2006/8/6 9:00 |

| NAME | EXPLANATION | NAME SPACE | VER-SION | URI | UUID OF SERVICE | LOCAL ID | MASTER UUID | REGISTRATION DATE AND TIME | UPDATE DATE AND TIME |
|---|---|---|---|---|---|---|---|---|---|
| SRMS 200_4 | EXPLANATION | jp.co.xxxxx.srms | 4.00 | http://192.168.0.34/srms/ | S004 | 1 | S004 | 2006/8/6 9:00 | 2006/8/6 9:00 |
| PIDS 201_7 | EXPLANATION | jp.co.xxxxx.pids | 4.10 | http://192.168.0.17/pids/ | P007 | 2 | S004 | 2006/8/6 9:00 | 2006/8/6 9:00 |
| EIDS 202_7 | EXPLANATION | jp.co.xxxxx.eids | 4.20 | http://192.168.0.17/eids/ | E007 | 3 | S004 | 2006/8/6 9:00 | 2006/8/6 9:00 |
| PIDS 201_8 | EXPLANATION | jp.co.xxxxx.pids | 4.10 | http://192.168.0.18/pids/ | P008 | 4 | S004 | 2006/8/6 9:00 | 2006/8/6 9:00 |
| EIDS 202_8 | EXPLANATION | jp.co.xxxxx.eids | 4.20 | http://192.168.0.18/eids/ | E008 | 5 | S004 | 2006/8/6 9:00 | 2006/8/6 9:00 |
| SRMS 202_2 | EXPLANATION | jp.co.xxxxx.srms | 2.00 | http://192.168.1.32/srms/ | S002 | 1 | S002 | 2006/8/4 9:00 | 2006/8/4 9:00 |
| PIDS 201_3 | EXPLANATION | jp.co.xxxxx.pids | 2.10 | http://192.168.1.13/pids/ | P003 | 2 | S002 | 2006/8/4 9:00 | 2006/8/4 9:00 |
| EIDS 202_3 | EXPLANATION | jp.co.xxxxx.eids | 2.20 | http://192.168.1.13/eids/ | E003 | 3 | S002 | 2006/8/4 9:00 | 2006/8/4 9:00 |
| PIDS 201_4 | EXPLANATION | jp.co.xxxxx.pids | 2.10 | http://192.168.1.14/pids/ | P004 | 4 | S002 | 2006/8/4 9:00 | 2006/8/4 9:00 |
| EIDS 202_4 | EXPLANATION | jp.co.xxxxx.eids | 2.20 | http://192.168.1.14/eids/ | E004 | 5 | S002 | 2006/8/4 9:00 | 2006/8/4 9:00 |
| SRMS 200_3 | EXPLANATION | jp.co.xxxxx.srms | 3.00 | http://192.168.2.33/srms/ | S003 | 1 | S003 | 2006/8/5 9:00 | 2006/8/5 9:00 |
| PIDS 201_5 | EXPLANATION | jp.co.xxxxx.pids | 3.10 | http://192.168.2.15/pids/ | P005 | 2 | S003 | 2006/8/5 9:00 | 2006/8/5 9:00 |
| EIDS 202_5 | EXPLANATION | jp.co.xxxxx.eids | 3.20 | http://192.168.2.15/eids/ | E005 | 3 | S003 | 2006/8/5 9:00 | 2006/8/5 9:00 |
| PIDS 201_6 | EXPLANATION | jp.co.xxxxx.pids | 3.10 | http://192.168.2.16/pids/ | P006 | 4 | S003 | 2006/8/5 9:00 | 2006/8/5 9:00 |
| EIDS 202_6 | EXPLANATION | jp.co.xxxxx.eids | 3.20 | http://192.168.2.16/eids/ | E006 | 5 | S003 | 2006/8/5 9:00 | 2006/8/5 9:00 |

FIG. 54

| NAME | EXPLANATION | UUID | LOCAL ID | REGISTRATION DATE AND TIME | UPDATE DATE AND TIME | LINK TO ORIGINAL | PRINT CONDITION |
|---|---|---|---|---|---|---|---|
| WORD DOCUMENT XXX | EXPLANATION | P001 | 1 | 2006/8/9 9:00 | 2006/8/9 9:00 | E001-1 | ...... |
| WORD DOCUMENT XXX | EXPLANATION | P001 | 2 | 2006/8/9 9:00 | 2006/8/9 9:00 | E001-1 | ...... |
| WORD DOCUMENT XXX | EXPLANATION | P001 | 3 | 2006/8/9 9:00 | 2006/8/9 9:00 | E001-1 | ...... |

| NAME | EXPLANATION | UUID | LOCAL ID | REGISTRATION DATE AND TIME | UPDATE DATE AND TIME | LINK TO REPOSITORY |
|---|---|---|---|---|---|---|
| WORD DOCUMENT XXX | EXPLANATION | E001 | 1 | 2006/8/9 9:00 | 2006/8/9 9:00 | ...... |

| NAME | EXPLANATION | UUID | LOCAL ID | REGISTRATION DATE AND TIME | UPDATE DATE AND TIME | LINK TO ORIGINAL DOCUMENT | PRINT CONDITION |
|---|---|---|---|---|---|---|---|
| WORD DOCUMENT YYY | EXPLANATION | P003 | 1 | 2006/8/10 9:00 | 2006/8/10 9:00 | E003-1 | ........ |
| WORD DOCUMENT YYY | EXPLANATION | P003 | 2 | 2006/8/10 9:00 | 2006/8/10 9:00 | E003-1 | ........ |
| WORD DOCUMENT YYY | EXPLANATION | P003 | 3 | 2006/8/10 9:00 | 2006/8/10 9:00 | E003-1 | ........ |

| NAME | EXPLANATION | UUID | LOCAL ID | REGISTRATION DATE AND TIME | UPDATE DATE AND TIME | LINK TO REPOSITORY |
|---|---|---|---|---|---|---|
| WORD DOCUMENT YYY | EXPLANATION | E003 | 1 | 2006/8/10 9:00 | 2006/8/10 9:00 | ........ |

| NAME | EXPLANATION | UUID | LOCAL ID | REGISTRATION DATE AND TIME | UPDATE DATE AND TIME | LINK TO ORIGINAL DOCUMENT | PRINT CONDITION |
|---|---|---|---|---|---|---|---|
| WORD DOCUMENT XXX | EXPLANATION | P001 | 1 | 2006/8/9 9:00 | 2006/8/9 9:00 | E001-1 | ........ |
| WORD DOCUMENT XXX | EXPLANATION | P001 | 2 | 2006/8/9 9:00 | 2006/8/9 9:00 | E001-1 | ........ |
| WORD DOCUMENT XXX | EXPLANATION | P001 | 3 | 2006/8/9 9:00 | 2006/8/9 9:00 | E001-1 | ........ |
| PDF DOCUMENT XXX | EXPLANATION | P001 | 4 | 2006/8/11 9:00 | 2006/8/11 9:00 | E001-2 | ........ |
| PDF DOCUMENT XXX | EXPLANATION | P001 | 5 | 2006/8/11 9:00 | 2006/8/11 9:00 | E001-2 | ........ |

| NAME | EXPLANATION | UUID | LOCAL ID | REGISTRATION DATE AND TIME | UPDATE DATE AND TIME | LINK TO REPOSITORY |
|---|---|---|---|---|---|---|
| WORD DOCUMENT XXX | EXPLANATION | E001 | 1 | 2006/8/9 9:00 | 2006/8/9 9:00 | ........ |
| PDF DOCUMENT XXX | EXPLANATION | E001 | 2 | 2006/8/11 9:00 | 2006/8/11 9:00 | ........ |

302A-2

IMAGE PROCESSING APPARATUS, IMAGE PROCESSING METHOD, AND IMAGE PROCESSING PROGRAM FOR PROCESSING A PREDETERMINED CODE IMAGE

CROSS-REFERENCE TO RELATED APPLICATIONS

The present application claims priority to and incorporates by reference the entire contents of Japanese priority document 2007-067970 filed in Japan on Mar. 16, 2007.

BACKGROUND OF THE INVENTION

1. Field of the Invention

The present invention relates to a technology for acquiring an electronic document through a network and printing an image using the acquired electronic document.

2. Description of the Related Art

In the past, there is a technology for scanning, in copying paper having point information indicating an address and the like of a server printed thereon as a barcode, the paper as an image (a scan image) with a scanner and scanning the barcode printed on the paper, accessing the server corresponding to the address indicated by the point information obtained by decoding the barcode, and acquiring an electronic document printed on the paper as an image (see, for example, Japanese Patent Application Laid-Open No. 2005-151127). The acquisition of the electronic document is performed by extracting a characteristic of the scanned scan image and retrieving an electronic document stored in the server using the extracted characteristic. For example, due to a change in a location or the like of the server on a network, it may be impossible to access the server corresponding to the address indicated by the point information. In such a case, the electronic document is retrieved out of electronic documents stored in all servers connected to an image processing system using the characteristic extracted from the scan image.

In the technology disclosed in Japanese Patent Application Laid-open No. 2005-151127, even if the server in which the electronic document printed on the paper as the image is stored can be uniquely specified, the electronic document is retrieved using the characteristic of the scan image. Therefore, it is likely that it takes a lot of time to retrieve the electronic document. A plurality of electronic documents similar to the characteristic extracted from the processing object electronic document may be obtained as a retrieval result.

SUMMARY OF THE INVENTION

It is an object of the present invention to at least partially solve the problems in the conventional technology.

According to an aspect of the present invention, there is provided an image processing apparatus including a reading unit that acquires an image read by scanning a first paper medium with a scanning unit; a code acquiring unit that extracts a predetermined code image from the image acquired by the reading unit, decodes the code image, and acquires paper identification information for identifying the first paper medium; a communication unit that performs data communication with a server apparatus that includes a service-information storing unit and a service-information control unit, the service-information storing unit storing first service information for specifying an electronic-information control unit that manages electronic information for specifying a print object electronic document stored in an electronic-document storing unit, the electronic information being stored in an electronic-information storing unit in association with electronic identification information for identifying the electronic information, and second service information for specifying a paper-information control unit that manages paper information including print source information for specifying a print source of the first paper medium and stored in a paper-information storing unit in association with paper identification information for identifying a print object paper medium, the service-information control unit managing the first service information and the second service information; a paper-information acquiring unit that judges, based on the paper identification information acquired by the code acquiring unit, types of the paper identification information, acquires, according to the types, the second service information for specifying the paper-information control unit that manages the paper information stored in the paper-information storing unit in association with the paper identification information, accesses the paper-information control unit using the second service information, and acquires the paper information from the paper-information control unit; an electronic-document acquiring unit that acquires, using the print source information included in the paper information acquired by the paper-information acquiring unit, the first service information for specifying the electronic-information control unit that manages the electronic information for specifying the print object electronic document from the service-information control unit of the server apparatus via the communication unit, accesses the electronic-information control unit using the first service information, acquires the electronic information from the electronic-information control unit, and acquires the electronic document specified by the electronic information; and a printing unit that forms a print image using the electronic document acquired by the electronic-document acquiring unit and prints the print image on a second paper medium.

Furthermore, according to another aspect of the present invention, there is provided an image processing method including reading including acquiring an image read by scanning a first paper medium with a scanning unit; code acquiring including extracting a predetermined code image from the image acquired at the reading, decoding the code image, and acquiring paper identification information for identifying the first paper medium; performing data communication using a communication unit with a server apparatus that includes a service-information storing unit and a service-information control unit, the service-information storing unit storing first service information for specifying an electronic-information control unit that manages electronic information for specifying a print object electronic document stored in an electronic-document storing unit, the electronic information being stored in an electronic-information storing unit in association with electronic identification information for identifying the electronic information, and second service information for specifying a paper-information control unit that manages paper information including print source information for specifying a print source of the first paper medium and stored in a paper-information storing unit in association with paper identification information for identifying a print object paper medium, the service-information control unit managing the first service information and the second service information; paper-information acquiring including judging, based on the paper identification information acquired at the code acquiring, types of the paper identification information, acquiring, according to the types, the second service information for specifying the paper-information control unit that manages the paper information stored in the paper-information storing unit in association with the paper identification information, accessing the paper-information control unit using the second service information, and acquiring the paper information from the paper-information control unit; electronic-document acquiring including acquiring, using the print source information included in the paper information acquired at the paper-information acquiring, the first service information for specifying the electronic-information control unit that manages the electronic information for specifying the print object electronic document from the service-information control unit of the server apparatus via the communication unit, accessing the electronic-information control unit using the first service information, acquiring the electronic information from the electronic-information control unit, and acquiring the electronic document specified by the electronic information; and printing including forming a print image using the electronic document acquired at the electronic-document acquiring, and printing the print image on a second paper medium.

Moreover, according to still another aspect of the present invention, there is provided a computer program product comprising a computer-usable medium having computer-readable program codes embodied in the medium that when executed cause a computer to execute reading including acquiring an image read by scanning a first paper medium with a scanning unit; code acquiring including extracting a predetermined code image from the image acquired at the reading, decoding the code image, and acquiring paper identification information for identifying the first paper medium; performing data communication using a communication unit with a server apparatus that includes a service-information storing unit and a service-information control unit, the service-information storing unit storing first service information for specifying an electronic-information control unit that manages electronic information for specifying a print object electronic document stored in an electronic-document storing unit, the electronic information being stored in an electronic-information storing unit in association with electronic identification information for identifying the electronic information, and second service information for specifying a paper-information control unit that manages paper information including print source information for specifying a print source of the first paper medium and stored in a paper-information storing unit in association with paper identification information for identifying a print object paper medium, the service-information control unit managing the first service information and the second service information; paper-information acquiring including judging, based on the paper identification information acquired at the code acquiring, types of the paper identification information, acquiring, according to the types, the second service information for specifying the paper-information control unit that manages the paper information stored in the paper-information storing unit in association with the paper identification information, accessing the paper-information control unit using the second service information, and acquiring the paper information from the paper-information control unit; electronic-document acquiring including acquiring, using the print source information included in the paper information acquired at the paper-information acquiring, the first service information for specifying the electronic-information control unit that manages the electronic information for specifying the print object electronic document from the service-information control unit of the server apparatus via the communication unit, accessing the electronic-information control unit using the first service information, acquiring the electronic information from the electronic-information control unit, and acquiring the electronic document specified by the electronic information; and printing including forming a print image using the electronic document acquired at the electronic-document acquiring, and printing the print image on a second paper medium.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a block diagram of the structure of a PIDS 201 according to the embodiment;

FIG. 5 is a diagram of an example of the data structure of a paper-information table 301A according to the embodiment;

FIG. 7 is a diagram of an example of the data structure of an electronic-information table 302A according to the embodiment;

FIG. 8 is a diagram of the simplified data structure in respective kinds of data formats of a paper ID according to the embodiment;

FIG. 9 is a diagram an example of the detailed data structure of a data format of type 0 according to the embodiment;

FIG. 10 is a diagram of an example of the detailed data structure of a data format of type 1 according to the embodiment;

FIG. 11 is a diagram of an example of the detailed data structure of a data format of type 2 according to the embodiment;

FIG. 12 is a diagram of an example of the detailed data structure of a data format of type 3 according to the embodiment;

FIG. 13 is a diagram of an example of the detailed data structure of a data format of type 4 according to the embodiment;

FIG. 14 is a block diagram of the functional structure of a server SV according to the embodiment;

FIG. 16 is a diagram of the data structure of a service-information table 300A according to the embodiment;

FIG. 17 is a diagram of the data structure of a trust-relationship-information table 300B according to the embodiment;

FIG. 24 is a diagram of a state of a service-information table 300A_1 held by a server SV1 according to the embodiment;

FIG. 25 is a diagram of a state of a service-information table 300A_2 held by a server SV2 according to the embodiment;

FIG. 26 is a diagram of a state of a service-information table 300A_3 held by a server SV3 according to the embodiment;

FIG. 27 is a diagram of a state of a service-information table 300A_4 held by a server SV4 according to the embodiment;

FIG. 54 is a diagram of an example of the data structure of a paper-information table 301A_1 held by the multifunction peripheral MFP1 in a case a) according to the embodiment;

FIG. 55 is a diagram of an example of the data structure of an electronic-information table 302A_1 held by the multifunction peripheral MFP1 in the case a) according to the embodiment;

FIG. 56 is a diagram of an example of the data structure of a paper-information table 301_A held by a multifunction peripheral MFP3 in a case b) according to the embodiment;

FIG. 57 is a diagram of an example of the data structure of an electronic-information table 302A_3 held by the multifunction peripheral MFP3 in the case b) according to the embodiment;

FIG. 58 is a diagram of an example of the data structure of the paper-information table 301A_1 held by the multifunction peripheral MFP1 in a case c) according to the embodiment; and FIG. 59 is a diagram of an example of the data structure of the electronic-information table 302A_1 held by the multifunction peripheral MFP1 in the case c) according to the embodiment.

DETAILED DESCRIPTION OF THE PREFERRED EMBODIMENTS

Exemplary embodiments of the present invention are explained in detail below with reference to the accompanying drawings.

Figure 1:
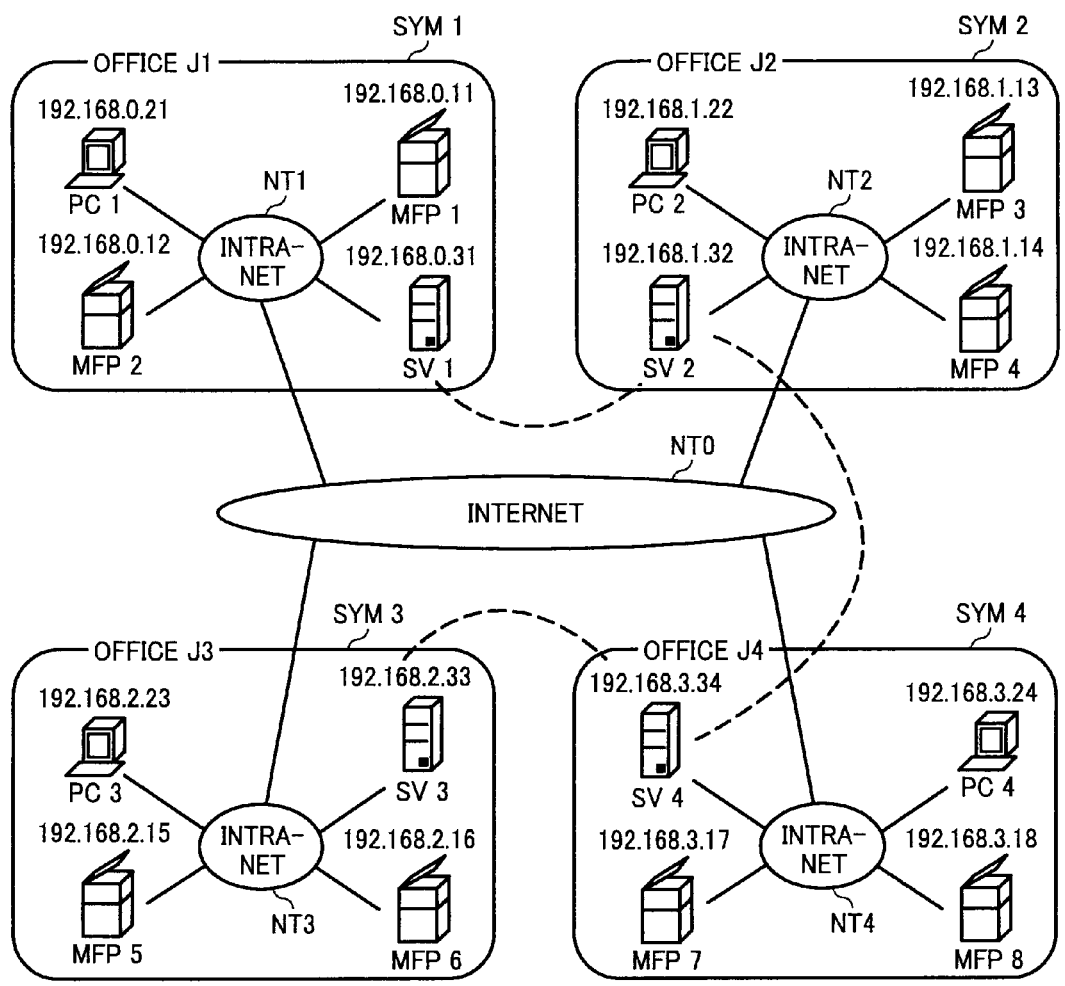
FIG. 1 is a block diagram of the structure of an overall image processing system according to an embodiment of the present invention.

FIG. 1 is a block diagram of the structure of an overall image processing system according to an embodiment of the present invention. As shown in the figure, for example, there are four offices J1, J2, J3, and J4. In the respective offices, there are in-house systems SYM1, SYM2, SYM3, and SYM4 connected to intranets NT1, NT2, NT3, and NT4, respectively. These in-house systems SYM1, SYM2, SYM3, and SYM4 are connected to one another through the Internet NT0 to constitute the image processing system. In the in-house system SYM 1, two multifunction peripherals MFP1 and MFP2 and one personal computer PC1 and the server SV1 are connected. In the in-house system SYM2, two multifunction peripherals MFP3 and MFP4 and one personal computer PC2 and the server SV2 are connected. In the in-house system SYM3, two multifunction peripherals MFP5 and MFP6 and one personal computer PC3 and the server SV3 are connected. In the in-house system SYM4, two multifunction peripherals MFP7 and MFP8 and one personal computer PC4 and the server SV4 are connected. The multifunction peripherals MFP1 to MFP8 and the personal computers PC1 to PC4 and the server SV1 to SV4 are allocated with IP addresses that can uniquely identify the multifunction peripherals and the personal computers. The multifunction peripherals MFP1 to MFP8 and the personal computers PC1 to PC4 and the server SV1 to SV4 are capable of communicating with each other according to network protocols such as HTTP, FTP, and UDP. Various known technologies can be used for establishment of such a network. A technology used for establishment of the network is not limited in this embodiment. In the following explanation, when it is unnecessary to distinguish the in-house systems SYM1 to SYM3, the in-house systems SYM1 to SYM4 are simply referred to as in-house system SYM with "1" to "4" of the reference signs omitted. When it is unnecessary to distinguish the personal computers PC1 to PC4, the personal computers PC1 to PC4 are simply referred to as personal computer PC with "1" to "4" of the reference signs omitted. When it is unnecessary to distinguish the servers SV1 to SV4, the servers SV1 to SV4 are simply referred to as server with "1" to "4" of the reference signs omitted. When it is unnecessary to distinguish the multifunction peripherals MFP1 to MFP8, the multifunction peripherals MFP1 to MFP8 are simply referred to as multifunction peripheral MFP with "1" to "8" of the reference signs omitted.

In the image processing system according to this embodiment, in printing an electronic document on paper as an image, a multifunction peripheral MFP issues a local ID to the paper and prints a code image created by encoding a paper ID including the local ID on the paper. The multifunction peripheral MFP stores paper information including information for specifying a print condition for the paper and the electronic document as a print source of the paper in association with the paper ID. There are a plurality of kinds of data formats type 0 to type 4 for the paper ID. The multifunction peripheral MFP determines one kind of data format out of these kinds of data formats, creates a paper ID according to the data format, and prints a code image created by encoding the paper ID. In copying such paper, the MFP reads a code image printed on the paper, decodes the code image to acquire a paper ID, acquires paper information associated with the paper ID, specifies an electronic document as a print source referring to the paper information, acquires the electronic document, and prints an image on the paper using the electronic document. In printing an image on the paper, as described above, the multifunction peripheral MFP issues a local ID to the paper and prints a code image created by encoding a paper ID including the local ID.

The personal computer PC has the structure of a general computer including a central processing unit (CPU) that controls the entire personal computer PC, a read only memory (ROM) that stores various control programs, various data, and the like, a random access memory (RAM), a hard disk (HD) that stores various application programs and various data, a communication unit that controls data communication with an external apparatus, and a bus that connects the CPU, the ROM, the RAM, the HDD, and the communication unit (all of these components are not shown in the figure). A display unit such as a monitor and an operation unit such as a keyboard (both the units are not shown in the figure) are connected to the personal computer PC through wire or wireless connecting means. A printer driver is stored in the ROM of the personal computer PC. When the printer driver is started by the CPU, the personal computer PC transmits a print command to the multifunction peripheral MFP in the same in-house system SYM through the communication unit.

Figure 2:
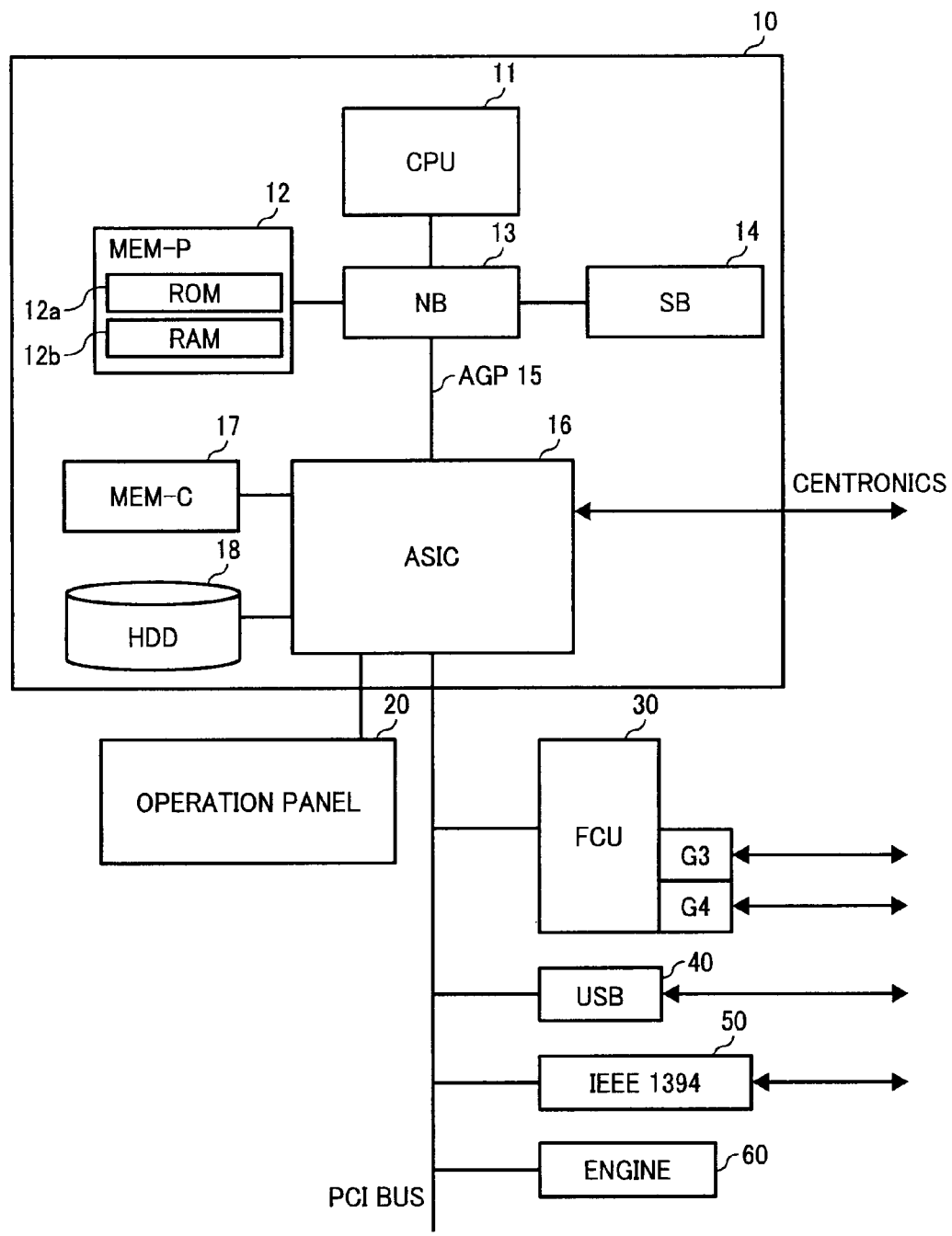
FIG. 2 is a block diagram of a hardware configuration of a multifunction peripheral MFP according to the embodiment.

FIG. 2 is a block diagram of the electrical structure of the multifunction peripheral MFP. As shown in FIG. 2, in the multifunction peripheral MFP, a controller 10 and an engine unit (engine) 60 are connected by a peripheral component interconnect (PCI) bus. The controller 10 is a controller that controls the entire multifunction peripheral MFP, rendering, communication, and input from a not-shown operation unit. The engine unit 60 is a printer engine or the like connectable to the PCI bus. The engine unit 60 includes a scanning unit such as a scanner and also includes a printing unit such as a black and white plotter, a one-drum color plotter, or a four-drum color plotter (both the scanner unit and the printing unit are not shown in the figure). An engine unit 60 includes, in addition to a so-called engine section of the plotters and the like, an image processing section for error diffusion, gamma conversion, and the like. The multifunction peripheral MFP also includes an operation panel 20 in which an operation device to which operation from the user is inputted and a display device that displays information are integrally formed. The operation panel 20 is connected to an application specific integrated circuit (ASIC) 16. A CPU 11 included in the controller 10 has a timing function and measures a present date and time. The RAM 12b performs as a cache memory (hereinafter, "cache"). A detailed electrical structure of such a multifunction peripheral MFP is disclosed in, for example, Japanese Patent Application Laid-Open No. 2006-177990. Therefore, explanation of the detailed electrical structure is omitted. Functions realized by the CPU 11 executing various programs stored in a read only memory (ROM) 12a, i.e., the functional structure of the multifunction peripheral MFP is explained below.

Figure 3:
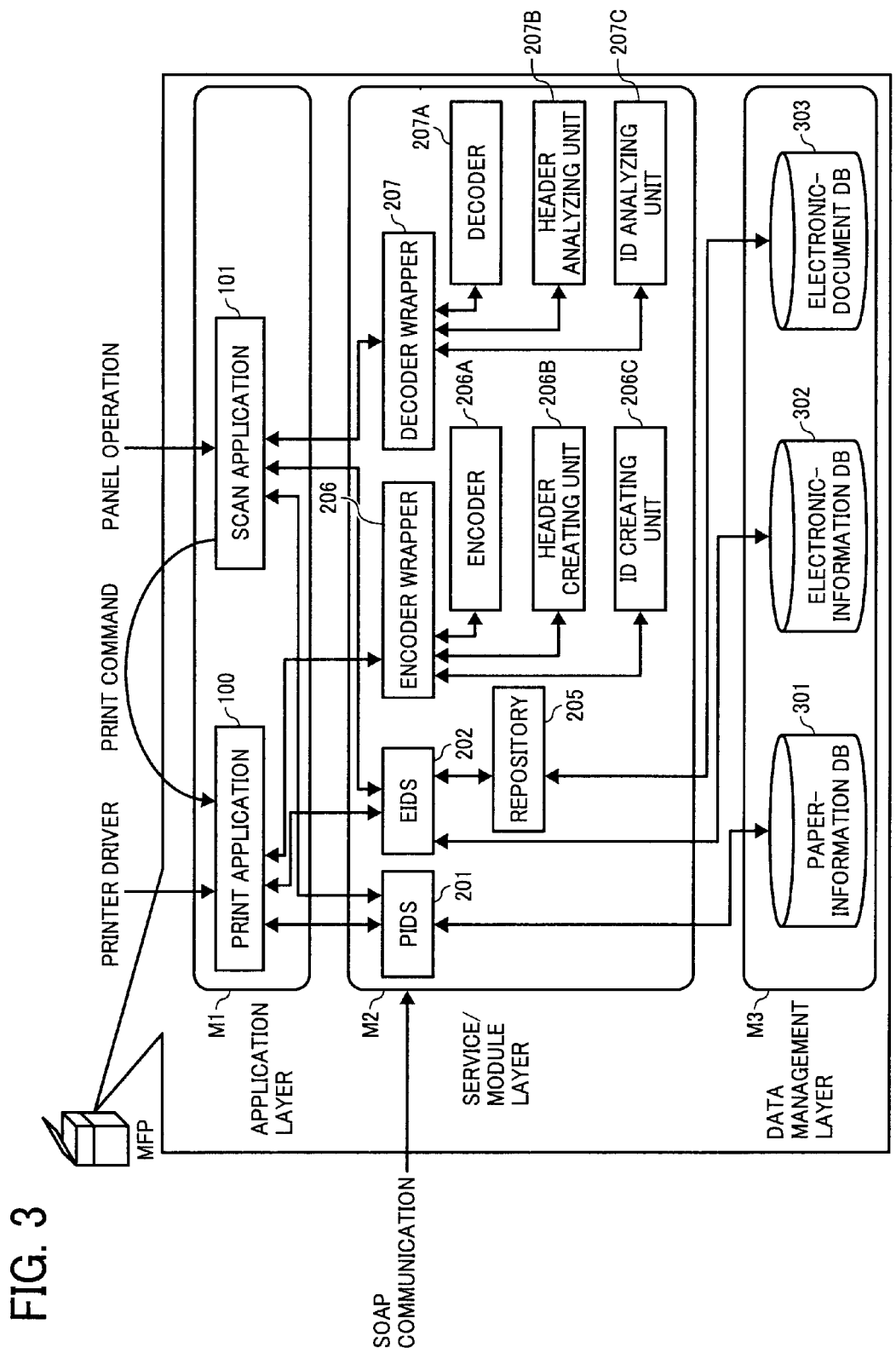
FIG. 3 is a block diagram of the functional structure of the multifunction peripheral MFP according to the embodiment.

FIG. 3 is a block diagram showing a functional structure of the multifunction peripheral MFP. Functions of the multifunction peripheral MFP are roughly divided into an application layer M1, a service/module layer M2, and a database layer M3. The application layer M1 has the print application 100 and a scan application 101. The service/module layer M2 has a paper ID service (PIDS) 201, and an electric ID service (EIDS) 202 as information processing services (hereinafter simply referred to as "services"). The service/module layer M2 further has the encoder wrapper 206, the decoder wrapper 207, and a repository 205 as modules. The database layer M3 has a paper-information DB 301, an electronic-information DB 302, and an electronic-document DB 303 that store electronic documents. The DBs 301 to 303 are stored in the HDD or the like.

The print application 100 acquires a print object electronic document using the PIDS 201, the EIDS 202, and the encoder wrapper 206 and prints the electronic document using the printing unit. The print application 100 prints an image using the printing unit according to a print command from the scan application 101. The scan application 101 acquires an electronic document as a print source with respect to scanned print object paper using the PIDS 201, the EIDS 202, and the decoder wrapper 207 and passes the electronic document to the print application 100 together with a print command.

The PIDS 201 manages information concerning a printed paper using the paper-information DB 301. The EIDS 202 manages information concerning a print object electronic document using the electronic-information DB 302 and the repository 205. The repository 205 manages an electronic document stored in the electronic-document DB 303. The repository 205 is a known document management system having a function of managing an electronic document. Therefore, explanation of details of the repository 205 is omitted. However, the repository 205 has functions of acquiring an electronic document, registering the electronic document in the electronic-document DB 303, and updating or deleting the electronic document stored in the electronic-document DB 303. The EIDS 202 performs processing for a body of an electronic document (registration, update, deletion, and acquisition of the electronic document) using these functions of the repository 205. The registration of the electronic document in the electronic-document DB 303 means the start of storage of the electronic document in the electronic-document DB 303. Registration of other information in the other DBs has a similar meaning.

The respective services of the PIDS 201 and the EIDS 202 perform various kinds of processing according to a processing command from the application layer M1 and a processing command from an external apparatus through SOAP communication.

The structure of detailed functions of the respective services and the respective modules and the structure of the respective databases are explained below. For convenience of explanation, in the respective multifunction peripherals MFP1 to MFP8, "1" to "8" of the reference signs MFP1 to MFP8 are attached to, together with underlines, the ends the reference numerals of the print application 100, the scan application 101, the SRMS 200, the PIDS 201, the EIDS 202, the repository 205, the encoder wrapper 206, the decoder wrapper 207, the paper-information DB 301, the electronic-information DB 302, and the electronic-documents DB 303. Specifically, the multifunction peripheral MFP1 has the print application 100_1, a scan application 101_1, a PIDS 201_1, an EIDS 202_1, an encoder wrapper 206_1, the decoder wrapper 207_1, a repository 205_1, a paper-information DB 301_1, an electronic-information DB 302_1, and an electronic-document DB 303_1. The same holds true for the multifunction peripherals MFP2 to MFP8 and respective units explained below. In the following explanation, when it is unnecessary to distinguish these components, the underlines and the reference numerals "1" to "8" are omitted.

FIG. 4 is a block diagram of the structure of the PIDS 201. The PIDS 201 is a function of managing paper information. The paper information is information concerning printed paper. The function of the PIDS 201 further has an interface unit PI1 and a processing function unit PI2. The interface unit PI1 has four interfaces. The respective interfaces are interfaces for paper registration, paper change, paper deletion, and paper acquisition. All of these interfaces are interfaces that can use the Web service. Similarly, the processing function unit PI2 includes four processing sections, i.e., a paper-registration processing section PI20, a paper-change processing section PI21, a paper-deletion processing section PI22, and a paper-acquisition processing section PI23.

The interfaces of the interface unit PI11 are connected to the processing sections in the order explained above, respectively. When a request for processing is received from the external apparatus or the application layer M1, the interfaces pass parameters used for the processing to the processing sections corresponding to the requested processing, receive results of the processing performed by using the parameters from the corresponding processing sections, and return the processing results to the request source of the processing. When the parameters are passed from the corresponding interfaces, the respective processing sections access the paper-information DB 301, execute the processing using the parameters, and return processing results to the corresponding interfaces. The processing performed by the respective processing sections PI20 to PI23 is explained in detail later.

The paper-information DB 301 has the paper-information table 301A that stores paper information concerning one piece of printed paper as one record.

FIG. 5 is a diagram of an example of the data structure of the paper-information table 301A. Paper information is stored in the paper-information table 301A for each paper ID. The paper ID (paper identification information) is an ID that can uniquely identify, for each print object paper, the paper. The PIDS 201 issues the paper ID when the PIDS 201 registers paper information in the paper-information table 301A using a paper registration function explained later. Specifically, the paper ID includes a combination of a UUID of the PIDS 201 and a local ID explained below. For example, when images are printed on three pieces of paper in one print processing, three paper IDs are issued and associated with the three pieces of paper. The paper information stored in the paper-information table 301A includes "name", "explanation", "UUID of a PIDS", "local ID", "registration date and time", "update date and time", "link to an original document", and "print condition" as data. "Name" and "explanation" are character strings issued to allow the user to understand what the paper is.

"UUID of a PIDS" is an ID that can globally and uniquely identify the PIDS 201 and, for example, a GUID, which is an object class ID used in Windows (registered trademark), and a MAC address allocated to a network card. A technology for issuing a UUID to a service is already publicly-known. As such a technology, there are a large number of technologies. In this embodiment, any one of the technologies can be used. As timing of the issuance, the UUID is issued when programs for realizing the functions of the PIDS 201 and the EIDS 202 are installed in the multifunction peripheral MFP. The UUID is not changed until the programs are uninstalled from the multifunction peripheral MFP. "Local ID" is an ID for uniquely identifying paper information in identical PIDS 201. "Local ID" makes it possible to globally and uniquely identify the paper information according to a combination with the UUID of the PIDS 201. The UUID of the PIDS and the local ID of the PIDS are equivalent to second control identification information.

"Registration data and time" indicates a date and time when the paper information is registered in the paper-information table 301A. "Update date and time" indicates a date and time when the paper information registered in the paper-information table 301A is updated. "Link to an original document" indicates information indicating which electronic document is printed to obtain the paper, i.e., information specifying an electronic document as a print source or indicates information indicating which paper is copied to obtain the paper, i.e., information specifying paper as a copy source. The information specifying an electronic document is, for example, a combination (an electronic ID) of a UUID of the EIDS 202 and a local ID issued by the EIDS 202 explained later. The information specifying paper is, for example, a combination (a paper ID) of the UUID of the PIDS 201 and a local ID issued by the PIDS 201. Consequently, in copying certain paper, when the paper is scanned, it is possible to specify which one is paper as a copy source. Moreover, by referring to "link to an original document" in paper information concerning the paper, it is possible to finally acquire information specifying an electronic document as a print source and acquire the electronic document. "Print condition" is, for example, a size of paper, aggregation, allocation, enlargement/reduction, and the like set by the user as a condition in printing the paper. "Print condition" is passed from the printer driver of the personal computer PC.

Figure 6:
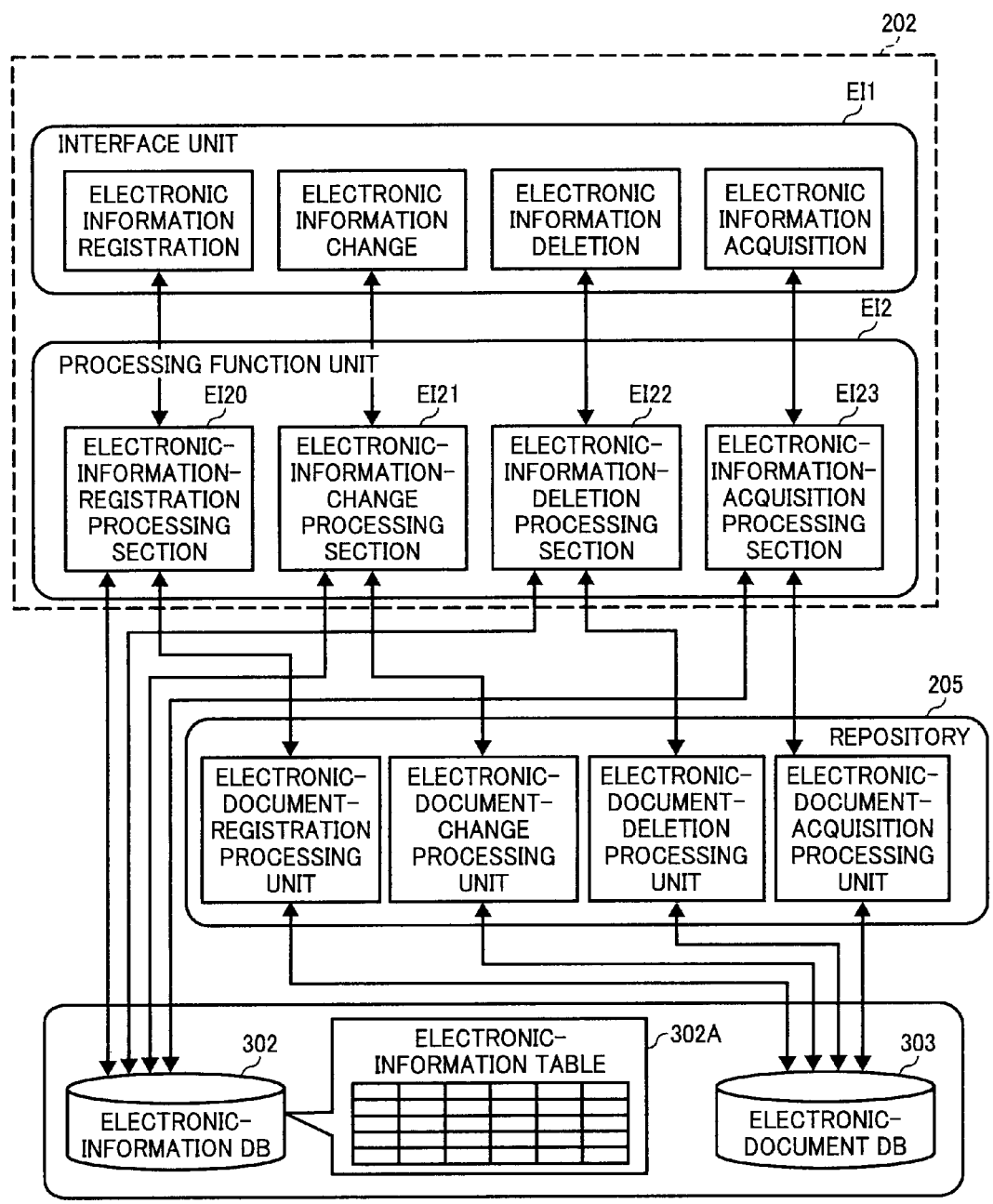
FIG. 6 is a block diagram of the structure of an EIDS 202 according to the embodiment.

FIG. 6 is a block diagram of the structure of the EIDS 202. The EIDS 202 is a function of managing electronic information. The electronic information is information concerning an electronic document. Details of the electronic information are explained later. The EIDS 202 has an interface unit EI1 and a processing function unit EI2. The interface unit EI1 has four interfaces. In FIG. 6, the respective interfaces are interfaces for electronic information registration, electronic information change, electronic information deletion, and electronic information acquisition. All of these interfaces are interfaces that can use the Web service. Similarly, the processing function unit EI2 includes four processing sections, i.e., an electronic-information-registration processing section EI20, an electronic-information-change processing section EI21, an electronic-information-deletion processing section EI22, and an electronic-information-acquisition processing section EI23.

The interfaces of the interface unit EI1 are connected to the processing sections in the order explained above, respectively. When a request for processing is received from the external apparatus or the application layer M1, the interfaces pass parameters used for the processing to the processing sections corresponding to the requested processing, receive results of the processing performed by using the parameters from the corresponding processing sections, and return the processing results to the request source of the processing. When the parameters are passed from the corresponding interfaces, the respective processing sections perform processing for a body of the electronic document using the repository 205, access the electronic-information DB 302, execute the processing using the parameters, and return processing results to the corresponding interfaces. In this way, the EIDS 202 manages the electronic information and manages the body of the electronic document in cooperation with the repository 205.

The electronic-information DB 302 has an electronic-information table 302A that stores electronic information as one record.

FIG. 7 is a diagram of an example of the data structure of the electronic-information table 302A. Electronic information is stored in the electronic-information table 302A for each electronic ID. The electronic ID is an ID that can uniquely identify the electronic information. The EIDS 202 issues the electronic ID when the EIDS 202 registers the electronic information in the electronic-information table 302A. Specifically, the electronic ID includes a combination of a UUID of the EIDS 202 and a local ID explained below. The electronic information stored in the electronic-information table 302A includes "name", "explanation", "UUID of an EIDS", "local ID", "registration date and time", "update date and time", and "link to a repository" as data. "Name" and "explanation" are character strings issued to allow the user to understand what the electronic document is. "UUID of an EIDS" is a UUID of the EIDS 202 for globally and uniquely identifying the electronic information. A method of issuing the UUID is the same as that in the case of the SRMS 200. "Local ID" is an ID for uniquely identifying the electronic information in an identical EIDS 202. "Local ID" makes it possible to globally and uniquely identify the electronic information according to a combination with the UUID of the EIDS 202. "Registration data and time" and "update date and time" indicate a date and time when the electronic information is registered in the electronic-information table 302A and a date and time when the electronic information is updated, respectively. "Link to a repository" indicates a link to the electronic document and indicates, for example, an ID and a file pass that the repository 205 issues to the electronic document.

The encoder wrapper 206 is a functional module in which a header creating unit 206B and the ID creating unit 206C are wrapped in an encoder 206A. The encoder wrapper 206 creates a code image for encode object data using the encoder 206A, the header creating unit 206B, and the ID creating unit 206C in response to a request from the print application 100.

The ID creating unit 206C creates ID data in any one of the data formats type0 to type 4 in response to a request from the encoder wrapper 206 and returns the ID data to the encoder wrapper 206. The header creating unit 206B creates header data in response to a request from the encoder wrapper 206 and returns the header data to the encoder wrapper 206.

The encoder 206A encodes encode object data of a character string, a byte array, or the like, creates a code image such as a one-dimensional or two-dimensional barcode, and returns the code image to the encoder wrapper 206. Such an encoder 206A can be constituted by using various arbitrary publicly-known technologies. As the one-dimensional barcode, there are codes such as Code39, EAN-8, EAN-13, NW-7, and Code1. As the two-dimensional code image, there are codes such as QR, DataMatrix, and PDF417. The encoder 206A creates a code image using such various information carriers. In this embodiment, any one of the codes can be used. The respective codes have publicly-known parameters for creating a code image, respectively. In this embodiment, the encoder 206A correctly sets parameters corresponding to an encode object code and creates a code image.

In the one-dimensional barcodes such as Code128 and Int2of5, only an ASCII character string and a decimal digit can be encoded because of a code standard. An encode object paper ID is represented by a binary digit. Therefore, in creating images of such one-dimensional barcodes (code images), the encoder wrapper 206 converts a binary digit (256-ary) into data of an ASCII character string (128-ary), a decimal digit, and the like and passes the data after conversion to the encoder 206A. When the header creating unit 206B and the ID creating unit 206 fail in creation of data, the encoder wrapper 206 returns the binary data before conversion to the print application 100.

The decoder wrapper 207 is a functional module in which a header analyzing unit 207B and the ID analyzing unit 207C are wrapped in a decoder 207A. The decoder wrapper 207 decodes an image and acquires data (a paper ID) in response to a request from the scan application 101 using the decoder 207A, the header analyzing unit 207B, and the ID analyzing unit 207C.

The decoder 207 restores the original data of the character string, the byte array, or the like from the code image created by the encoder 206A and returns the data to the decoder wrapper 207. Such a decoder 207A can be constituted by using various arbitrary publicly-known technologies. The decoder 207A has a detect function of specifying a position where the code image is present in one arbitrary image. When an image appearing in the specified position is inputted to the decoder 207A, the decoder 207A restores an original character string or byte array from the code image. A publicly-known technology can be used for the detect function.

The header analyzing unit 207B analyzes data decoded by the decoder 207A in response to a request from the decoder wrapper 207, judges header data, and returns the header data to the decoder wrapper 207. The ID analyzing unit 207C analyzes the data decoded by the decoder 207A in response to a request from the decoder wrapper 207, judges ID data in any one of the data formats type0 to type 4, and returns the ID data to the decoder wrapper 207.

In the one-dimensional barcodes such as Code128 and Int2of5, only an ASCII character string and a decimal digit can be encoded because of a code standard. An encode object paper ID is represented by a binary digit. Therefore, in decoding images of such one-dimensional barcodes (code images), the decoder wrapper 207 converts data of an ASCII character string (128-ary), a decimal digit, or the like into a binary digit (256-ary) and passes the data after conversion to the header analyzing unit 207B and the ID analyzing unit 207C. When the header analyzing unit 207B and the ID analyzing unit 207C fail in analysis of data, the decoder wrapper 207 returns the binary data before conversion to the scan application 101.

The print application 100 has two functions corresponding to a difference in a print command source. Specifically, the print application 100 has a driver print function and a scan print function. The driver print function is a function of receiving a print command from the printer driver of the personal computer PC and printing an image according to the print command. The scan print function is a function of receiving a print command from the scan application 101 that scans copy object paper in the multifunction peripheral MFP and printing an image according to the print command.

In both the functions, in printing a print object image on paper, the print application 100 determines a type of a data format of a paper ID of an encode object and requests the encoder wrapper 206 to create a paper ID represented by the determined type of the data format and encode the paper ID. The print application 100 determines the type of the data format referring to a data format flag. The data format flag is stored in, for example, the HDD 18 in advance. Values of "0" to "4" corresponding to type0 to type 4 are set as types of data formats. Details of the data formats are described later. When a code image created by encoding the paper ID according to the request is received, the print application 100 prints the code image on the paper together with the print object image.

When copy object paper is set on the multifunction peripheral MFP and a print command is inputted by the user on the operation panel 20 of the multifunction peripheral MFP, the scanning unit scans the paper to scan a code image printed on the paper. The scan application 101 acquires the code image and acquires a paper ID decoded from the code image by the decoder wrapper 207. The scan application 101 acquires, based on the paper ID, paper information stored in the paper-information DB 301 using the function of the PIDS 201. The scan application 101 acquires, based on the paper information, electronic information stored in the electronic-information DB 302 using the function of the EIDS 202. The scan application 101 acquires an electronic document stored in the electronic-document DB 303 using the electronic information. The scan application 101 passes a print command including the electronic document, the paper ID, and a print condition to the print application 100.

The server SV has the structure of a general computer including a CPU that controls the entire server SV, a ROM and a RAM that store various controls programs, various data, and the like, an HDD that stores various application programs and various data, a communication unit that controls data communication with an external apparatus, and a bus that connects these devices (all of which are not shown in the figure).

FIG. 14 is a block diagram of the functional structure of the server SV. In the following explanation, when it is necessary to distinguish respective kinds of functional structure of the servers SV1 to SV4, underlines and signs "1" to "4" are attached behind the signs SV1 to SV4. When it is unnecessary to distinguish the respective kinds of functional structure of the servers SV1 to SV4, the underlines and the signs "1" to 24" are omitted. Functions of the server SV are roughly divided into a service/module layer MS2 and a database layer MS3. The service/module layer MS2 has a service resource management service (SRMS) 200 as a service. The database layer MS3 has a service DB 300. The service DB is stored in the HDD and the like.

Figure 15:
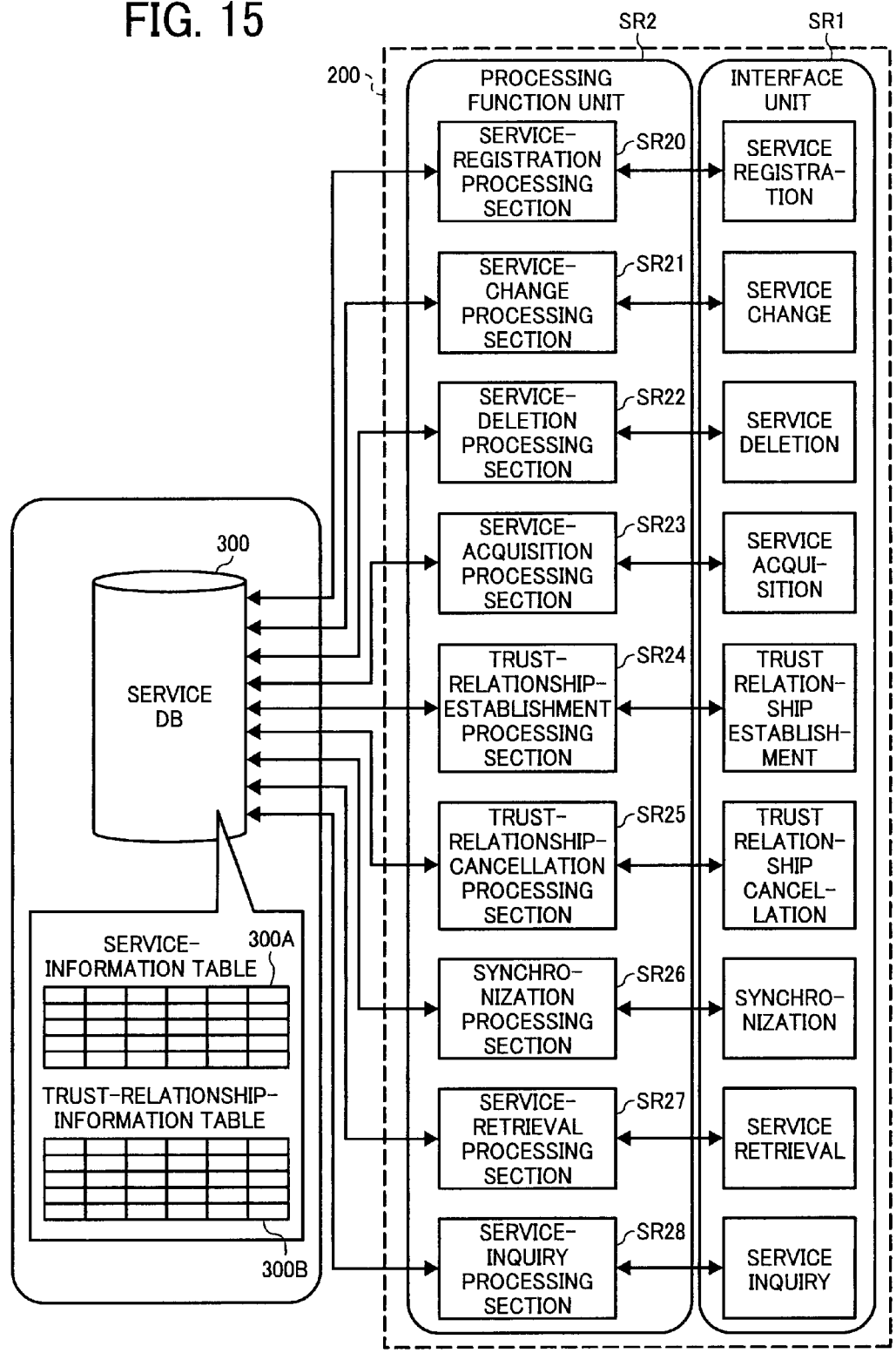
FIG. 15 is a block diagram of the structure of a service resource management service (SRMS) 200 according to the embodiment.

The SRMS 200 is a function of managing information concerning respective services of the PIDS 201 and the EIDS 202 using the service DB 300. The SRMS 200 performs various kinds of processing according to processing commands from an external apparatus through SOAP communication or UDP communication. FIG. 15 is a block diagram of the structure of the SRMS 200. The SRMS 200 has an interface unit SR1 and a processing function unit SR2. The interface unit SR1 has nine interfaces. As shown in FIG. 15, the respective interfaces are interfaces for service registration, service change, service deletion, service acquisition, trust relationship establishment, trust relationship cancellation, synchronization, service retrieval, and service inquiry. Among the interfaces, the interfaces for service registration, service change, service deletion, service acquisition, trust relationship establishment, trust relationship cancellation, synchronization, and service retrieval are interfaces that can use a Web service. The Web service is one of services of network communication extremely often used presently and is a mechanism for transmitting structured data called standardized simple object access protocol (SOAP) message to a network or receiving the data from the network. As programming methods incorporating this mechanism, NET Framework (registered trademark) of Microsoft (registered trademark) in the C language/C# language/Basic language, AXIS of Apache in the Java (registered trademark) language, and the like are famous. These programming methods are often used. In this embodiment, the mechanism of the Web service may be established using any one of the programming methods. The interface for the service inquiry is an interface that uses user datagram protocol (UDP) communication. UDP is a transport layer protocol for realizing datagram communication in TCP/IP. Similarly, the processing function unit SR2 includes nine processing sections, i.e., a service-registration processing section SR20, a service-change processing section SR21, a service-deletion processing section SR22, a service-acquisition processing section SR23, a trust-relationship-establishment processing section SR24, a trust-relation-cancellation processing section SR25, a synchronization processing section SR26, a service-retrieval processing section SR27, and a service-inquiry processing section SR28. Functions of the interface for service inquiry of the interface unit SR1 and the service-inquiry processing section SR28 and functions of the interface for service retrieval of the interface unit SR1 and the service-retrieval processing section SR27 have a broadcast function and transmit data to a large number of communication partners.

The interfaces of the interface unit SR1 are connected to the processing sections SR20 to SR28 of the processing function unit SR2 in the order explained above, respectively. When a request for processing is received from the external apparatus or the application layer M1, the interfaces pass parameters used for the processing to the processing sections corresponding to the requested processing, receive results of the processing performed by using the parameters from the corresponding processing sections, and return the processing results to the request source of the processing. When the parameters are passed from the corresponding interfaces, the respective processing sections access the service DB 300, execute the processing using the parameters, and return processing results to the corresponding interfaces.

The service DB 300 has the service-information table 300A that stores service information representing the SRMS 200, service information representing the PIDS 201, and service information representing the EIDS 202 as records, respectively, and the trust-relationship-information table 300B that stores trust relationship information explained later.

FIG. 16 is a diagram of an example of the data structure of the service-information table 300A. In the service-information table 300A, service information representing the SRMS 200, service information representing the PIDS 201, and the service information representing the EIDS 202 are stored for each service ID. The service ID is an ID that can uniquely identify each of the kinds of service information. The SRMS 200 issues the service ID when the SRMS 200 registers each of the kinds of service information in the service-information table 300A according to a service registration function explained later. Specifically, the service ID includes a combination of a UUID of a service and a local ID explained below. Each of the kinds of service information stored in the service-information table 300A includes, as shown in FIG. 16, "name", "explanation", "name space", "version", "uniform resource identifier (URI)", "UUID of a service", "local ID", "master UUID", "registration date and time", and "update date and time" as data. "Name" and "explanation" are character strings issued to allow the user to understand what the service is. "Name" is represented as, for example, "SRMS", "PIDS", or "EIDS". "Name space" is a character string that can uniquely identify a service. "Name space" is a character string for allowing the user to identify that, even if names of services are the same, the services are different if name spaces of the services are different. "Name space" is represented as, for example, "jp.co.ricoh.srms". "Version" is a character string indicating a version of the service. "URI" is a character string indicating where in the network the service exists. For example, "URI" of a PIDS 201_5 of the multifunction peripheral MFP5 shown in FIG. 1 is represented as "http://192.168.1.15/ids/".

"UUID of a service" is an ID for globally and uniquely identifying the respective services of the SRMS 200, the PIDS 201, and the EIDS 202. As explained in the structure table of the paper-information table 301, "UUID of a service" is, for example, a GUID, which is an object class ID used in Windows (registered trademark), and a MAC address allocated to a network card. As timing of the issuance, the UUID is issued when programs for realizing the functions of the SRMS 200, the PIDS 201, and the EIDS 202 are installed in the server SV. The UUID is not changed until the programs are uninstalled from the multifunction peripheral MFP. The UUID of a SRMS 200 corresponds to the third control identification information. "Local ID" is an ID for uniquely identifying service information in an identical SRMS 200. "Local ID" makes it possible to globally and uniquely identify the service information according to a combination with the UUID of a service. The master UUID corresponds to the manage identification information. "Master UUID" (management identification information) is a UUID issued to the SRMS 200 that manages the service information. "Master UUID" is used when a synchronization function explained later is realized. "Registration date and time" and "update date and time" respectively indicate a date and time when the service information is registered in the service-information table 300A and a date and time when the service information is updated.

FIG. 17 is a diagram of an example of a data structure of the trust-relationship-information table 300B. In the trust-relationship-information table 300B, a UUID of the SRMS 200 that forms a trust relationship is stored as trust relationship information. Forming the trust relationship is sharing service information with the SRMSs 200 of the other server SVs and making it possible to synchronize the service information. Details of the trust relationship are explained later.

FIG. 8 is a diagram of the simplified data structure in respective kinds of data formats of a paper ID according to the embodiment. In this embodiment, as the data formats of a paper ID, there are five types type0 to type 4, which are roughly divided into header data and ID data. The header data is the data structure common to all the types. The ID data is the data structure different for each of the types. FIGS. 9 to 13 are diagrams of examples of the detailed data structure of the data formats type0 to type 4. The header data include data of "data format identification flag", "data format version", "data format type", "inter-carrier priority", "paper ID identification flag", and "ID data length".

"Data format identification flag" is a 5-bit numerical value (0 to 31) indicating that a paper ID of an encode object is a specified data format. With this numerical value, it is possible to distinguish whether data is data of the specified data format or data of an unspecified data format. "Data format version" is a 3-bit numerical value (0 to 7) indicating a version of the paper ID of the encode object. With this numerical value, even when rules of encoding are changed by upgrade of a different version, the version can coexists with the previous version. "Data format type" is a 4-bit numerical value (0 to 15) indicating a type of the data format of the paper ID. Specifically, in "data format type", "0" to "4" are set in the data formats type0 to type 4, respectively. With this numerical value, it is possible to discriminate the type of the data format.

"Priority among carriers during decoding" is a 3-bit numerical value (0 to 7) indicating, when a plurality of paper IDs are issued to paper, priority of the paper IDs. With this numerical value, it is possible to discriminate, when a plurality of paper IDs are issued to paper, which paper ID should be processing preferentially. "Paper ID identification flag" is a 1-bit numerical value indicating whether encode object data is a paper ID. Specifically, when the encode object data is a paper ID, "1" is set in "paper ID identification flag". When the encode object data is not a paper ID, "0" is set in "paper ID identification flag". With this numerical value, it is possible to discriminate whether an encode object data is a paper ID without accessing the SRMS 200 or the PIDS 201. "ID data length" is a numerical value indicating a bit length of ID data. It is possible to judge correctness of ID data by comparing an actual ID data length obtained when ID data is analyzed and a value set in "ID data length".

ID data in the data format of type 0 includes 8-bit to 8192-bit "direct reference ID representation". Service information of the PIDS 201 and a local ID of paper information are set in "direct reference ID representation". ID data in the data format of type 1 includes 128-bit "UUID of an SRMS", 128-bit "UUID of a PIDS", and 24-bit to 128-bit "local ID of paper information". "UUID of a PIDS" is an ID that can globally and uniquely identify the PIDS 201. Therefore, it is possible to globally and uniquely identify the service information of the PIDS 201.

ID data in the data format of type 2 includes 128-bit "UUID of an SRMS", 16-bit "local ID of a PIDS", and 24-bit to 128-bit "local ID of paper information". ID data in the data format of type 3 includes 128-bit "UUID of a PIDS" and 24-bit to 128-bit "local ID of paper information". "UUID of an SRMS" is an ID that can globally and uniquely identify the SRMS 200. "Local ID of a PIDS" is a uniquely identifiable ID among pieces of service information directly managed by one SRMS 200. Therefore, it is possible to uniquely identify pieces of service information, values of "local ID of a PIDS" of which coincide with one another, among pieces of service information, values of "UUID of an SRMS" of which coincide with a value of "master UUID".

ID data in the data format of type 4 includes 16-bit "local ID of a PIDS" and 24-bit to 128-bit "local ID of paper information". As described above, "local ID of a PIDS" is a uniquely identifiable ID among pieces of service information directly managed by one SRMS 200. Therefore, global uniqueness in the entire image processing system is not guaranteed. It is likely that the service information of the PIDS 201 cannot be globally and uniquely identified.

As described above, a largest amount of information can be included in the data format of type 0. However, because a data amount of the data format of type 0 is large, a size of an information carrier in encoding the data into a code image is also large. On the other hand, a data amount of the data format of type 4 is the smallest. Therefore, a size of an information carrier in encoding the data into a code image can be small. In the data formats type 0 to type 3, the service information of the PIDS 201 can be uniquely identified in the entire image processing system. However, in the data format of type 4, the service information of the PIDS 201 cannot be uniquely identified in the entire image processing system. In this way, in this embodiment, it is possible to form a paper ID of a desired type according to convenience of a user by defining a plurality of kinds of data formats.

Figure 18:
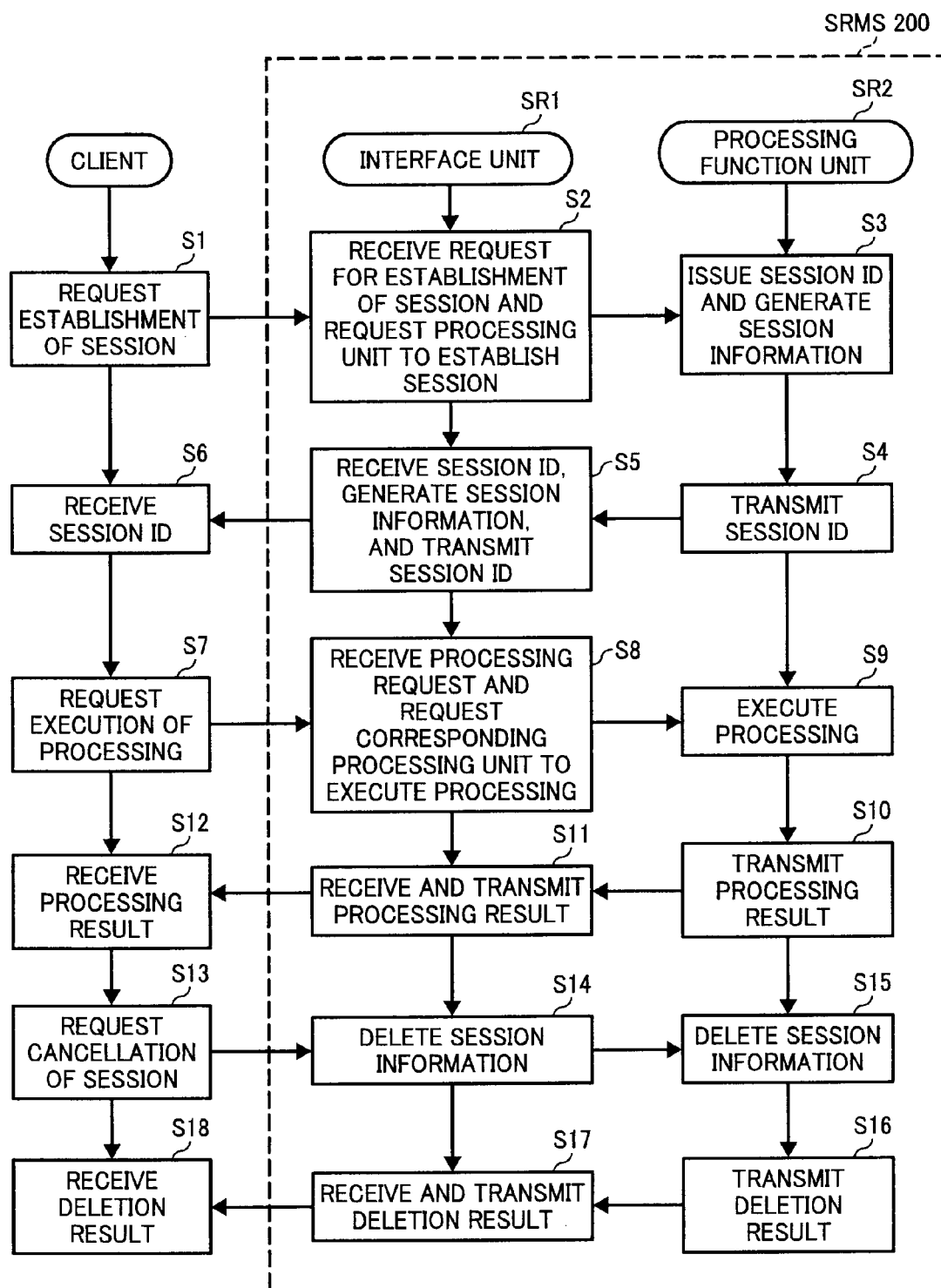
FIG. 18 is a flowchart of a procedure of basic processing of simple object access protocol (SOAP) communication performed by using a SOAP message in a Web service according to the embodiment.

FIG. 18 is a flowchart of a procedure of basic processing of SOAP communication performed by using a SOAP message in the Web service. In FIG. 18, for convenience of explanation, a communication partner of the SRMS 200 is represented as a client. However, the client is any one of the server SVs other than the server SV, the multifunction peripheral MFP and the personal computer PC.

First, the client requests the interface unit SR1 of the SRMS 200 to establish a session (Step S1). The establishment of a session can be performed by using a module provided by NET Framework or AXIS explained above. The interface unit SR1 can manage a session using the module. However, in this procedure, the interface unit SR1 passes information to any one of the processing sections of the processing function unit SR2 and the processing section independently manage the session. In such a technology, when the request for establishment of a session is received from the client, the interface unit SR1 requests the processing function unit SR2 to establish a session (Step S2). The processing function unit SR2 receives the request for establishment of a session from the interface unit SR1. The processing function unit SR2 issues a session ID for managing the session and generates session information including information such as a term of validity of the session (Step S3). The processing function unit SR2 transmits the session ID to the interface unit SR1 (Step S4). The interface unit SR1 receives the session ID. The interface unit SR1 generates session information for managing the session ID and transmits the session ID to the client (Step S5). The client receives the session ID (Step S6). As a result, a session is established between the client and a server. While the session is established, the SRMS 200 can perform the respective kinds of processing explained above.

The client requests the interface unit SR1 to execute the respective kinds of processing (Step S7). The interface unit SR1 accesses an interface corresponding to the request from the client and requests the processing section (hereinafter, "object processing section") corresponding to the interface among the processing sections SR20 to SR28 of the processing function unit SR2 to execute the processing (Step S8). When parameters are required for the execution of the processing, the client transmits, in requesting the execution of the processing, the parameters to the interface unit SR1 serializing with a SOAP message. The interface unit SR1 deserializes the SOAP message transmitted from the client to obtain the parameters and, in requesting the object processing section to execute the processing, passes the parameters to the object processing section. The client may pass, in requesting the execution of the processing, the session ID obtained at the time of the establishment of the session to the Web server. The interface unit SR1 collates the session ID received from the client and session information held by the interface unit SR1 and judges, for example, whether a session corresponding to the session ID exists and a term of validity of the session has not been expired. When there is no problem, the interface unit SR1 passes the parameters passed by the client to the object processing section and waits for completion of the processing.

On the other hand, the object processing section executes the processing according to the processing execution request from the interface unit SR1 (Step S9) and returns a processing result to the interface unit SR1 through an interface corresponding to the object processing section (Step S10). The interface unit SR1 receives the processing result from the object processing section. The interface unit SR1 transmits the processing result to the client (Step S11). The client receives the processing result (Step S12). In finishing the session, the client requests the interface unit SR1 to cancel the session (Step S13). The interface unit SR1 deletes the session information managed by the interface unit SR1 and requests the object processing section to cancel the session (Step S14). The object processing section deletes the session information in the same manner (Step S15) and transmits a deletion result indicating success of the deletion to the interface unit SR1 (Step S16). The interface unit SR1 transmits the deletion result to the client (Step S17). The client receives the deletion result (Step S18) and finishes the session between the client and the server. In finishing the session, according to the method used in establishing the session, the session may be managed by the module provided by NET Framework or AXIS or the object processing section may independently manage the session.

Details of operations of the respective interfaces performed at Steps S8 and S11 and operations of the respective processing sections performed at Steps S9 and S10 according the processing execution request at Step S7 are explained below.

Figure 19:
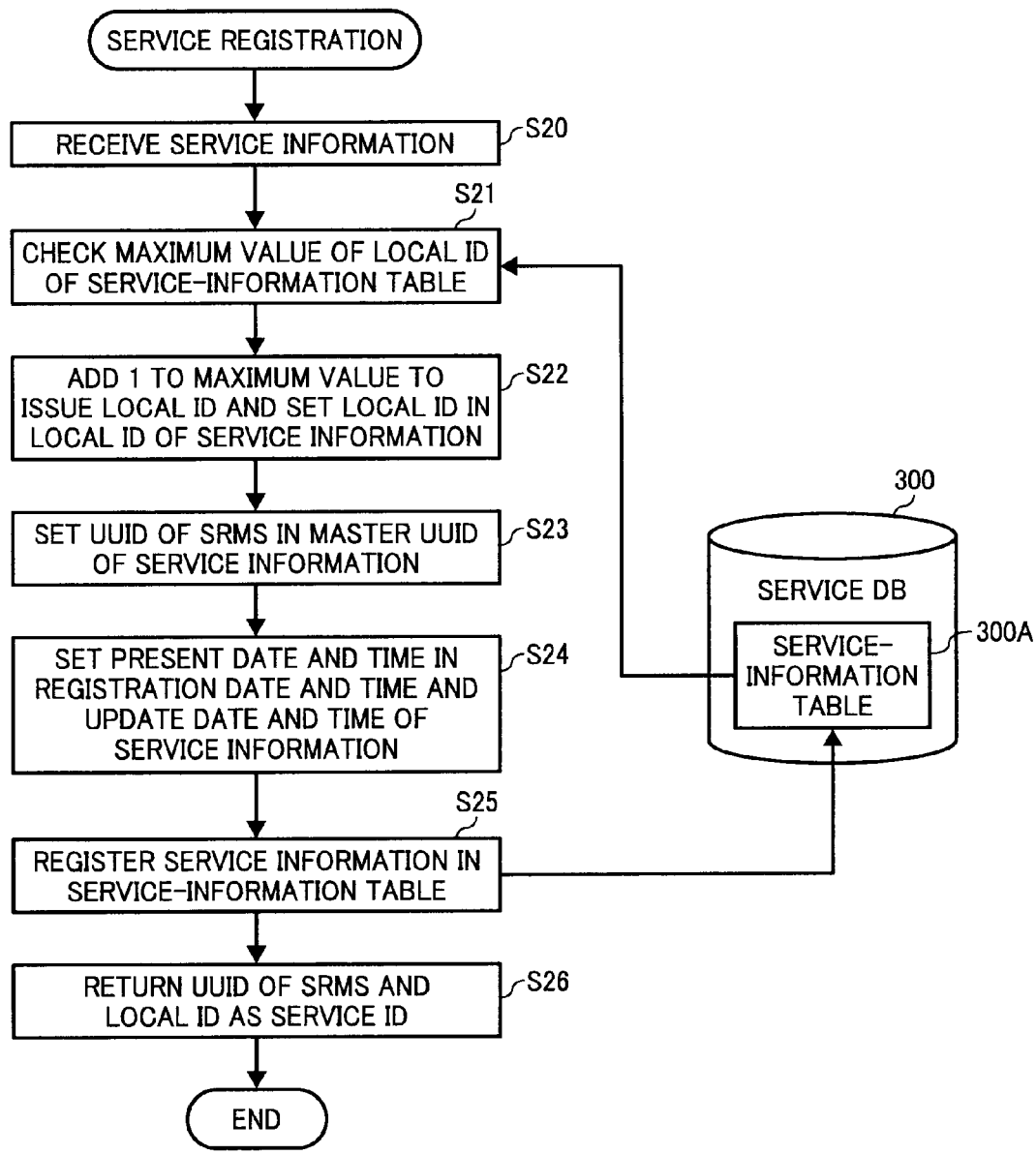
FIG. 19 is a flowchart of a procedure of service-registration processing realized by a service registration function according to the embodiment.

The service registration is a function of registering service information in the service-information table 300A stored in the service DB 300. FIG. 19 is a flowchart of a procedure of service-registration processing realized by the service registration function. First, the service-registration processing section SR20 receives service information from the client through the interface unit SR1 (Step S20). The service-information-registration processing section SR20 checks a maximum value of a local ID of service information stored in the service-information table 300A (Step S21). For example, when the maximum value is "10", the service-information-registration processing section SR20 issues "11" as a new local ID and sets "11" in a local ID of the received service information (Step S22). The service-information-registration processing section SR20 sets an UUID of the SRMS 200 including the processing section SR20 in a master UUID of the received service information (Step S23). As a result, a service ID, which is a combination of the UUID of the SRMS 200 and the local ID, is issued and associated with the service information. The UUID of the SRMS 200 has been issued during installation and stored in a storage device such as an HDD 18. The service-registration processing section SR20 acquires a present date and time using the timing function of the CPU 11 and sets the present date and time in a registration date and time and an update date and time of the received service information (Step S24). The service-information-registration processing section SR20 registers the service information, in which the respective kinds of information are set, in the service-information table 300A (Step S25). Subsequently, the service-registration processing section SR20 returns the UUID of the SRMS 200 and the issued service ID to the client as a request source through the interface unit SR1 (Step S26).

Figure 20:
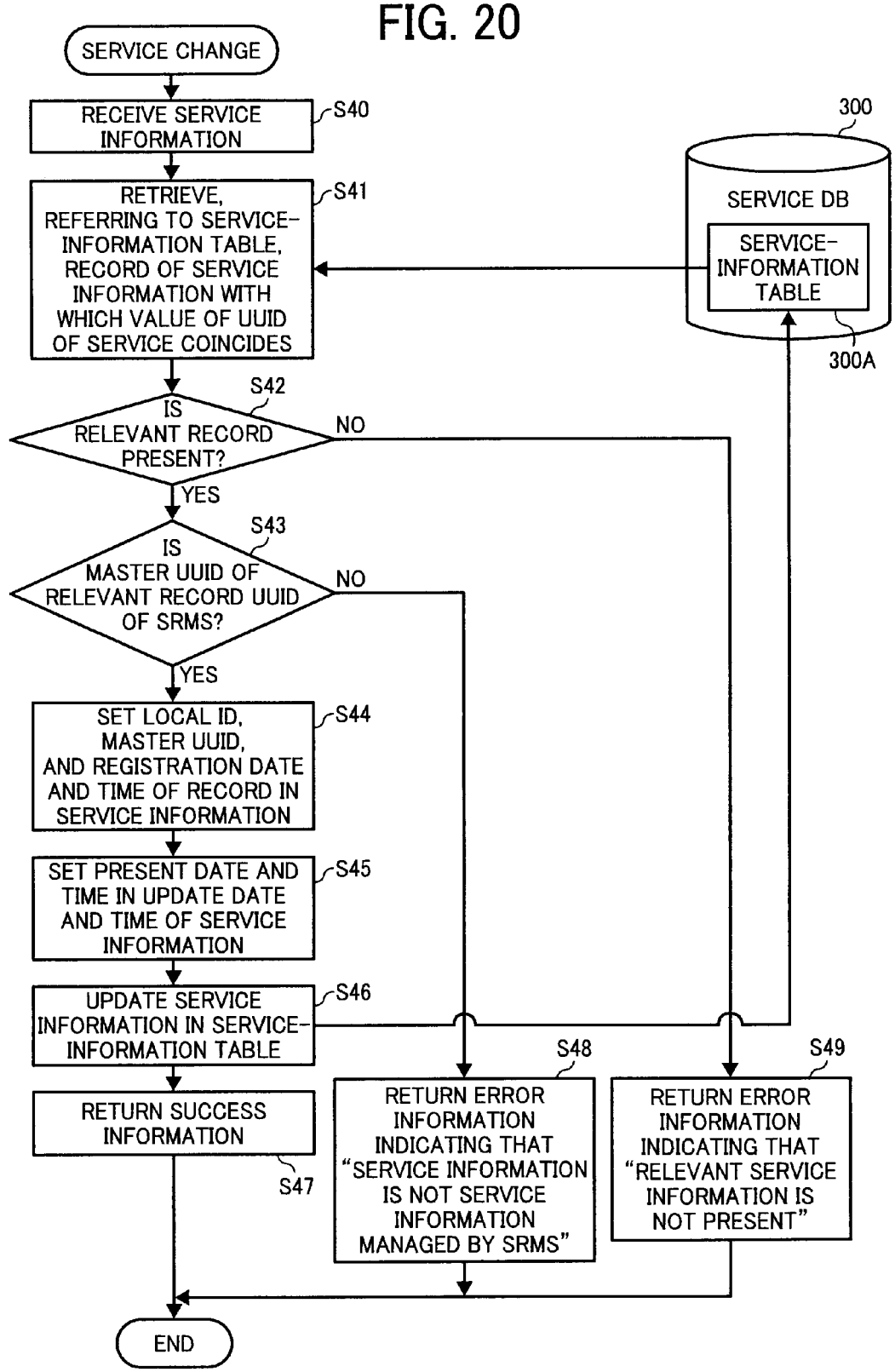
FIG. 20 is a flowchart of a procedure of service-change processing realized by a service change function according to the embodiment.

The service change is a function of changing service information registered in the service-information table 300A to new service information. FIG. 20 is a flowchart of a procedure of service-change processing realized by the service change function. The service-change processing section SR21 receives service information from the client through the interface of service change of the interface unit SR1 (Step S40). The service-change processing section SR21 retrieves, referring to the service-information table 300A, a record of service information with which a value of a UUID of a service of the received service information coincides (Step S41). When a relevant record is not present ("NO" at Step S42), the service-change processing section SR21 returns error information indicating that "designated service information is not present" to the client as a request source (Step S49). When a relevant record exists ("YES" at Step S42), the service-change processing section SR21 judges, referring to a value of a master UUID of the record, whether the value coincides with a value of the UUID of the SRMS 200 (Step S43). When the values of the UUIDs do not coincide with each other ("NO" at Step S43), because the relevant record is service information acquired from the SRMSs 200 of the other multifunction peripherals MFP by the synchronization function explained later, the service-change processing section SR21 of the SRMS 200 cannot change the service information. Therefore, the service-change processing section SR21 returns error information indicating that "the service information is not service information managed by the SRMS" to the client (Step S48). When the values of the UUIDs coincide with each other ("YES" at Step S43), the service-change processing section SR21 sets a local ID, the master UUID, and a registration date and time of the record in the received service information (Step S44). This is for the purpose of preventing the local ID, the master UUID, and the registration date and time from being changed. The service-change processing section SR21 acquires a present date and time using the timing function of the CPU 11 and sets the present date and time in an update date and time of the received service information (Step S45). The service-change processing section SR21 updates (overwrites) the service-information table 300A with the service information in which the respective kinds of information are set as explained above (Step S46). Subsequently, the service-change processing section SR21 returns information indicating success of the processing to the client through the interface unit SR1 (Step S47).

Figure 21:
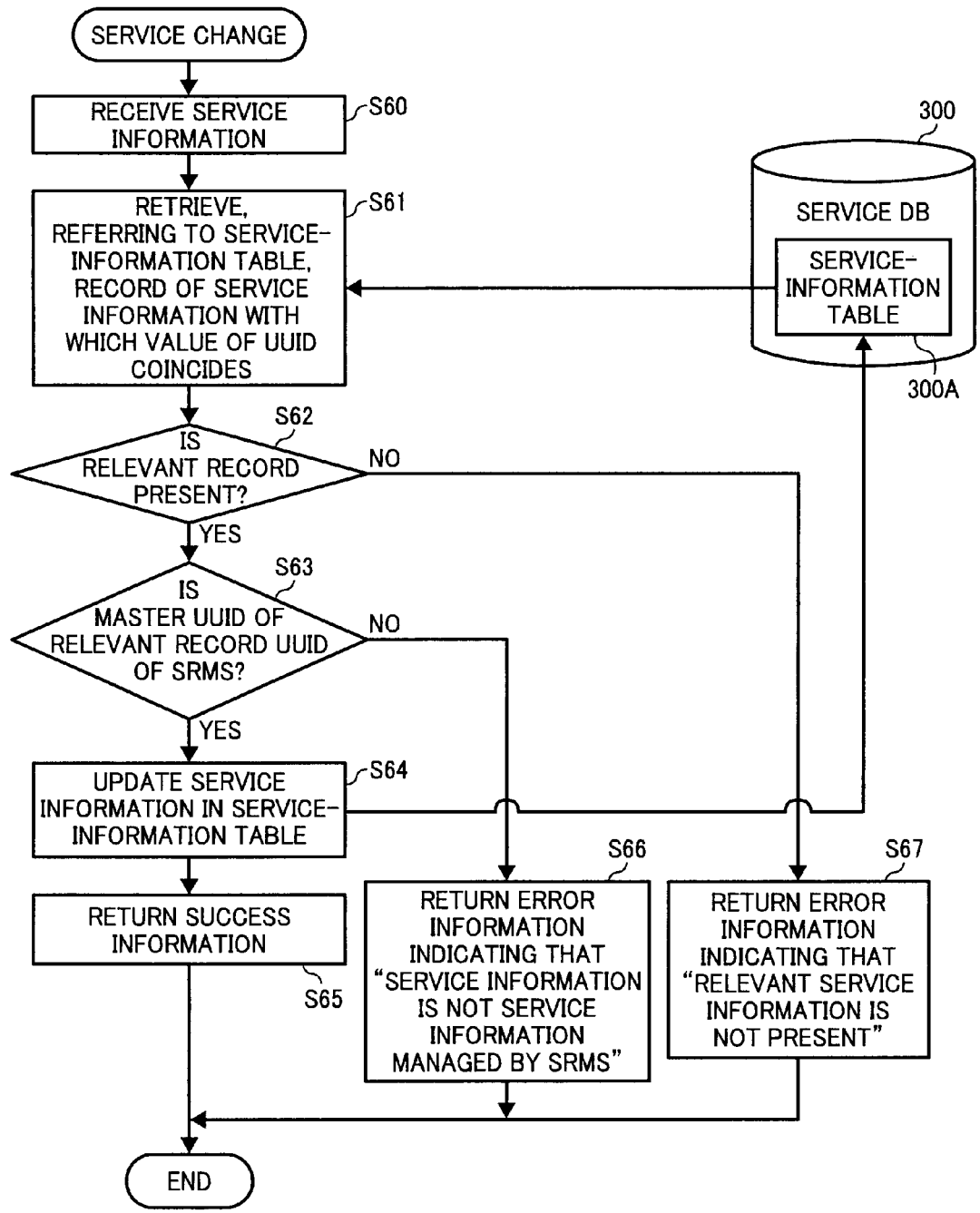
FIG. 21 is a flowchart of a procedure of service-deletion processing realized by a service deletion function according to the embodiment.

The service deletion is a function of deleting service information registered in the service-information table 300A. FIG. 21 is a flowchart of a procedure of service-deletion processing realized by the service deletion function. The service-deletion processing section SR22 receives a UUID of a deletion object service from the client through the interface unit SR1 (Step S60). The service-deletion processing section SR22 retrieves, referring to the service-information table 300A, a record of service information with which a value of the received UUID coincides (Step S61). When a relevant record is not present ("NO" at Step S62), the service-deletion processing section SR22 returns error information indicating that "designated service information is not present" to the client as a request source (Step S67). When the relevant record exists ("YES" at Step S62), the service-deletion processing section SR22 judges, referring to a master UUID of the relevant record, whether the master UUID coincides with a value of the UUID of the SRMS 200 (Step S63). When the values of the UUIDs do not coincide with each other ("NO" at Step S63), the service-deletion processing section SR22 returns error information indicating that "the service information is not service information managed by the SRMS" to the client (Step S66). When the values of the UUIDs coincide with each other ("YES" at Step S63), the service-deletion processing section SR22 deletes the record from the service-information table 300A (Step S64). Subsequently, the service-deletion processing section SR22 returns success information indicating success of the processing to the client through the interface unit SR1 (Step S65).

Figure 22:
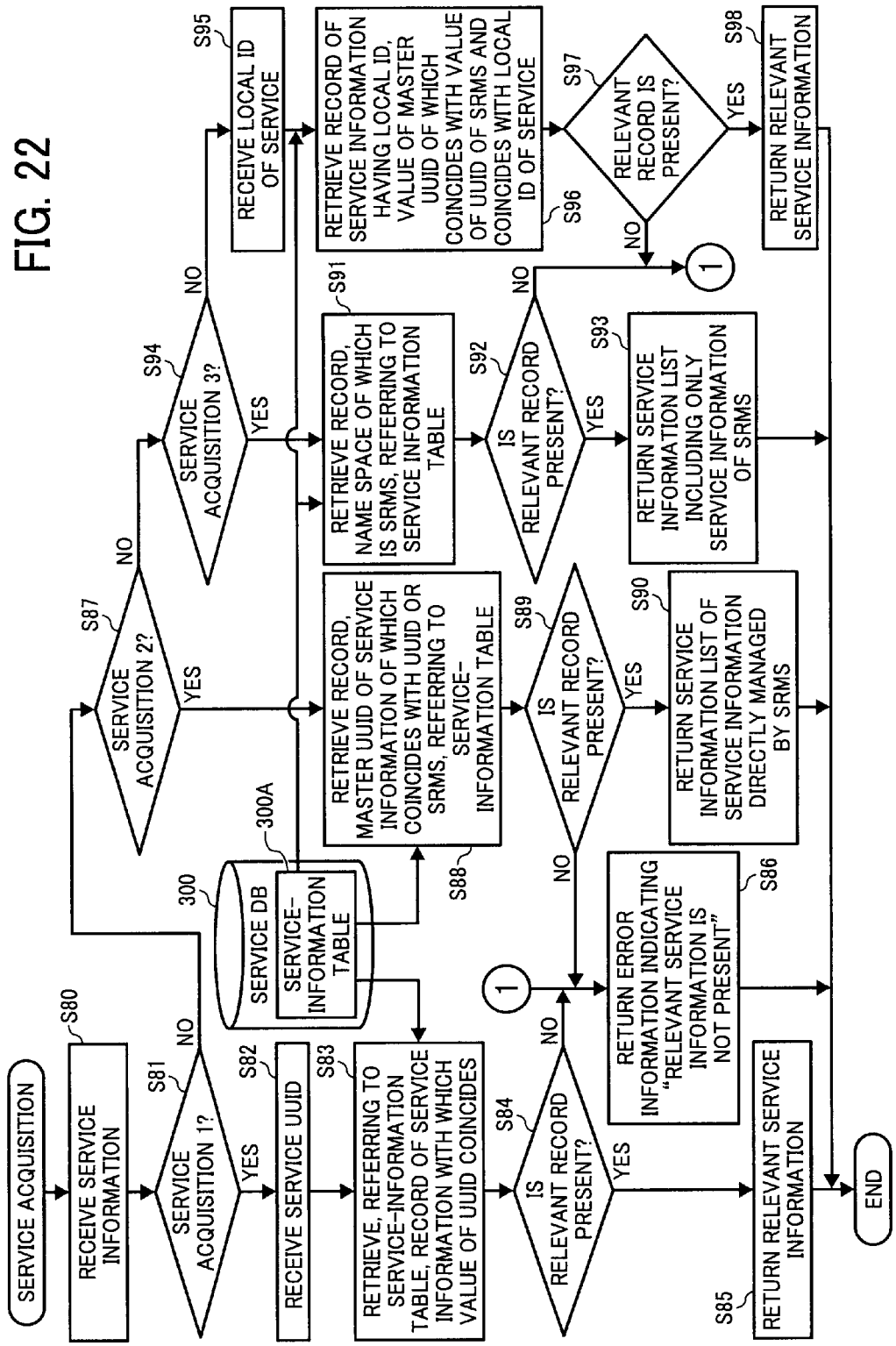
FIG. 22 is a flowchart of a procedure of a service-acquisition processing realized by a service acquisition function according to the embodiment.

The service acquisition is a function of acquiring service information registered in the service-information table 300A. The service acquisition function is subdivided into four interfaces. These interfaces are referred to as service acquisitions 1 to 4, respectively. The service acquisition 1 is a function of acquiring service information designating a UUID of a service of the service information that is an object to be acquired. The service acquisition 2 is a function of acquiring a list of service information directly managed by the SRMS 200 without designating a UUID of a service of the service information. It is possible to discriminate whether the SRMS 200 directly manages service information according to whether a master UUID of the service information coincides with a value of the UUID of the SRMS 200. The service acquisition 3 is a function of acquiring a list of only service information of the SRMS 200 in the service-information table 300A. The service acquisition 4 is a function of acquiring the service information directly managed by the SRMS 200 with designating a local ID. FIG. 22 is a flowchart of a procedure of service-acquisition processing realized by the service acquisition function. First, the service-acquisition processing section SR23 receives a service acquisition request from the client through the interface unit SR1 (Step S80). The service-acquisition processing section SR23 discriminates a type of the requested service acquisition (Steps S81 and S87). When the service acquisition request is a request for the service acquisition 1 ("YES" at Step S81), the service-acquisition processing section SR23 receives a UUID of a service of acquisition object service information (Step S82). The service-acquisition processing section SR23 retrieves, referring to the service-information table 300A, a record of service information with which a value of the received UUID coincides (Step S83). When a relevant record is not present ("NO" at Step S84), the service-acquisition processing section SR23 returns error information indicating that "relevant service information is not present" to the client as a request source (Step S86). When a relevant record exists ("YES" at Step S84), the service-acquisition processing section SR23 returns service information as the relevant record to the client through the interface unit sR1 (Step S85).

When the service acquisition request is a request for the service acquisition 2 ("NO" at Step S81 and "YES" at Step S87), unlike the case of the service acquisition 1, the service-acquisition processing section SR23 does not receive parameters such as the UUID of the service of the acquisition object service information. The service-acquisition processing section SR23 retrieves a record, a value of the master UUID of service information of which coincides with the value of the UUID of the SRMS 200, referring to the service-information table 300A (Step S88). When a relevant record is not present ("NO" at Step S89), the service-acquisition processing section SR23 returns error information indicating that "relevant service information is not present" to the client (Step S86). When relevant records are present ("YES" at Step S89), the service-acquisition processing section SR23 forms a list of the relevant records and returns the list to the client as a service information list through the interface unit SR1 (Step S90).

When the service acquisition request is a request for the service acquisition 3 ("NO" at Step S81, "NO" at Step S87 and "YES" at Step S94), unlike the case of the service acquisition 1, the service-acquisition processing section SR23 does not receive parameters such as the UUID of the service of the acquisition object service information. The service-acquisition processing section SR23 retrieves, referring to the service-information table 300A, a record indicating that a name space of service information is "SRMS" (e.g., jp.co.ricoh.srms) (Step S91). When a relevant record is not present ("NO" at Step S92), the service-acquisition processing section SR23 returns error information indicating that "relevant service information is not present" to the client as a request source (Step S86). When relevant records are present ("YES" at Step S92), the service-acquisition processing section SR23 forms a list of the relevant records and returns the list to the client as a service information list through the interface unit SR1 (Step S93).

When the service information acquisition request is a request for the service information acquisition 4 ("NO" at Step S81, "NO" at Step S87, and "NO" at Step S94), the service-acquisition processing unit SR23 receives a local ID of the acquisition object service information (Step S95). The service-acquisition processing unit SR23 retrieves a record of service information having a local ID, a value of a master UUID of which coincides with a value of the UUID of the SRMS 200 and coincides with the received local ID, among the pieces of service information stored in the service-information table 300A (Step S96). When a relevant record is not present ("NO" at Step S97), the service-acquisition processing unit SR23 returns error information indicating that "relevant service information is not present" (Step S86). When a relevant record is present ("YES" at Step S97), the service-acquisition processing unit SR23 returns service information as the relevant record to the client via the interface unit SR1 (Step S98).

Figure 23:
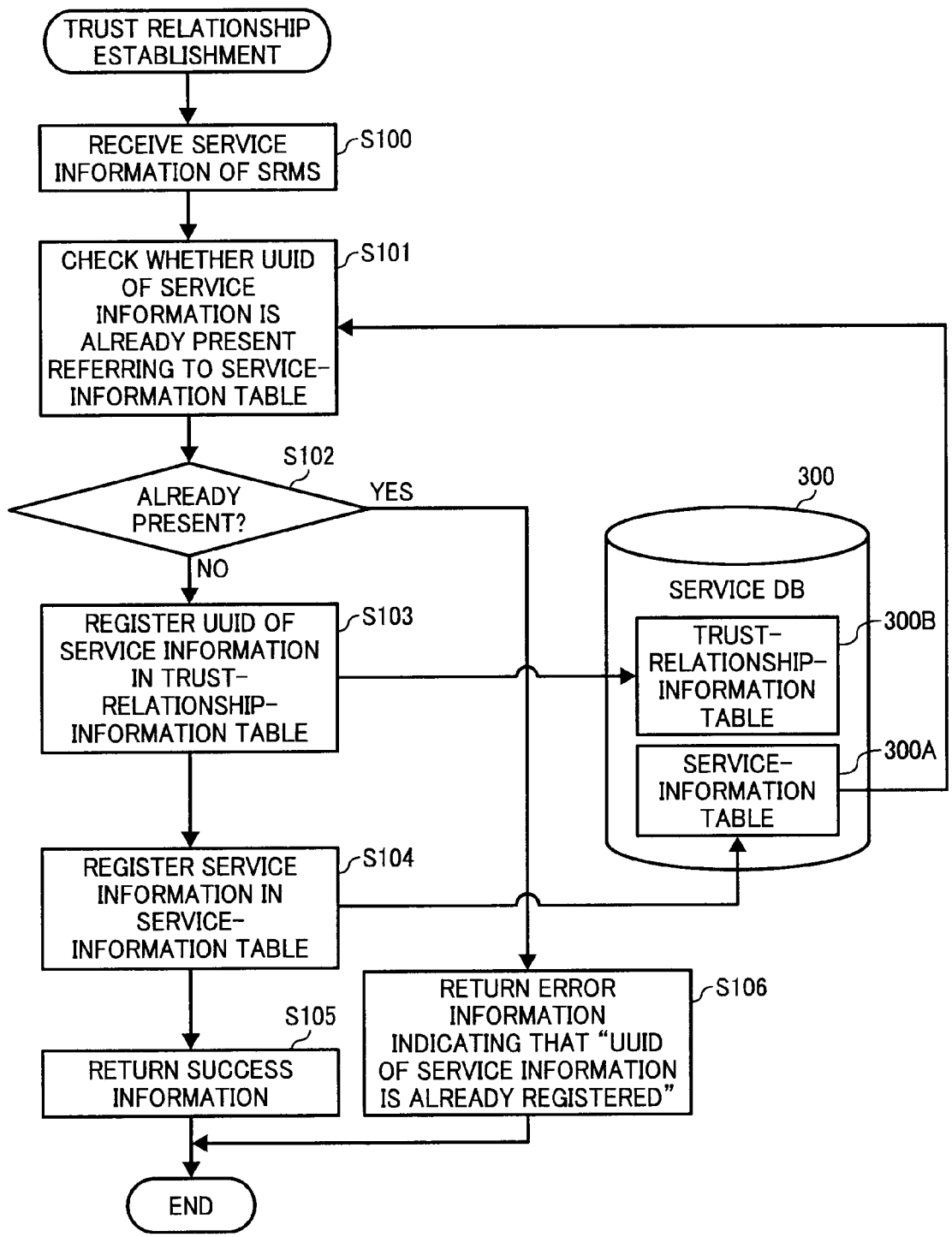
FIG. 23 is a flowchart of a procedure of trust relationship establishment processing realized by a trust relationship establishment function according to the embodiment.

The trust relationship establishment is a function of registering services managed by the SRMSs 200 of the other server SV, which form a trust relationship with the SRMS 200 of the server SV, in the service-information table 300A of the server SV. Specifically, forming a trust relationship means that the SRMS 200 exchanges service information with the other SRMSs 200 and forms a relationship capable of synchronizing service information with the other SRMSs 200. FIG. 23 is a flowchart of a procedure of trust relationship establishing processing realized by the trust relationship establishment function. First, the trust-relationship-establishment processing section SR24 receives a trust relationship establishment request from the client through the interface unit SR1 and receives service information of the other SRMSs 200 with which the SRMS 200 forms a trust relationship (Step S100). The trust-relationship-establishment processing section SR24 judges, referring to the service-information table 300A and referring to a UUID of a service of the service information, whether a value of the UUID is already present in the trust-relationship-information table 300B (Step S101). When a value of a relevant UUID is already present ("YES" at Step S102), the trust-relationship-establishment processing section SR24 returns error information indicating that the "a value of the UUID is already registered" to the client as a request source (Step S106). When a value of a relevant UUID is not present ("NO" at Step S102), the trust-relationship-establishment processing section SR24 registers the value of the relevant UUID in the trust-relationship-information table 300B (Step S103). The trust-relationship-establishment processing section SR24 registers service information having the relevant UUID in the service-information table 300A (Step S104). This is because it is necessary to refer to service information of a synchronization object SRMS 200 in synchronization processing explained later. Subsequently, the trust-relationship-establishment processing section SR24 returns success information indicating success of the processing to the client through the interface unit SR1 (Step S105).

In the image processing system shown in FIG. 1, it is assumed that the servers SV connected by dotted lines form a trust relationship. For example, the server SV1 forms a trust relationship with the server SV2. The server SV2 forms a trust relationship with the server SV1 and the server SV4. The server SV3 forms a trust relationship with the server SV4. The server SV4 forms a trust relationship with the server SV2 and the server SV3.

FIGS. 24 to 27 are diagrams of states of the service-information tables 300A_1, 300A_2, 300A_3, and 300A_4 held by the servers SV1 to SV4, respectively, when there are the trust relationships described above in the image processing system. The server SV1 forms the trust relationship with the server SV2, service information of an SRMS 200_2 of the server SV2 and service information of a PIDS 201_3, an EIDS 202_3, a PIDS 201_4, and an EIDS 202_4 directly managed by the SRMS 200_2 are stored in the service-information table 300A_1 in addition to service information of an SRMS 200_1, the PIDS 201_1, the EIDS 202_1, a PIDS 201_2, and an EIDS 202_2 directly managed by the SRMS 200_1. Because the server SV2 forms the trust relationship with the server SV1 and the server SV4, the service information of the SRMS 200_1 of the server SV1, the service information of the PIDS 201_1, the EIDS202_1, the PIDS 201_2, and the EIDS 202_2 directly managed by the SRMS 200_1, service information of an SRMS 200_4 of the server SV4, and service information of a PIDS 201_7, an EIDS 202_7, a PIDS 201_8, and an EIDS 202_8 directly managed by the SRMS 200_4 are stored in the service-information table 300A_2 in addition to the service information of the SRMS 200_2, the PIDS 201_3, the EIDS 202_3, the PIDS 201_4, and the EIDS 202_4 directly managed by the SRMS 200_2. Because the server SV3 forms the trust relationship with the server SV4, the service information of the SRMS 200_4 of the server SV1 and the service information of the PIDS 201_7, the EIDS 202_7, the PIDS 201_8, and the EIDS 202_8 directly managed by the SRMS 200_4 are stored in the service-information table 300A_3, in addition to service information of an SRMS 200_3, the PIDS 201_5, an EIDS 202_5, a PIDS 201_6, and an EIDS 202_6 directly managed by the SRMS 200_3. Because the server SV4 forms the trust relationship with the server SV2 and the server SV3, the service information of the SRMS 200_2 of the server SV2, the service information of the PIDS 201_3, the EIDS 202_3, the PIDS 201_4, the EIDS 202_4 directly managed by the SRMS 200_2, the service information of the SRMS 200_3 of the server SV3, and the service information of the PIDS 201_5, the EIDS 202_5, the PIDS 201_6, and the EIDS 202_6 directly managed by the SRMS 200_3 are stored in the service-information table 300A_4 in addition to the SRMS 200_4, the PIDS 201_7, the EIDS 202_7, the PIDS 201_8, and the EIDS 202 8 directly managed by the SRMS 200_4.

As explained above, in the service-information table 300A, other than service information directly managed by the SRMSs 200 in the same server SV, service information directly managed by the SRMSs 200 of the other server SV that form a trust relationship with the server SV are stored. Acquisition of service information directly managed by the other SRMSs 200 is realized by the synchronization function explained later. Consequently, the server SV can retrieve, using a function of the scan application 101 explained later, relevant service information out of not only the service information directly managed by the SRMS 200 of the server SV but also the service information directly managed by the SRMSs 200 of the other server SV and reach an electronic document as a print source using the service information.

Figure 28:
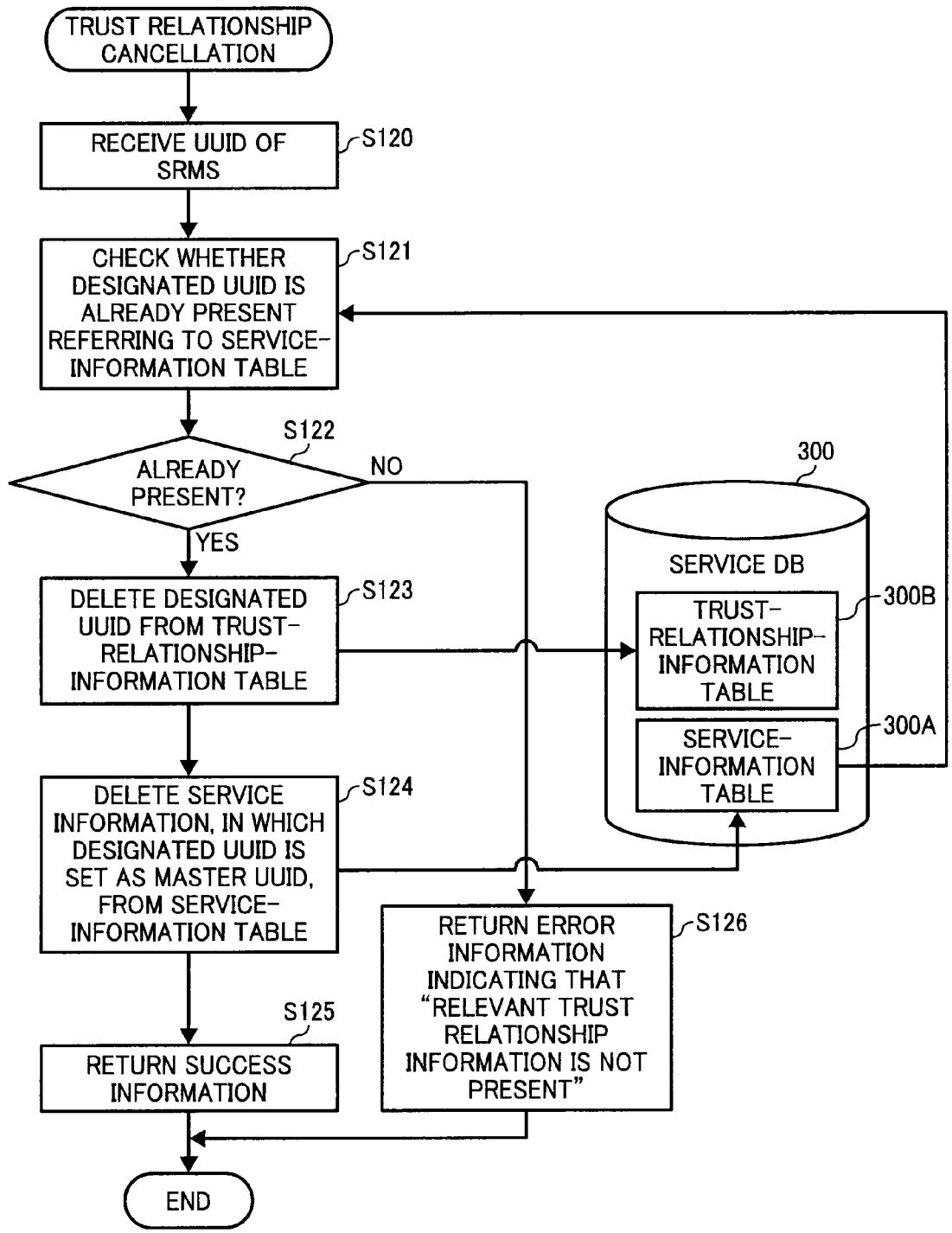
FIG. 28 is a flowchart of a procedure of trust relationship cancellation processing realized by a trust relationship cancellation function according to the embodiment.

The trust relationship cancellation is a function of canceling a trust relationship already formed with the other server SV. Canceling a trust relationship means deleting trust relationship information of the SRMSs 200 of the other server SV registered in the trust-relationship-information table 300B. FIG. 28 is a flowchart indicating a procedure of trust relationship cancellation processing realized by the trust relationship cancellation function. First, the trust-relationship-cancellation processing section SR25 receives a UUID of the SRMS 200, trust relationship information of which is deleted, from the client through the interface unit SR1 (Step S120). The trust-relationship-cancellation processing section SR25 judges whether a value of the received UUID exists in the trust-relationship-information table 300B (Step S121). When a value of a relevant UUID is not present ("NO" at Step S122), the trust-relationship-cancellation processing section SR25 returns error information indicating that "relevant trust relationship information is not present" to the client as a request source (Step S126). When a value of a relevant UUID exists ("YES" at Step S122), the value of the relevant UUID is equivalent to the trust relationship information, the trust-relationship-cancellation processing section SR25 deletes the value of the UUID from the trust-relationship-information table 300B (Step S123). Moreover, the trust-relationship-cancellation processing section SR25 deletes all kinds of service information, values of master UUIDs of which coincide with the value of the UUID of a service, from the service-information table 300A (Step S124). Subsequently, the trust-relationship-cancellation processing section SR25 returns success information indicating success of the processing to the client through the interface unit SR1 (Step S125).

Figure 29:
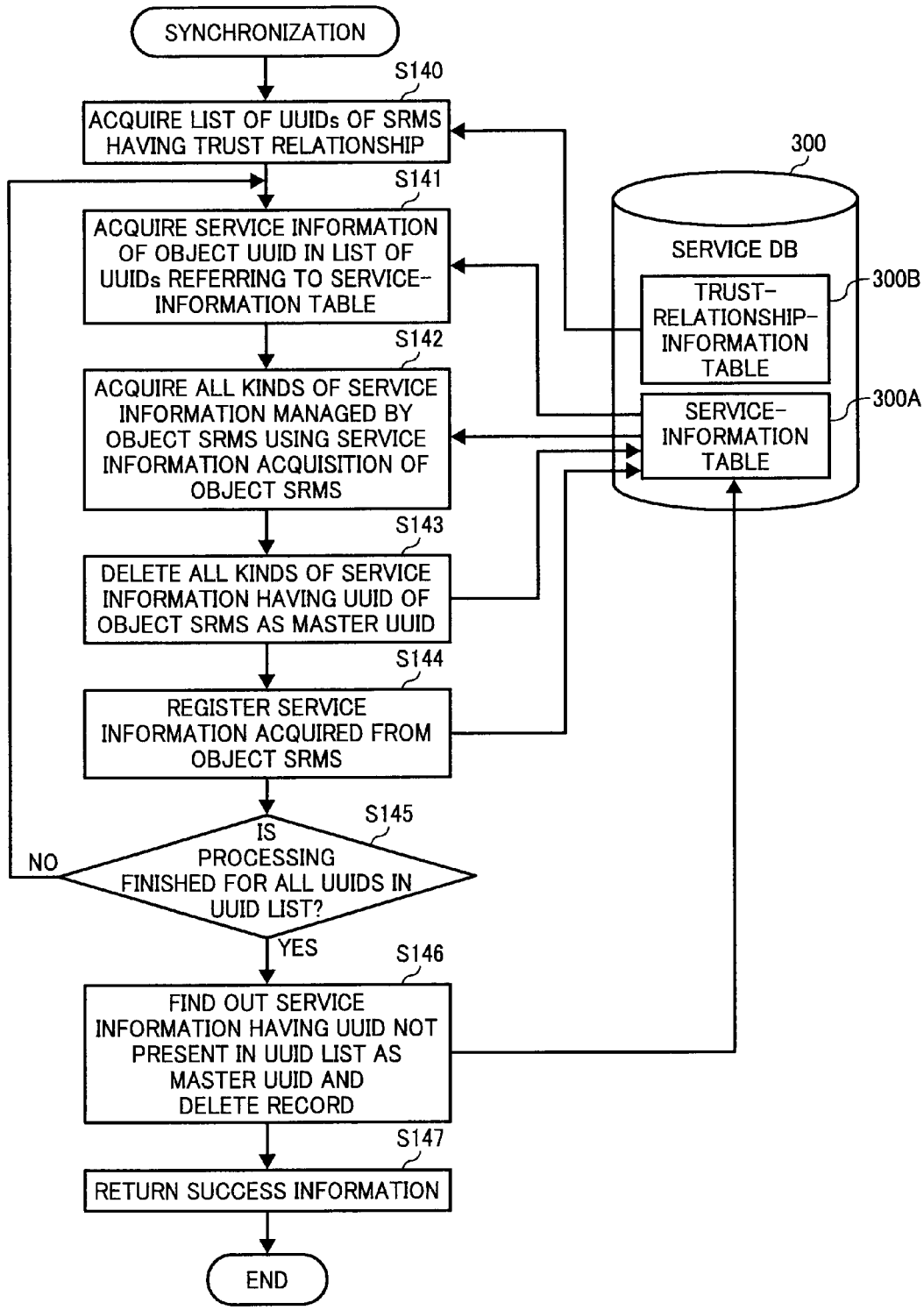
FIG. 29 is a flowchart of a procedure of synchronization processing realized by a synchronization function according to the embodiment.

The synchronization is a function of exchanging service information with the SRMSs 200 of the other server SV with which the multifunction peripheral MFP forms a trust relationship, i.e., the SRMSs 200 of the other server SV, UUIDs of which are registered in the trust-relationship-information table 300B, and synchronizing the service information. FIG. 29 is a flowchart of a procedure of synchronization processing realized by the synchronization function. The synchronization processing section SR26 does not receive parameters such as a UUID of a service of service information to be synchronized. The synchronization processing section SR26 receives, referring to the trust-relationship-information table 300B, a list of UUIDs (a UUID list) of the SRMSs 200 of the other multifunction peripherals MFP with which the multifunction peripheral MFP forms a trust relationship (Step S140). The synchronization processing section SR26 applies processing explained below to each of all the UUIDs in the list. First, the synchronization processing section SR26 acquires a UUID of processing object service information referring to the service-information table 300A (Step S141). The synchronization processing section SR26 accesses the URI referring to a URI of the service information to thereby make connection to the other SRMSs 200 as synchronization objects. The synchronization processing section SR26 acquires the list of service information directly managed by the other SRMSs 200 as the synchronization objects using the service acquisition function in the other SRMSs 200 as the synchronization objects (Step S142). Subsequently, the synchronization processing section SR26 deletes all kinds of service information, values of master UUIDs of which coincide with a value of the UUID of the processing object service information, from the service-information table 300A (Step S143). The synchronization processing section SR26 registers all the kinds of service information present in the list acquired from the other SRMSs 200 as the synchronization objects in the service-information table 300A (Step S144). The synchronization processing section SR26 applies the processing at Steps S141 to S144 to all the UUIDs present in the UUID list. When the processing is finished for all the UUIDs present in the UUID list ("YES" at Step S145), the synchronization processing section SR26 retrieves service information having a master UUID that coincides with a value of a UUID not present in the UUID list from the service-information table 300A and deletes the service information from the service-information table 300A (Step S146). Consequently, the service information of the other SRMSs 200, a trust relationship of which is canceled, is deleted from the service-information table 300A. Finally, the synchronization processing section SR26 returns success information indicating success of the processing to the client as a request source through the interface unit SR1 (Step S147).

Figure 30:
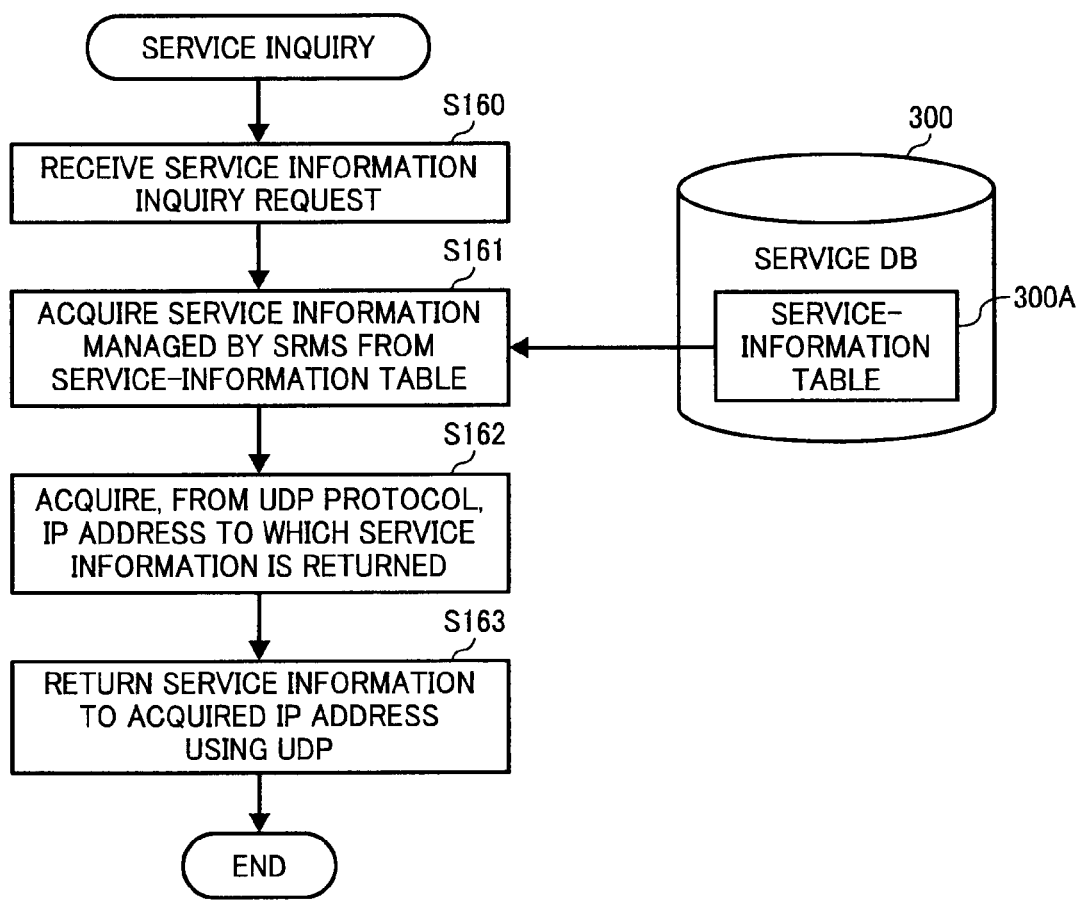
FIG. 30 is a flowchart of a procedure of service-inquiry processing realized by a service inquiry function according to the embodiment.

The service inquiry is a function of receiving inquiries about service information from the other SRMSs 200 and returning the service information to the other SRMSs 200. FIG. 30 is a flowchart of a procedure of service-inquiry processing realized by the service inquiry function. In the service inquiry, data communication is performed by using the UDP instead of the Web service. The data communication performed by using the UDP is known. Therefore, explanation of a detailed procedure of the data communication is omitted. In a procedure explained below, the SRMS 200 of the multifunction peripheral MFP performs data communication with a client same as that in the data communication performed by using the Web service and performs processing.

The service-inquiry processing section SR28 receives a service inquiry request from the client with the UDP (Step S160). The service-inquiry processing section SR28 starts the processing. Parameters used for the processing are not included in the service inquiry request. An IP address of the client as a request source is included in the service inquiry request. Subsequently, the service-inquiry processing section SR28 acquires service information of the SRMS 200 referring to the service-information table 300A (Step S161). The service-inquiry processing section SR28 acquires the IP address included in the service inquiry request (Step S162) and returns the service information to the IP address with the UDP (Step S163). Consequently, the SRMSs 200 of the other multifunction peripherals MFP as request sources can acquire the service information of the SRMS 200.

Figure 31:
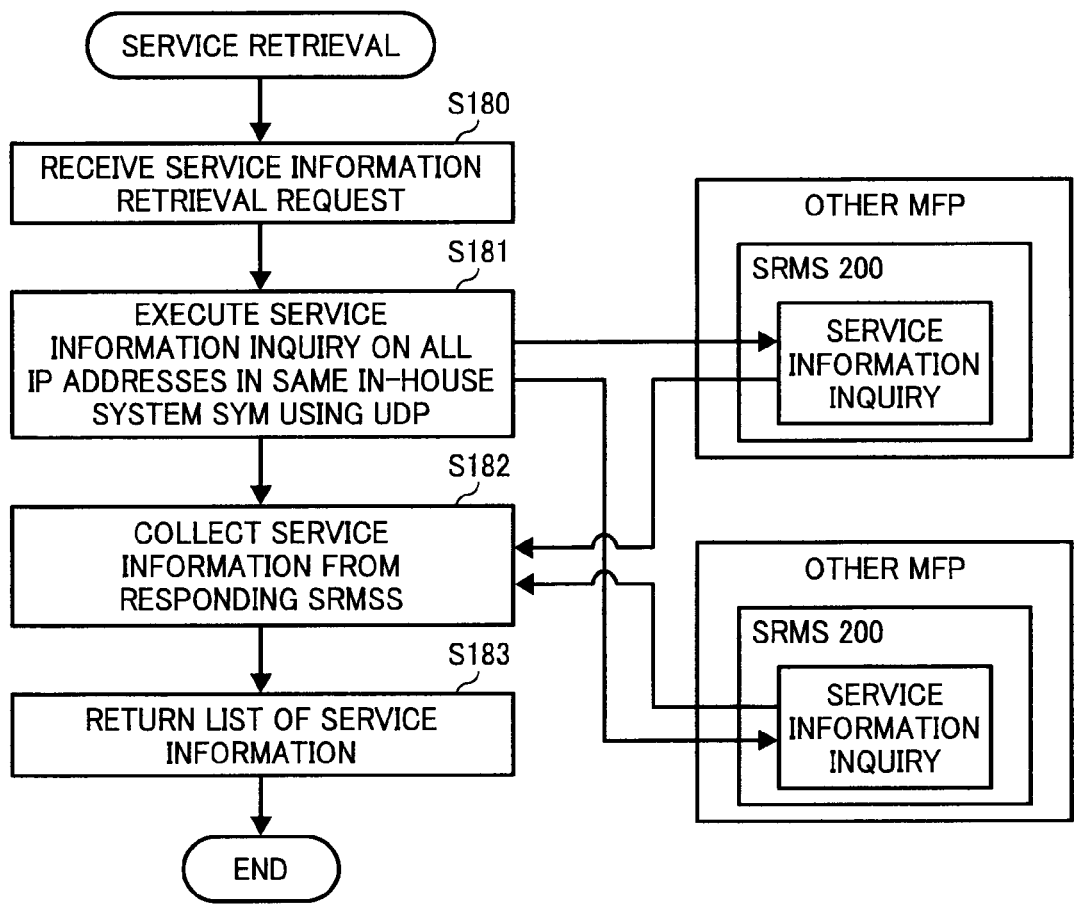
FIG. 31 is a flowchart of a procedure of service-retrieval processing realized by a service retrieval function according to the embodiment.

The service retrieval is a function of inquiring the other SRMSs 200 about service information and acquiring service information of the other SRMSs 200. FIG. 31 is a flowchart of a procedure of service-retrieval processing realized by the service retrieval function.

The service-retrieval processing section SR27 receives a service retrieval request from the client using the UDP (Step S180) and starts the processing. Subsequently, the service-retrieval processing unit SR27 transmits a UDP packet to IP addresses of all the servers SV in the image processing system using the UDP. On the other hand, the SRMS 200 of the server SV receives the server inquiry request, performs the service inquiry processing, and returns the service information managed by the SRMS 200 to the SRMS 200. In the example shown in FIG. 22, the service information is returned to the SRMS 200 from two other SRMSs 200. The service-retrieval processing unit SR27 forms a list of the service information collected from the other SRMS 200 and returns the list of the service information to the client as the request source as a service information list (Step S183). Consequently, even when the server SV has not trust relationship with any other servers SV and the service information directly managed by the other SRMSs 200 is not stored in the service-information table 300A of the server SV, the server SV can acquire the service information managed by the SRMSs 200 of the other servers SV according to the service retrieval function.

Figure 32:
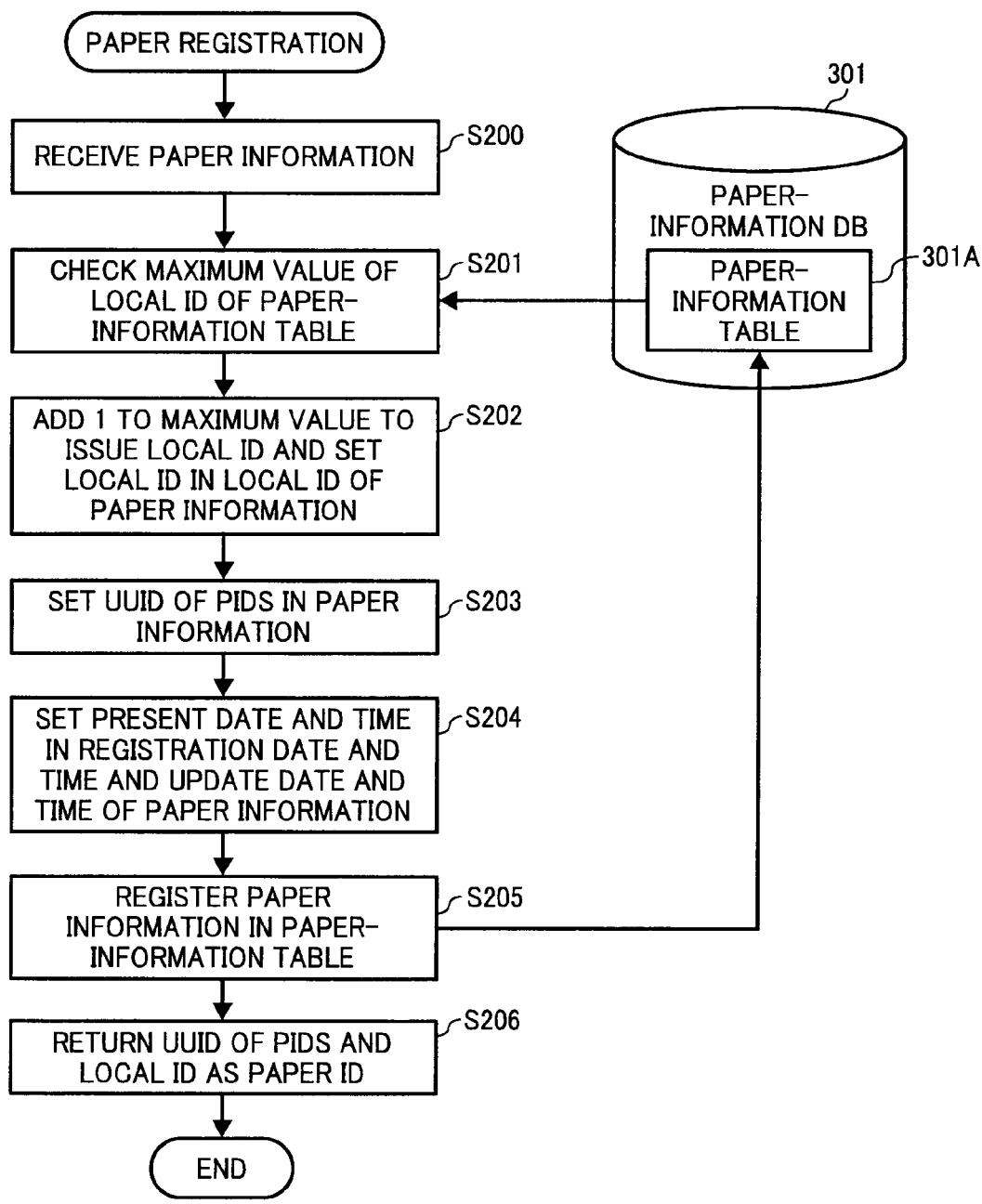
FIG. 32 is a flowchart of a procedure of paper-registration processing realized by a paper registration function according to the embodiment.

The paper registration is a function of registering paper information in the paper-information table 301A of the paper-information DB 301. FIG. 32 is a flowchart of a procedure of paper-registration processing realized by the paper registration function. The paper-registration processing section PI20 receives paper information from the client through the interface unit PI1 (Step S200). The paper-registration processing section PI20 checks a maximum value of a local ID of paper information stored in the paper-information table 301A (Step S201). For example, when the maximum value is "10", the paper-registration processing section PI20 issues "11" as a new local ID and sets "11" in a local ID of the received paper information (Step S202). Subsequently, the paper-registration processing section PI20 sets a value of a UUID of the PIDS201 in the received paper information (Step S203). The paper-registration processing section PI20 acquires a present date and time using the timing function of the CPU 11 and sets the present date and time in a registration date and time and an update date and time of the received paper information (Step S204). The paper ID is associated with the paper information. The paper-registration processing section PI20 registers the paper information, in which the respective kinds of information are set, in the paper-information table 301A (Step S205). Finally, the paper-registration processing section PI20 returns, as the paper ID, the combination of the UUID of the PIDS 201 and the local ID to the client as a request source through the interface unit PI1 (Step S206).

Figure 33:
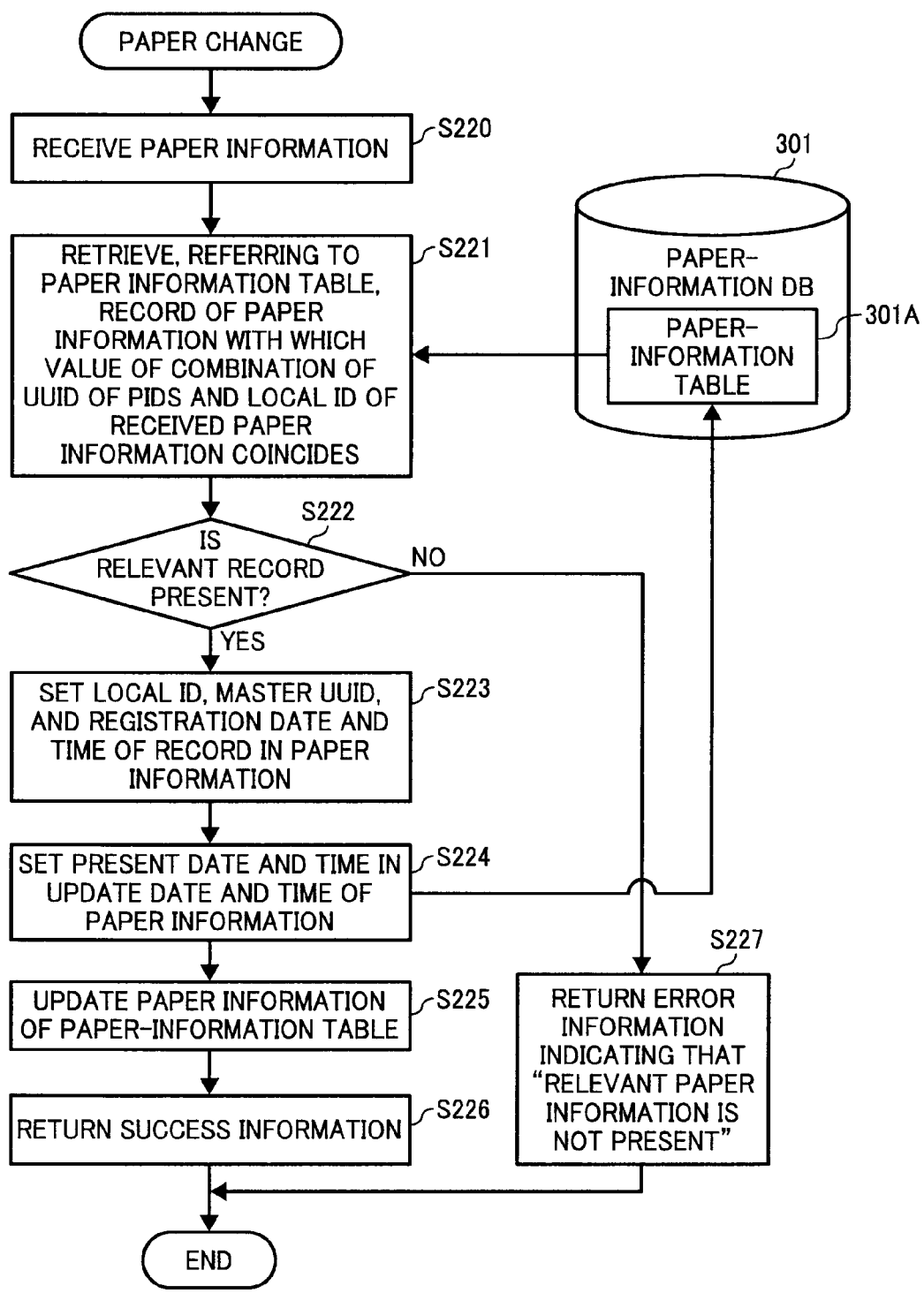
FIG. 33 is a flowchart of a procedure of paper-change processing realized by a paper change function according to the embodiment.

The paper change is a function of changing paper information registered in the paper-information table 301A to new paper information. FIG. 33 is a flowchart of a procedure of paper-change processing realized by the paper change function. First, the paper-change processing section PI21 receives paper information from the client through the interface unit PI1 (Step S220). The paper-change processing section PI21 retrieves, referring to the paper-information table 301A, a record of paper information with which a value of a combination (a paper ID) of a UUID of the PIDS 201 and a local ID of the received paper information coincides (Step S221). When a relevant record is not present ("NO" at Step S222), the paper-change processing section PI21 returns error information indicating that "relevant paper information is not present" to the client as a request source (Step S227). When a relevant record exists ("YES" at Step S222), the paper-change processing section PI21 sets a registration date and time, a local ID, and a master UUID, which are set in the record, in the received paper information (Step S223). The paper-change processing section PI21 acquires a present date and time using the timing function of the CPU 11 and sets the present date and time in an update date and time of the received paper information (Step S224). The paper-change processing section PI21 updates (overwrites) the paper-information table with the paper information in which the respective kinds of information are set as explained above (Step S225). Subsequently, the paper-change processing section PI21 returns information indicating success of the processing to the client as a request source through the interface unit PI1 (Step S226).

Figure 34:
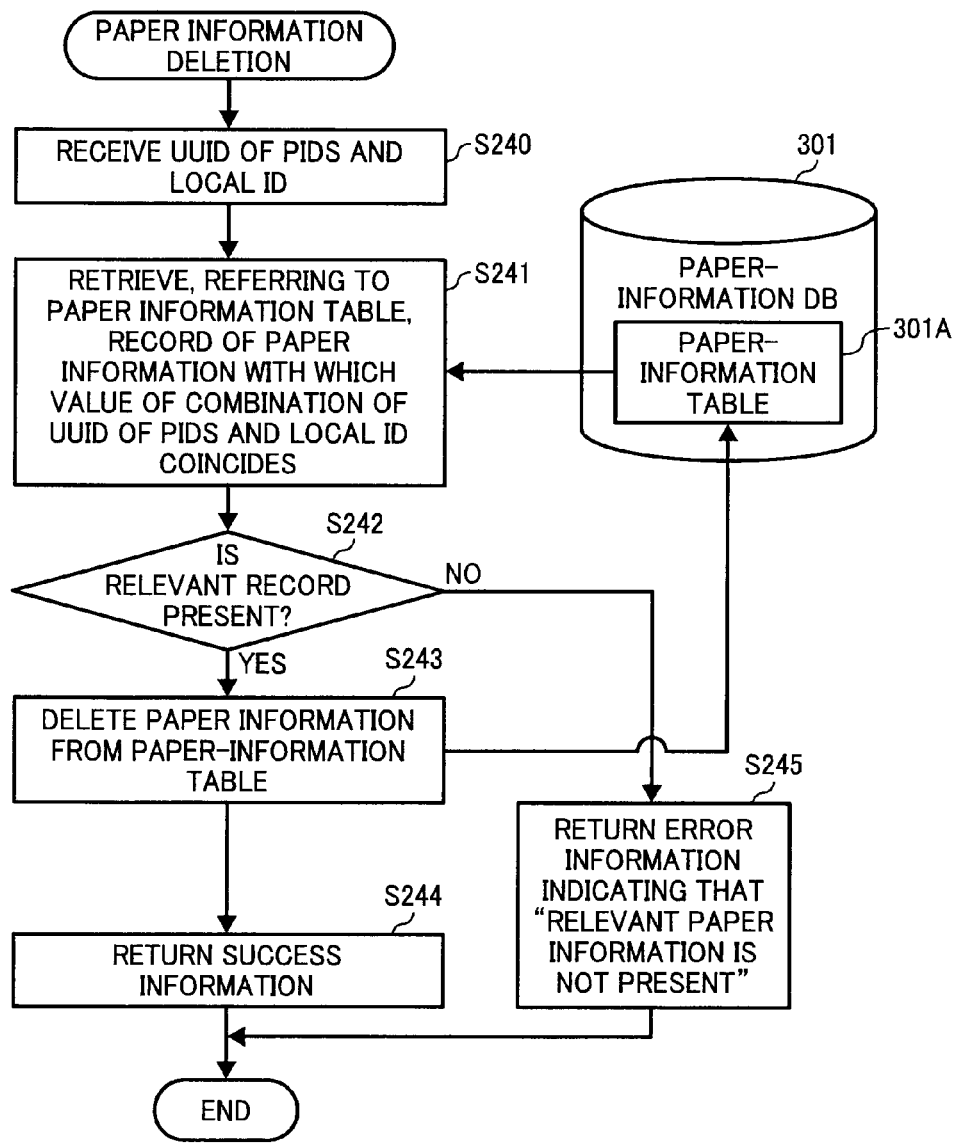
FIG. 34 is a flowchart of a procedure of paper-deletion processing realized by a paper deletion function according to the embodiment.

The paper deletion is a function of deleting paper information registered in the paper-information table 301A. FIG. 34 is a flowchart showing a procedure of paper-deletion processing realized by the paper deletion function. First, the paper-deletion processing section PI22 receives a combination (a paper ID) of a UUID of the PIDS 201 and a local ID concerning deletion object paper information from the client through the interface unit PI1 (Step S240). The paper-deletion processing section PI22 retrieves, referring to the paper-information table 301A, a record of paper information with which a value of the received combination (paper ID) of the UUID of the PIDS 201 and the local ID of the paper information coincides (Step S241). When a relevant record is not present ("NO" at Step S242), the paper-deletion processing section PI22 returns error information indicating that "relevant paper information is not present" to the client as a request source (Step S245). When a relevant record exists ("YES" at Step S242), the paper-deletion processing section PI22 deletes the record from the paper-information table 301A (Step S243). Subsequently, the paper-deletion processing section PI22 returns success information indicating success of the processing to the client through the interface unit PI1 (Step S244).

Figure 35:
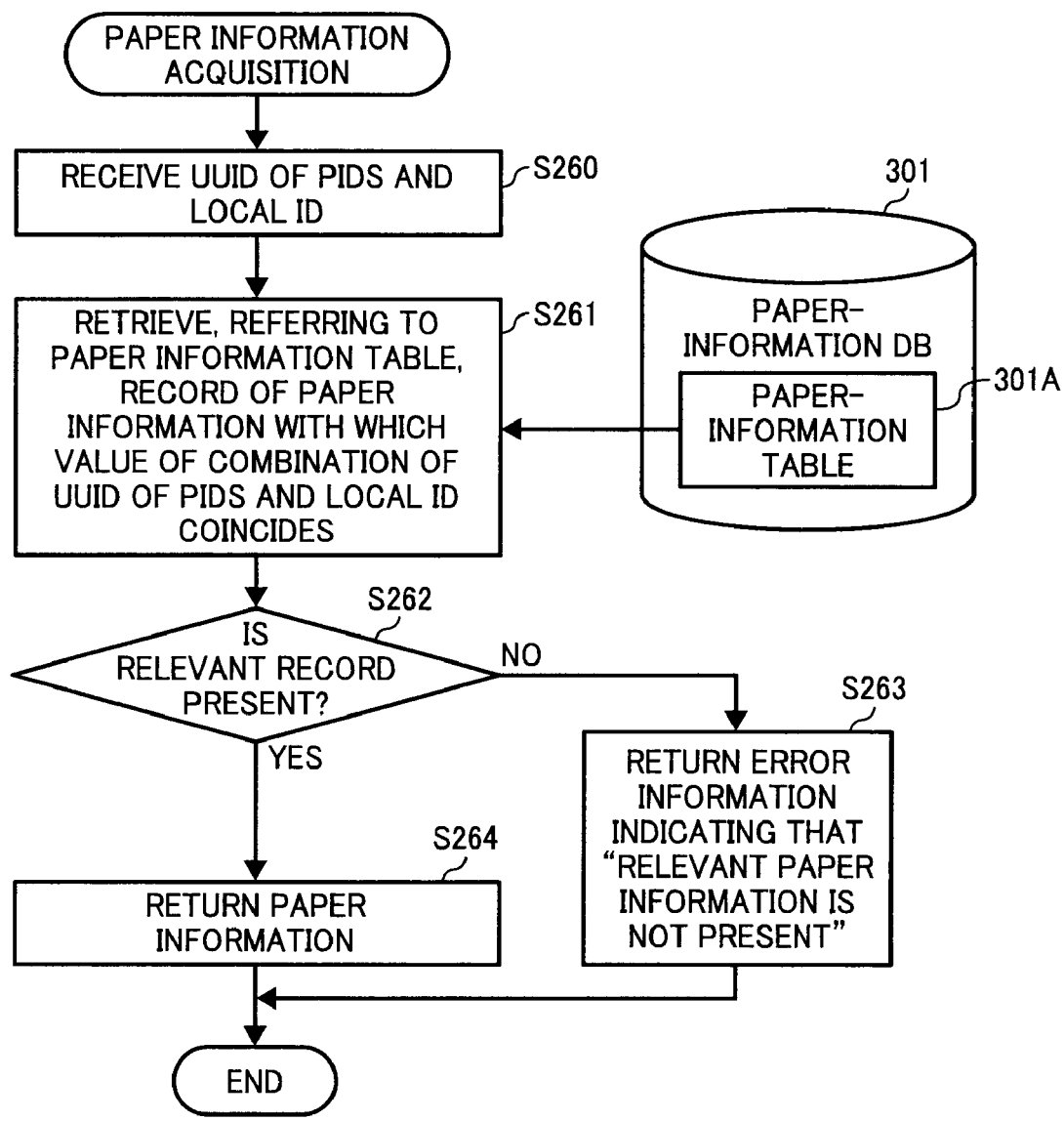
FIG. 35 is a flowchart of a procedure of paper-acquisition processing realized by a paper acquisition function according to the embodiment.

The paper acquisition is a function of acquiring paper information registered in the paper-information table 301A. FIG. 35 is a flowchart of a procedure of paper acquiring processing realized by the paper acquisition function. First, the paper-acquisition processing section PI23 receives a combination (a paper ID) of a UUID of the PIDS 201 and a local ID concerning acquisition object paper information from the client through the interface unit PI1 together with a paper acquisition request (Step S260). The paper-acquisition processing section PI23 retrieves, referring to the paper-information table 301A, a record of paper information with which a value of the received combination (paper ID) of the UUID of the PIDS 201 and the local ID coincides (Step S261). When a relevant record is not present ("NO" at Step S262), the paper-acquisition processing section PI23 returns error information indicating that "relevant paper information is not present" to the client as a request source (Step S264). When a relevant record exists ("YES" at Step S262), the paper-acquisition processing section PI23 returns the paper information as the relevant record to the client through the interface unit PI1 (Step S263).

Figure 36:
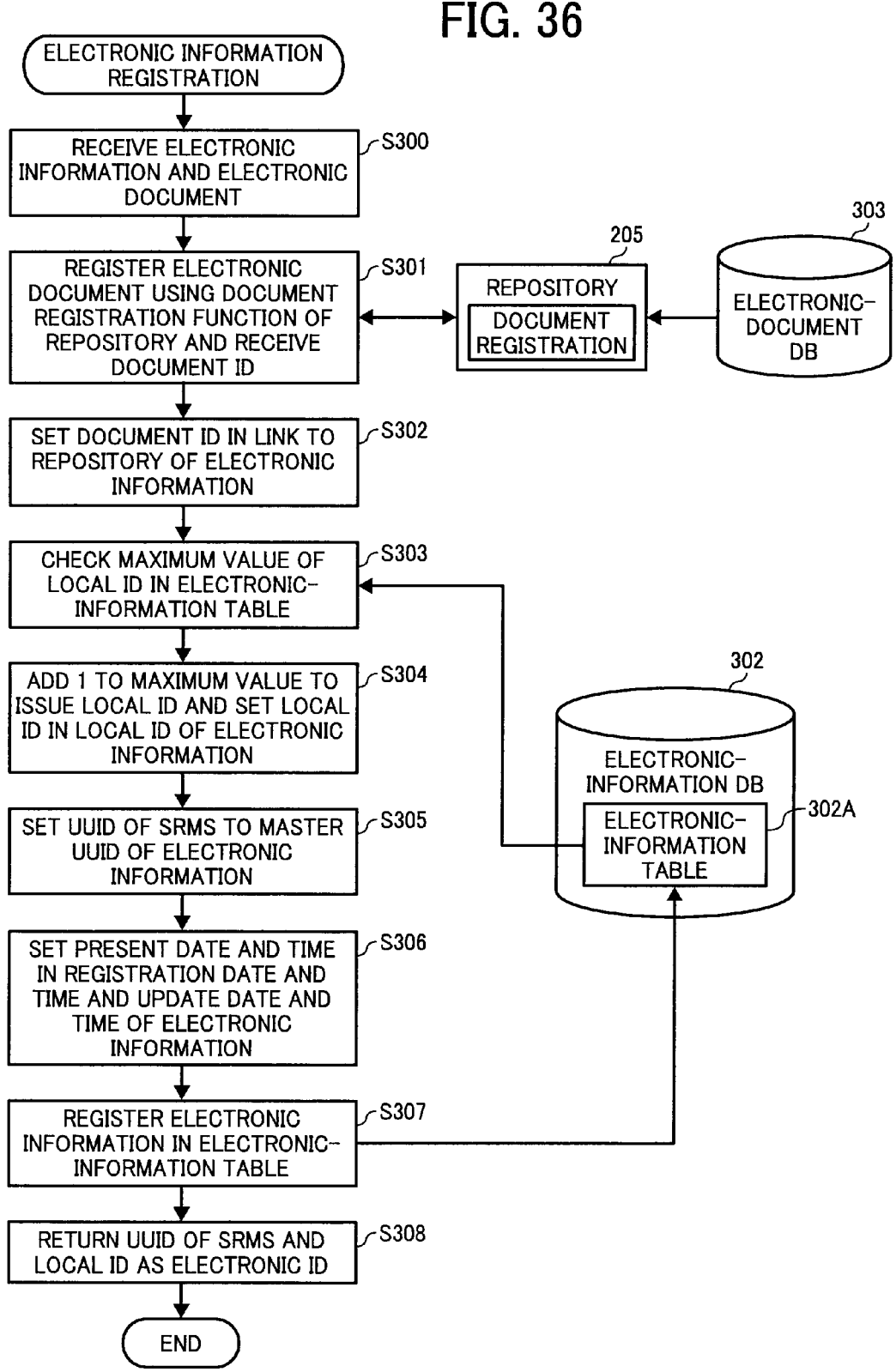
FIG. 36 is a flowchart of a procedure of electronic information registration processing realized by an electronic information registration function according to the embodiment.

The electronic information registration is a function of registering electronic information in the electronic-information table 302A of the electronic-information DB 302 and registering an electronic document in the electronic-document DB 303 using the function of the repository 205. FIG. 36 is a flowchart of a procedure of electronic information registration processing realized by the electronic information registration function. First, the electronic-information-registration processing section EI20 receives electronic information and an electronic document from the client as a request source through the interface unit EI1 (Step S300). The electronic-information-registration processing section EI20 registers the electronic document in the electronic-document DB 303 through the repository 205 using a document registration function of the repository 205. As a result, the electronic-information-registration processing section EI20 receives a document ID from the repository 205 (Step S301). The document ID is an ID that the repository 205 independently issues in order to manage the electronic document to be registered. When a document management system such as a file system of Windows (registered trademark) is used as the repository 205, the document ID may be a file path. The electronic-information-registration processing section EI20 sets the document ID received from the repository 205 in "link to a repository" in the electronic information (Step S302). Subsequently, the electronic-information-registration processing section EI20 checks a maximum value of a local ID referring to the electronic-information table 302A (Step S303). For example, when the maximum value is "10", the electronic-information-registration processing section EI20 issues "11" as a new local ID and sets "11" in a local ID of the received electronic information (Step S304). The electronic-information-registration processing section EI20 sets a value of a UUID of the EIDS 202 in the electronic information (Step S305). As a result, an electronic information ID, which is a combination of the UUID of the EIDS 202 and the local ID, is issued with respect to the electronic information. The electronic information ID is associated with the electronic information. The electronic-information-registration processing section EI20 acquires a present date and time using the timing function of the CPU 11 and sets the present date and time in a registration date and time and an update date and time of the received electronic information (Step S306). The electronic-information-registration processing section EI20 registers the electronic information, in which the respective kinds of information are set as explained above, in the electronic-information table 302A (Step S307). Finally, the electronic-information-registration processing section EI20 returns the combination (an electronic ID) of the UUID of the EIDS 202 and the local ID to the client through the interface unit EI1 (Step S308).

Figure 37:
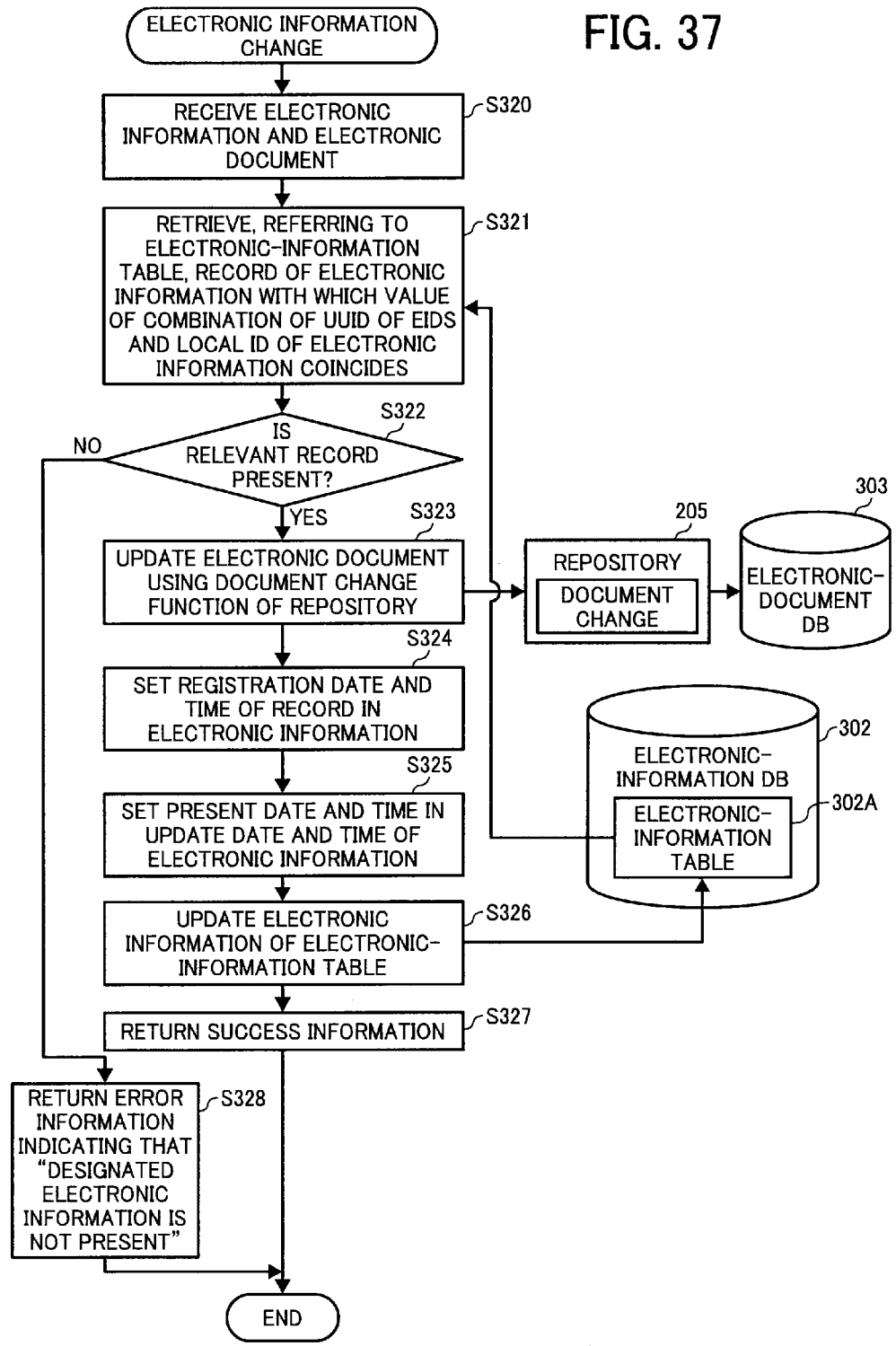
FIG. 37 is a flowchart of a procedure of electronic information change processing realized by an electronic information change function according to the embodiment.

The electronic information change is a function of changing electronic information registered in the electronic-information table 302A. FIG. 37 is a flowchart of a procedure of electronic information change processing realized by the electronic information change function. First, the electronic-information-change processing section EI21 receives electronic information and a body of an electronic document from the client as a request source through the interface unit EI1 (Step S320). The electronic-information-change processing section EI21 retrieves, referring to the electronic-information table 302A, a record of electronic information with which a value of a combination (an electronic ID) of a UUID of the EIDS 202 and a local ID of the received electronic information coincides (Step S321). When a relevant record is not present ("NO" at Step S322), the electronic-information-change processing section EI21 returns error information indicating that "designated electronic information is not present" to the client (Step S328). When a relevant record exists ("YES" at Step S322), the electronic-information-change processing section EI21 updates the body of the electronic document stored in the electronic-document DB 303 using a document change function of the repository 205 (Step S323). Subsequently, the electronic-information-change processing section EI21 sets a registration date and time, which is set in the relevant record, in the received electronic information (Step S324). The electronic-information-change processing section EI21 acquires a present date and time using the timing function of the CPU 11 and sets the present date and time in an update date and time of the received electronic information (Step S325). The electronic-information-change processing section EI21 updates (overwrites) the electronic-information table 302 with the electronic information in which the respective kinds of information are set as explained above (Step S326). The electronic-information-change processing section EI21 returns information indicating success of the processing to the client through the interface unit EI1 (Step S327).

Figure 38:
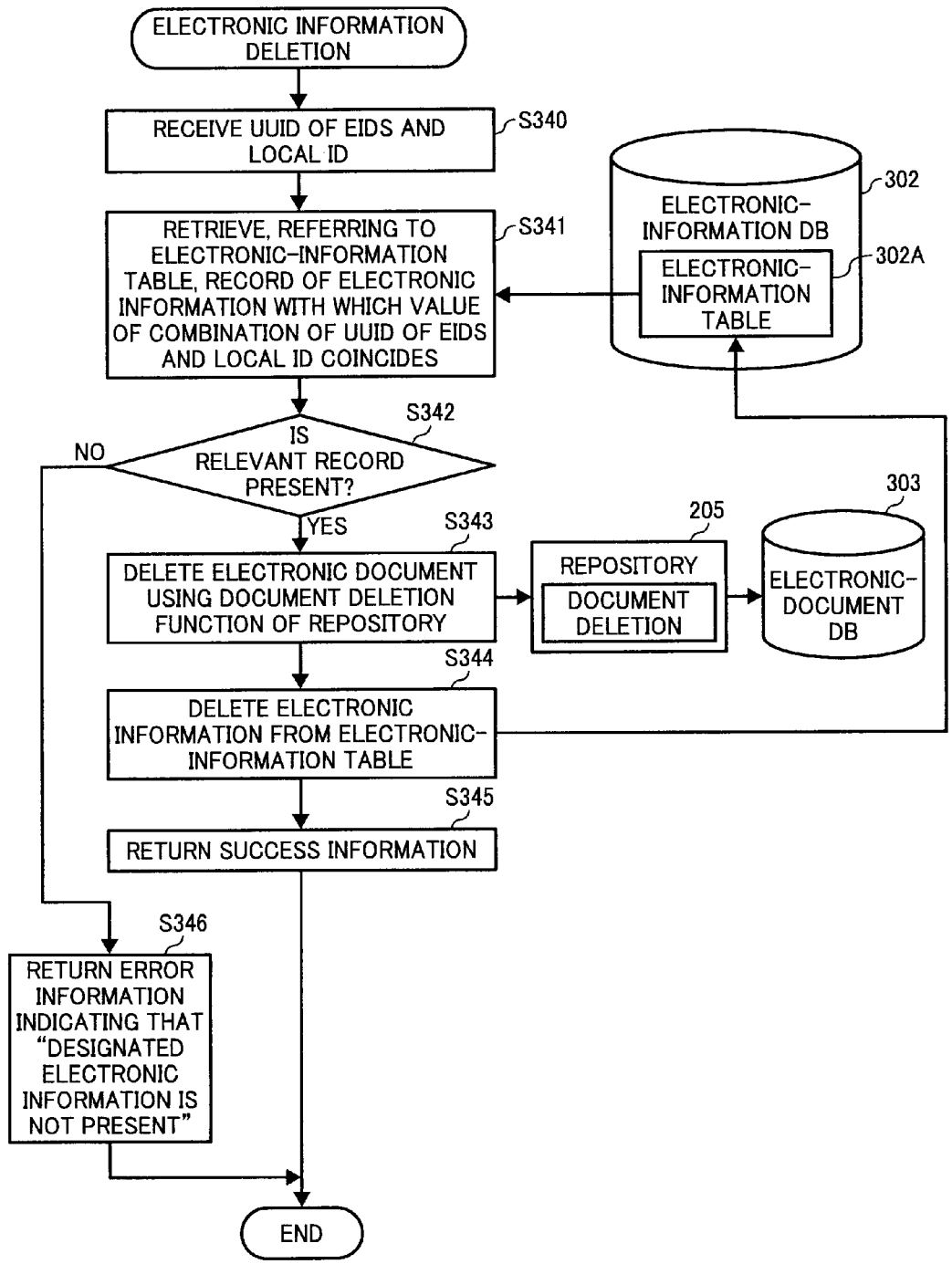
FIG. 38 is a flowchart of a procedure of electronic information deletion processing realized by an electronic information deletion function according to the embodiment.

The electronic information deletion is a function of deleting electronic information registered in the electronic-information table 302A. FIG. 38 is a flowchart of a procedure of electronic information deletion processing realized by the electronic information deletion function. First, the electronic-information-deletion processing section EI22 receives a combination (an electronic ID) of a UUID of the EIDS 202 and a local ID concerning deletion object electronic information from the client through the interface unit EI1 (Step S340). The electronic-information-deletion processing section EI22 retrieves, referring to the electronic-information table 302A, a record of electronic information with which a value of the received combination (electronic ID) of the UUID of the EIDS 202 and the local ID coincides (Step S341). When a relevant record is not present ("NO" at Step S342), the electronic-information-deletion processing section EI22 returns error information indicating that "designated electronic information is not present" to the client as a request source (Step S346). When a relevant record exists ("YES" at Step S342), the electronic-information-deletion processing section EI22 deletes, using a document deletion function of the repository 205, a body of an electronic document stored in the electronic-document DB 303 (Step S343) and deletes the record from the electronic-information table 302A (Step S344). Subsequently, the electronic-information-deletion processing section EI22 returns success information indicating success of the processing to the client through the interface unit EI1 (Step S345).

Figure 39:
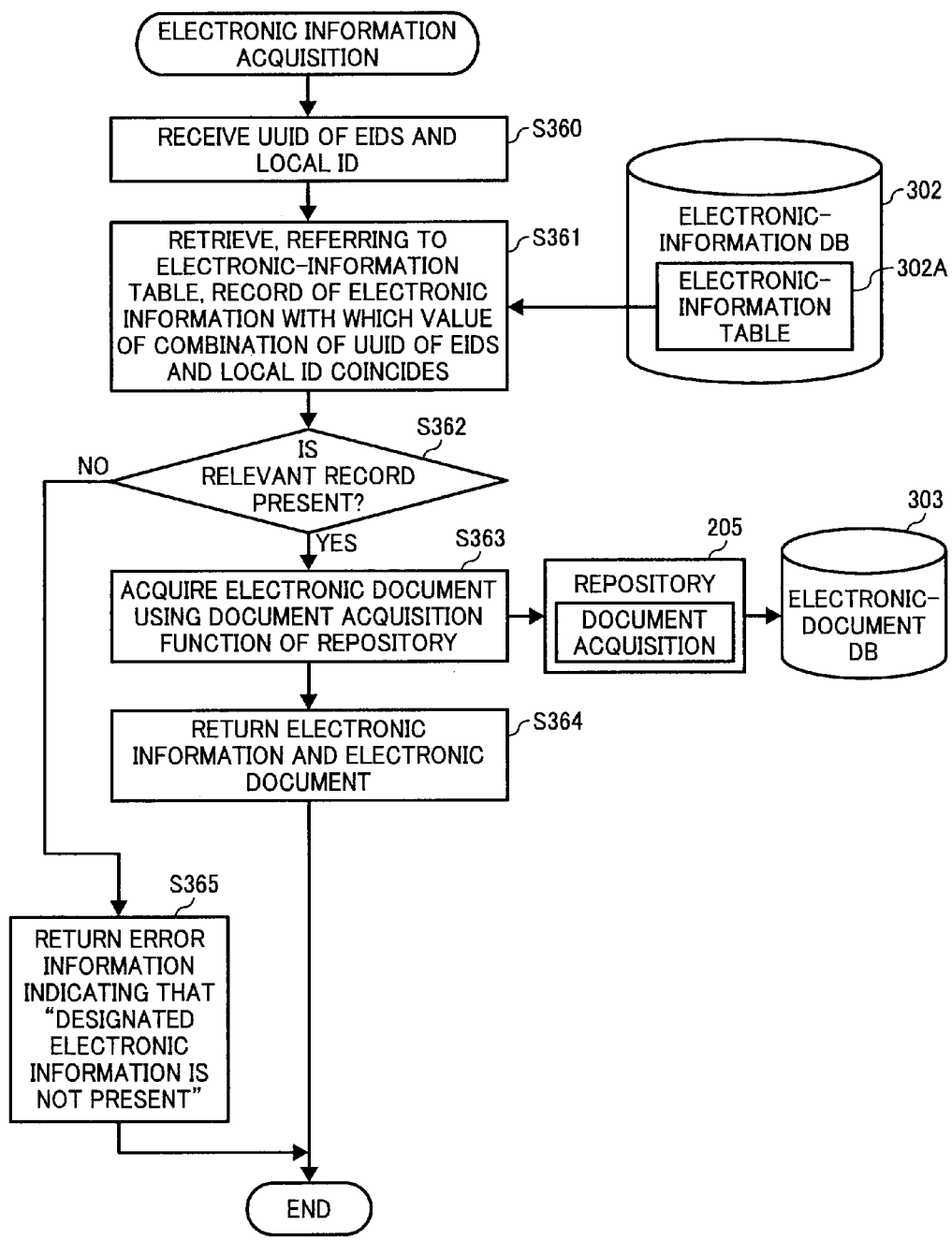
FIG. 39 is a flowchart of a procedure of electronic information acquisition processing realized by an electronic information acquisition function according to the embodiment.

The electronic information acquisition is a function of acquiring electronic information registered in the electronic-information table 302A. FIG. 39 is a flowchart of a procedure of electronic information acquisition processing realized by the electronic information acquisition function. First, the electronic-information-acquisition processing section EI23 receives a combination (an electronic ID) of a UUID of the EIDS 202 and a local ID concerning acquisition object electronic information from the client through the interface unit EI1 together with an electronic information acquisition request (Step S360). The electronic-information-acquisition processing section EI23 retrieves, referring to the electronic-information table 302A, a record of electronic information with which a value of the received combination (electronic ID) of the UUID of the EIDS 202 and the local ID coincides (Step S361). When a relevant record is not present ("NO" at Step S362), the electronic-information-acquisition processing section EI23 returns error information indicating that "designated electronic information is not present" (Step S365). When a relevant record exists ("YES" at Step S362), the electronic-information-acquisition processing section EI23 acquires a body of an electronic document stored in the electronic-document DB 303 using a document acquisition function of the repository 205. The electronic-information-acquisition processing section EI23 returns the body of the electronic document to the client through the interface EI1 together with electronic information as the relevant record (Step S364).

Figure 40:
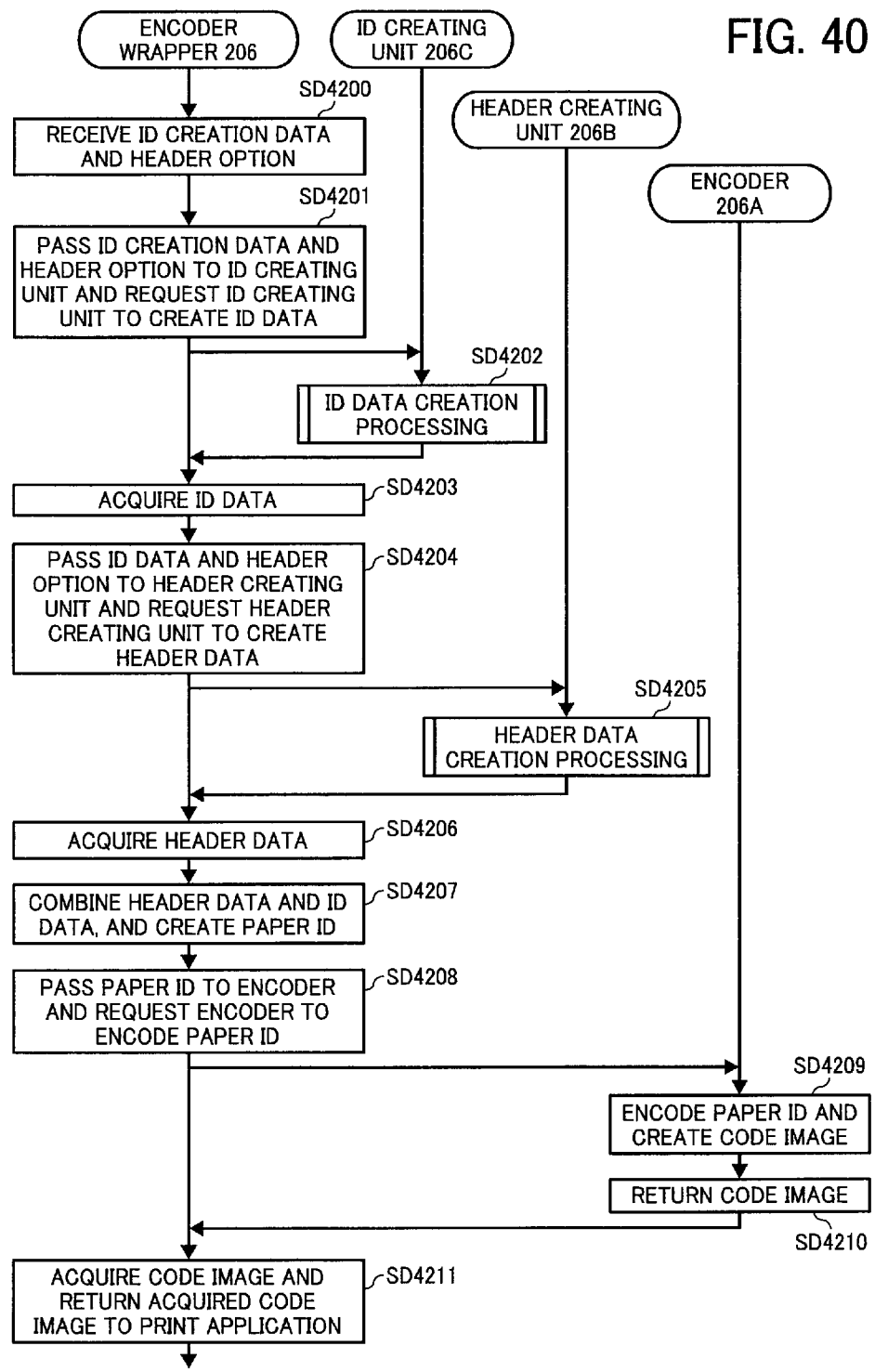
FIG. 40 is a flowchart of a procedure of encode processing performed by an encoder wrapper 206 according to the embodiment.

FIG. 40 is a flowchart of a procedure of encode processing performed by the encoder wrapper 206. The encoder wrapper 206 receives ID creation data and a header option from the print application 100 described later and starts encode processing in response to a request for encoding. Data included in the ID creation data is different depending on a type of a data format. In the case of the data format of type 3, the UUID of the PIDS 201 and a local ID of paper information is included in the ID creation data. In the case of any one of the data formats type 0 to type 2 and type 4, ID creation data including the service information of the PIDS 201, the UUID of the SRMS 200, the UUID of the PIDS 201, and the local ID of the paper information is included in the ID creation data. Processing for creating the ID creation data and the header option is described in detail in explanation of operations of the print application 100.

Figure 41:
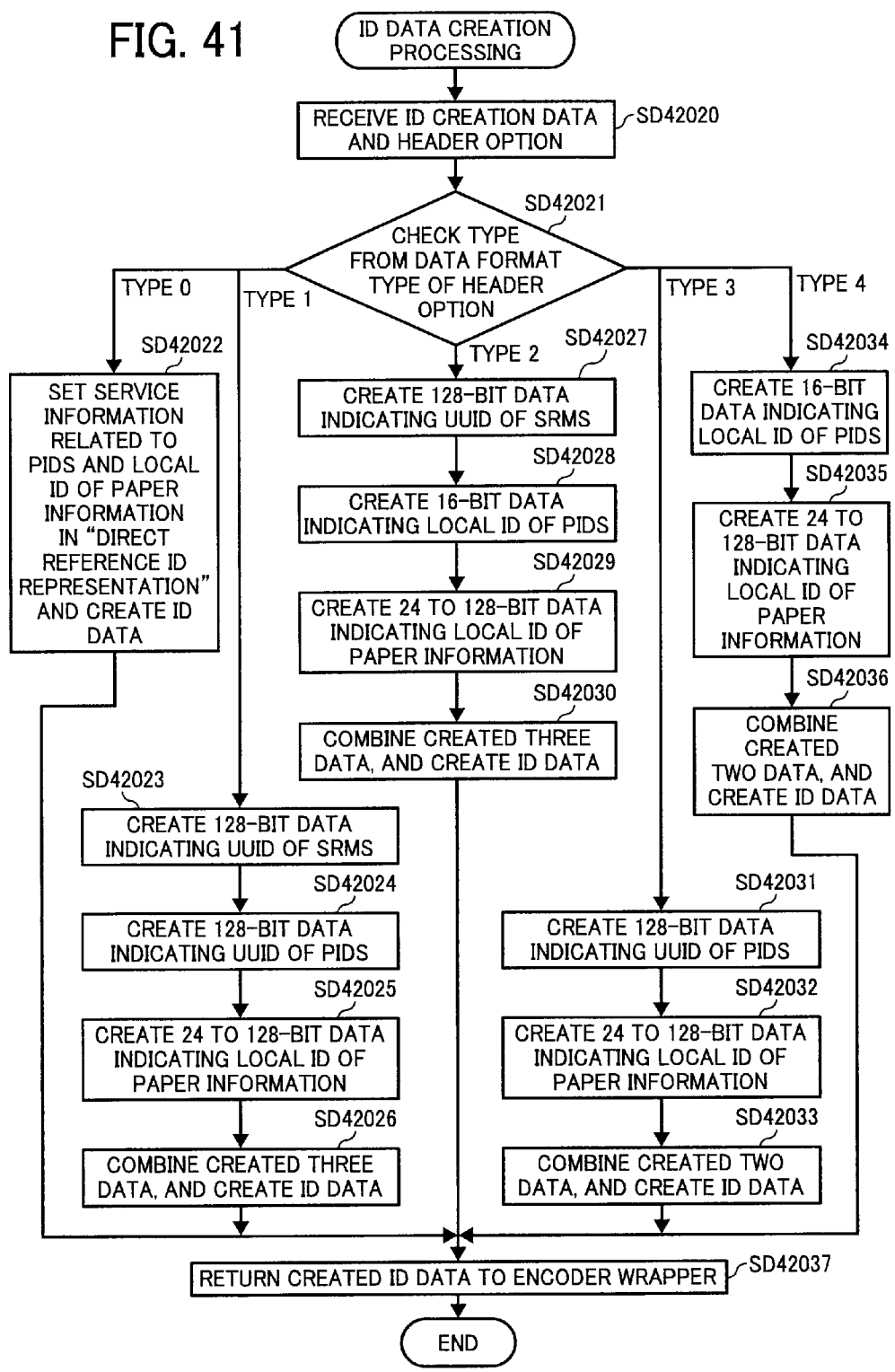
FIG. 41 is a flowchart of a procedure of ID creation processing performed by an ID creating unit 206C according to the embodiment.

The encoder wrapper 206 receives the ID creation data and the header option (Step SD4200), passes the ID creation data and the header option to the ID creating unit 206C, and requests the ID creating unit 206C to create ID data (Step SD4201). The ID creating unit 206C receives the ID creation data and the header option and performs ID creation processing (Step SD4202). FIG. 41 is a flowchart of a procedure of the ID creation processing performed by the ID creating unit 206C. The ID creating unit 206C receives the ID creation data and the header option (Step SD42020), discriminate a type of a data format referring to "data format type" included in the header option (Step SD42021), and performs processing for creating ID data according to the type. Specifically, when "data format type" is "0" (type 0), the ID creating unit 206C sets the service information of the PIDS 201 and a local ID of paper information included in the ID creation data in "direct reference ID representation" (see FIG. 9) and creates ID data (Step SD42022). Thereafter, the ID creating unit 206C proceeds to Step SD42037.

When "data format type" is "1" (type 1), the ID creating unit 206C creates 128-bit data indicating the UUID of the SRMS 200 included in the ID creation data (Step SD42023), creates 128-bit data indicating the UUID of the PIDS 201 included in the ID creation data (Step SD42024), and creates 24-bit to 128-bit data indicating the local ID of the paper information included in the ID creation data (Step SD42025). The ID creating unit 206C combines the three data created at Steps SD42023 to SD42025 and creates ID data (Step SD42026). Therefore, the ID creating unit 206C proceeds to Step SD42037.

When "data format type" is "2" (type 2), the ID creating unit 206C creates 128-bit data indicating the UUID of the SRMS 200 included in the ID creation data (Step SD42027), creates 16-bit data indicating the local ID of the PIDS 201 included in the ID creation data (Step SD42028), and creates 24-bit to 128-bit data indicating the local ID of the paper informats (Step SD42029). The ID creating unit 206C combines the three data created at Steps SD42027 to SD42029 and creates ID data (Step SD42030). Thereafter, the ID creating unit 206C proceeds to Step SD42037.

When "data format type" is "3" (type 3), the ID creating unit 206C creates 128-bit data indicating the UUID of the PIDS 201 included in the ID creation data (Step SD42031) and creates 24-bit to 128-bit data indicating the local ID of the paper information (Step SD42032). The ID creating unit 206C combines the two data created at Steps SD42031 and SD42032 and creates ID data (Step SD42033). Thereafter, the ID creating unit 206C proceeds to Step SD42037.

When "data format type" is "4" (type 4), the ID creating unit 206C creates 16-bit data indicating the local ID of the PIDS 201 included in the ID creation data (Step SD42034) and creates 24-bit to 128-bit data indicating the local ID of the paper information included in the ID creation data (Step SD42035). The ID creating unit 206C combines the two data created at Steps SD42034 and SD42035 and creates ID data (Step SD42036).

When the ID creating unit 206C proceeds to Step SD42037, the ID creating unit 206C returns the ID data created at Step SD42022, SD42026, SD42030, SD42033, or SD42036 to the encoder wrapper 206. Referring back to FIG. 40, the encoder wrapper 206 receives the ID data (Step SD4203), passes the ID data and a header option to the header creating unit 206B, and requests the header creating unit 206B to create header data (Step SD4204).

Figure 42:
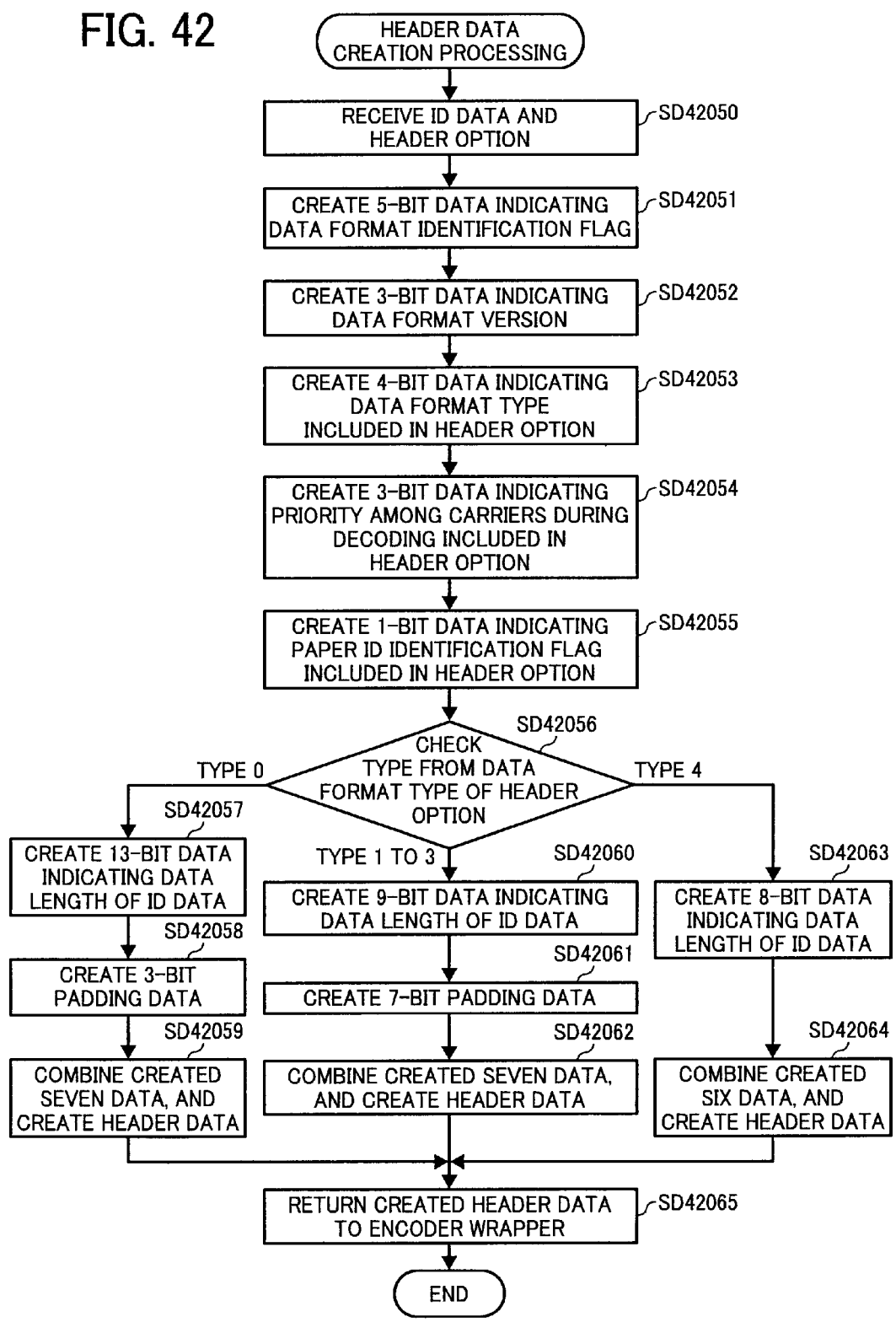
FIG. 42 is a flowchart of a procedure of header creation processing performed by a header creating unit 206B according to the embodiment.

The header creating unit 206B receives the ID creation data and the header option from the encoder wrapper 206 and performs header creation processing (Step SD4205). FIG. 42 is a flowchart of a procedure of the header creation processing performed by the header creating unit 206B. First, the header creating unit 206B receives the ID creation data and the header option from the encoder wrapper 206 (Step SD42050). The header creating unit 206B creates 5-bit data indicating a data format identification flag (Step SD42051) and creates 3-bit data indicating a data format version (Step SD42052). The header creating unit 206B sets values decided in advance in the respective data and creates data. The values to be set are stored in, for example, the ROM 12a and the HDD 18. The header creating unit 206B sets the values in the data. Subsequently, the header creating unit 206B creates 4-bit data indicating "data format type" included in the header option (Step SD42053), creates 3-bit data indicating "priority among carriers during decoding" included in the header option (Step SD42054), and creates 1-bit data indicating "paper ID identification flag" included in the header option (Step SD42055). The header creating unit 206B checks a type of a data format indicated by the data format type (Step SD42056) and creates header data as described below according to the type.

Specifically, when the data format type is "0" (type 0), the header creating unit 206B calculates a total number of bits of the ID data, sets a value of the total as an ID data length, and creates 13-bit data indicating the ID data length (Step SD42057). The header creating unit 206B creates 3-bit padding data for supplementing insufficiency of a data amount (Step SD42058). The header creating unit 206B combines the seven data created at Steps SD42051 to SD42055 and Steps SD42057 and SD42058 and creates header data (Step SD42059). Thereafter, the header creating unit 206B proceeds to Step SD42065.

When the data format type is any one of "1" (type 1) to "3" (type 3), the header creating unit 206B calculates a total number of bits of the ID data, sets a value of the total as an ID data length, and creates 9-bit data indicating the ID data length (Step SD42060). The header creating unit 206B creates 7-bit padding data (Step SD42061). The header creating unit 206B combines the seven data created at Steps SD42051 to SD42055 and Steps SD42060 and SD42061 and creates header data (Step SD42062). Thereafter, the header creating unit 206B proceeds to Step SD42065.

When the data format type is "4" (type 4), the header creating unit 206B calculates a total number of bits of the ID data, sets a value of the total as an ID data length, and creates 8-bit data indicating the ID data length (Step SD42063). The header creating unit 206B combines the six data created at Steps SD42051 to SD42055 and SD42063 and creates header data (Step SD42064). Thereafter, the header creating unit 206B proceeds to Step SD42065.

When the header creating unit 206B proceeds to Step SD42065, the header creating unit 206B returns the header data created at Steps SD42059, SD42062, and SD42064 to the encoder wrapper 206. Referring back to FIG. 40, the encoder wrapper 206 receives the header data (Step SD4206), combines the header data and the ID data received at Step SD4203, and creates a paper ID (Step SD4207). The encoder wrapper 206 passes the created paper ID to the encoder 206A and requests the encoder 206A to encode the paper ID (Step SD4208). The encoder 206A encodes the paper ID and creates a code image (Step SD4209). A type of a code (an information carrier) encoded by the encoder 206A is, for example, a QR code of a two-dimensional barcode. The encoder 206A returns the created code image to the encoder wrapper 206 (Step SD4210). The encoder wrapper 206 receives the code image and returns the code image to the print application 100 (Step SD4211).

Figure 43:
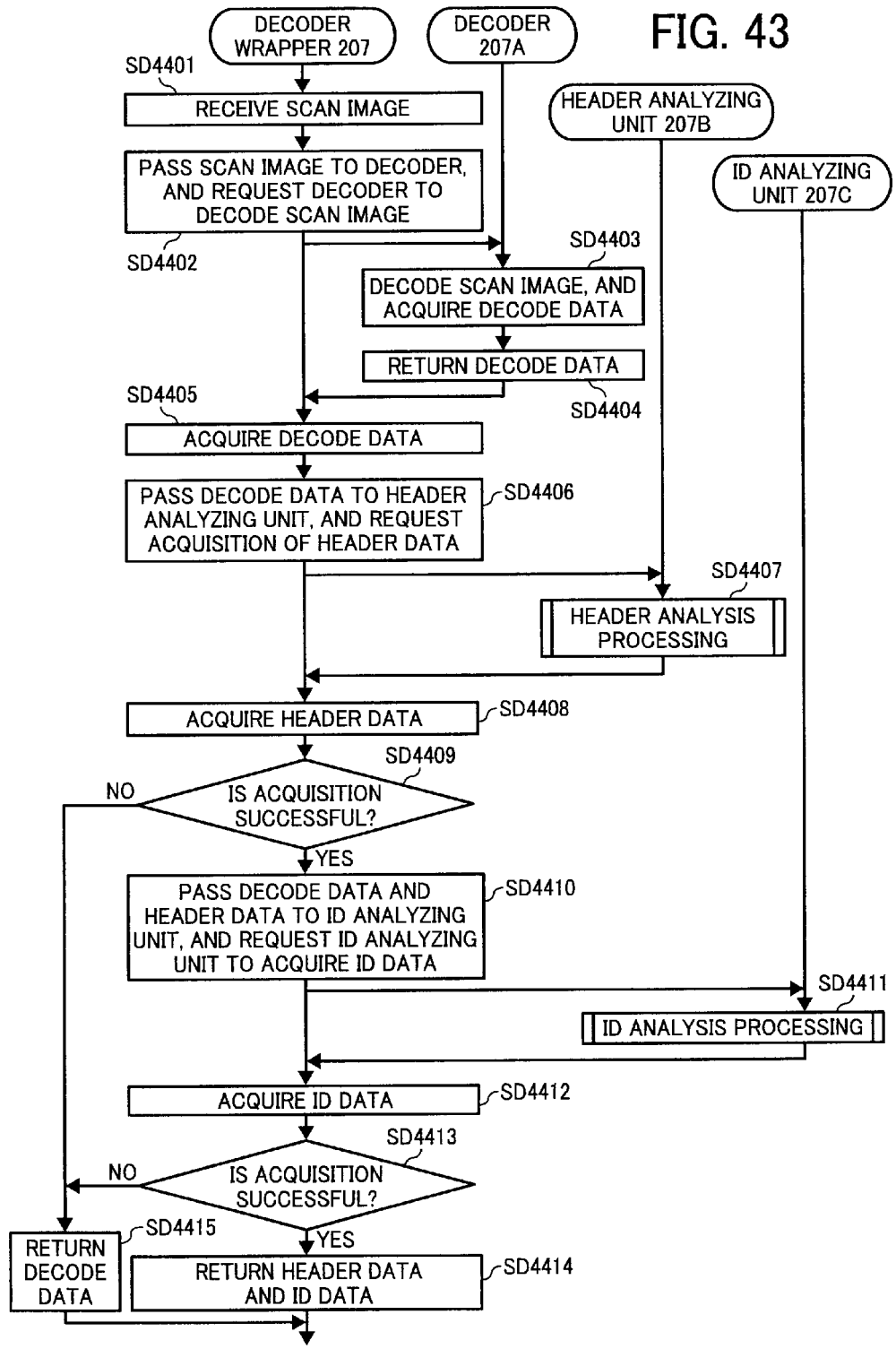
FIG. 43 is a flowchart of a procedure of decode processing performed by a decoder wrapper 207 according to the embodiment.

FIG. 43 is a flowchart of a procedure of decode processing performed by the decoder wrapper 207. The decoder wrapper 207 receives an image read by scanning paper (a scan image) from the scan application 101 described later and starts the decode processing in response to a request for decoding of the scan image. Specifically, the decoder wrapper 207 receives the scan image (Step SD4401), passes the scan image to the decoder 207A, and requests the decoder 207A to decode the scan image (Step SD4402). The decoder 207A decodes, with the decode function, a code image included in the scan image passed from the decoder wrapper 207 and, as a result, acquires decode data (a paper ID) (Step SD4403). The decoder 207A returns the decode data to the decoder wrapper 207 (Step SD4404). The decoder wrapper 207 acquires the decode data (Step SD4405), passes the decode data to the header analyzing unit 207B, and requests the header analyzing unit 207B to acquire header data (Step SD4406). When the header analyzing unit 207B is requested to acquire header data, the header analyzing unit 207B performs header analysis processing described below (Step SD4407).

Figure 44:
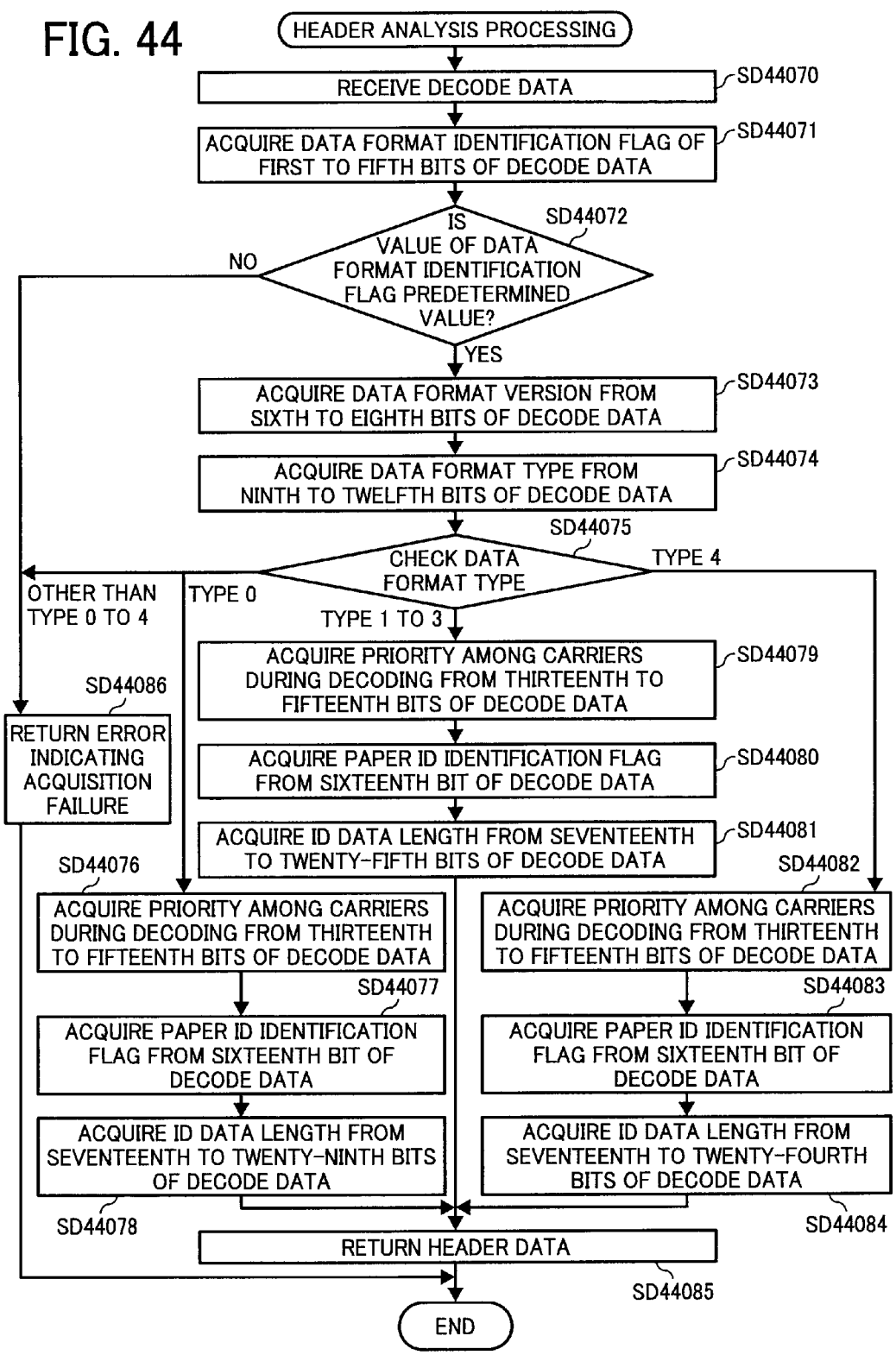
FIG. 44 is a flowchart of a procedure of header analysis processing performed by a header analyzing unit 207B according to the embodiment.

FIG. 44 is a flowchart of a procedure of the header analysis processing performed by the header analyzing unit 207B. The header analyzing unit 207B receives the decode data (Step SD44070), acquires a value of "data format identification flag" set in first to fifth bits of the decode data (Step SD44071), and judges whether the value is a predetermined value. In other words, the header analyzing unit 207B judges whether the decode data is specified data (Step SD44072). The predetermined value is stored in, for example, the HDD 18 in association with "data format identification flag". The header analyzing unit 207B accesses the HDD 18 and performs the judgment referring to the value of "data format identification flag". When a result of the judgment at Step SD44072 is affirmative, the header analyzing unit 207B acquires a 3-bit value of "data format version" set in sixth to eighth bits of the decode data (Step SD44073) and acquires a 4-bit value of "data format type" set in ninth to twelfth bits of the decode data (Step SD44074). The header analyzing unit 207B performs processing described below according to the value of "data format type".

When the value of "data format type" is "0" (type 0), the header analyzing unit 207B acquires a 3-bit value of "priority among carriers during decoding" set in thirteenth to fifteenth bits of the decode data (Step SD44076), acquires the 1-bit value of "paper ID identification flag" set in a sixteenth bit of the decode data (Step SD44077), and acquires a 13-bit value of "ID data length" set in seventeenth to twenty-ninth bits of the decode data (Step SD44078) to thereby acquire header data from the decode data. The header analyzing unit 207B proceeds to Step SD44085.

When the value of "data format type" is any one of "1" (type 1"), "2" (type 2), and "3" (type 3), the header analyzing unit 207B acquires the 3-bit value of "priority among carriers during decoding" set in the thirteenth to fifteenth bits of the decode data (Step SD44079), the 1-bit value of "paper ID identification flag" set in the sixteenth bit of the decode data (Step SD44080), and acquires a 9-bit value of "ID data length" set in seventeenth to twenty-fifth bits of the decode data (Step SD44081) to thereby acquire header data from the decode data. The header analyzing unit 207B proceeds to Step SD44085.

When the value of "data format type" is "4" (type 4), the header analyzing unit 207B acquires the 3-bit value of "priority among carriers during decoding" set in the thirteenth to fifteenth bits of the decode data (Step SD44082), acquires the 1-bit value of "paper ID identification flag" set in the sixteenth bit of the decode data (Step SD44083), and acquires an 8-bit value of "ID data length" set in seventeenth to twenty-fourth bits of the decode data (Step SD44084) to thereby acquire header data from the decode data. The header analyzing unit 207B proceeds to Step SD44085.

At Step SD44085, the header analyzing unit 207B returns the acquired header data to the decoder wrapper 207. When the value of "data format type" is not all of "type 0" to "type 4" or when the result of the judgment at Step SD44072 is negative, the header analyzing unit 207B returns error information indicating acquisition failure to the decoder wrapper 207 (Step SD44086).

Figure 45:
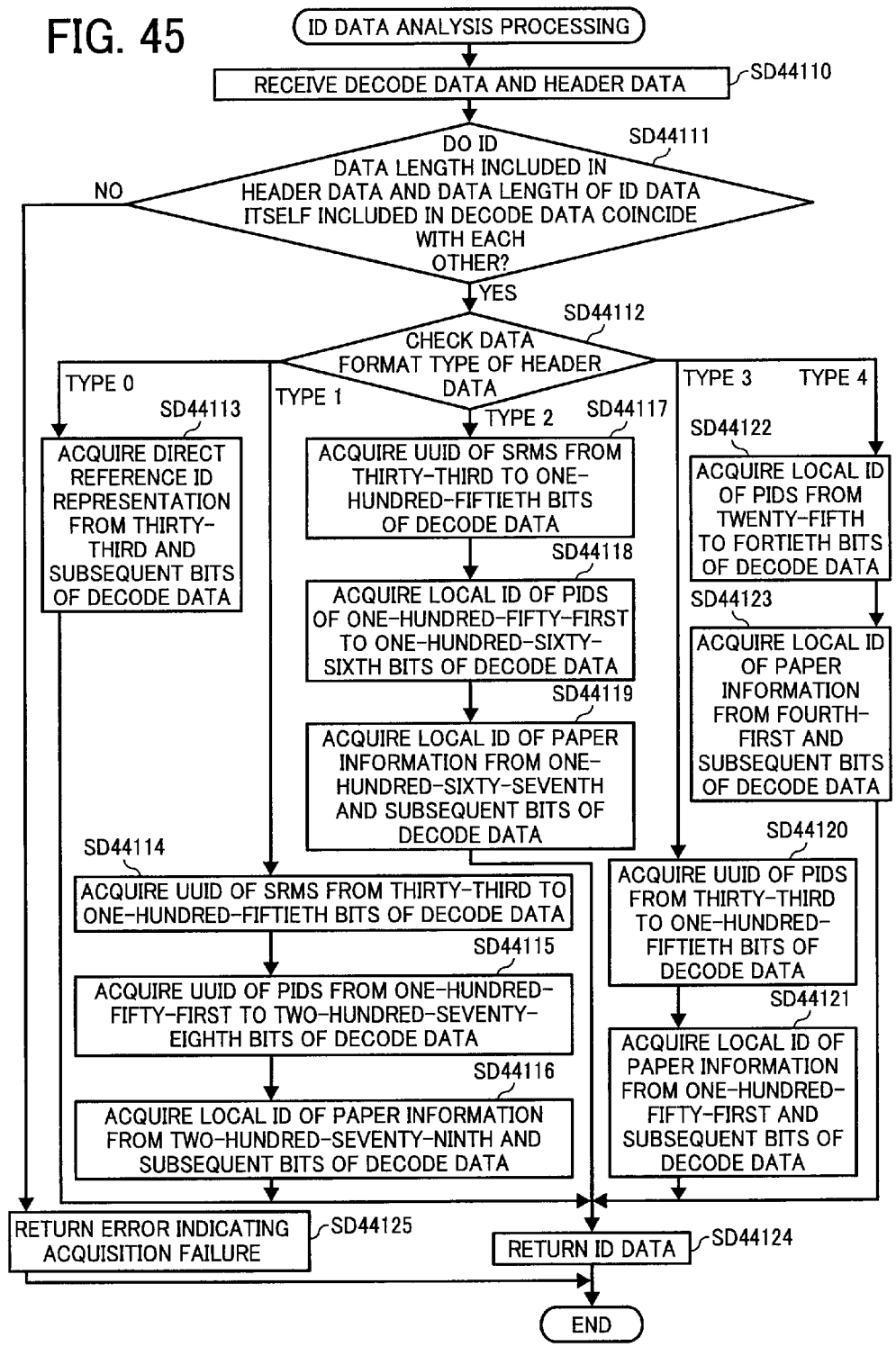
FIG. 45 is a flowchart of a procedure of ID data analysis processing performed by an ID analyzing unit 207C according to the embodiment.

Referring back to FIG. 43, the decoder wrapper 207 receives the header data (Step SD4408) and succeeds in acquisition of the header data ("YES" at Step SD4409). Subsequently, the decoder wrapper 207 passes the header data and decode data to the ID analyzing unit 207C and requests the ID analyzing unit 207C to acquire ID data (Step SD4410). When the ID analyzing unit 207C is requested to analyze the ID data, the ID analyzing unit 207C performs ID data analysis processing described below (Step SD4411). FIG. 45 is a flowchart of a procedure of the ID data analysis processing performed by the ID analyzing unit 207C. The ID analyzing unit 207C receives the decode data and the header data (Step SD44110). The ID analyzing unit 207C calculates a data length (a number bits) of ID data itself included in the decode data, compares the data length with a value set in "ID data length" included in the header data, and judges whether these values coincide with each other (Step SD44111). When a result of the judgment is affirmative, the ID analyzing unit 207C performs processing described below according to a value of "data format type" included in the header data (Step SD44112).

When the value of "data format type" is "0" (type 0", the ID analyzing unit 207C skips first to thirty-second bits of the decode data and acquires a value of "direct reference ID representation" set in thirty-third and subsequent bits (Step SD44113) to thereby acquire ID data from the decode data. The ID analyzing unit 207C proceeds to Step SD44124.

When the value of "data format type" is "1" (type 1), the ID analyzing unit 207C skips first to thirty-second bits of the decode data, acquires a 128-bit value of "UUID of an SRMS" set in thirty-third to one-hundred-fiftieth bits (Step SD44114), acquires a 128-bit value "UUID of a PIDS" set in one-hundred-fifty-first to two-hundred-seventy-eighth bits (Step SD44115), and acquires a value of "local ID of paper information" set in two-hundred-seventy-ninth and subsequent bits (Step SD44116) to thereby acquire ID data from the decode data. The ID analyzing unit 207C proceeds to Step SD44124.

When the value of "data format type" is "2" (type 2), the ID analyzing unit 207C skips the first to thirty-second bits of the decode data, acquires the 128-bit "UUID of an SRMS" set in the thirty-third to one-hundred-fiftieth bits (Step SD44117), acquires a 16-bit value of "local ID of a PIDS" set in one-hundred-fifty-first to one-hundred-sixty-sixth bits (Step SD44118), and acquires a value of "local ID of paper information" set in one-hundred-sixty-seventh and subsequent bits (Step SD44119) to thereby acquire ID data from the decode data. The ID analyzing unit 207C proceeds to Step SD44124.

When the value of "data format type" is "3" (type 3), the ID analyzing unit 207C skips the first to thirty-second bits of the decode data, acquires the 128-bit value of "UUID of a PIDS" set in the thirty-third to one-hundred-fiftieth bits (Step SD44120), and acquires a value of "local ID of paper information" set in one-hundred-fifty-first and subsequent bits (Step SD44121) to thereby acquire ID data from the decode data. The ID analyzing unit 207C proceeds to Step SD44124.

When the value of "data format type" is "4" (type 4), the ID analyzing unit 207C skips first to twenty-fourth bits of the decode data, acquires a 16-bit value of "local ID of a PIDS" set in twenty-fifth to fortieth bits (Step SD44122), and acquires a value of "local ID of paper information" set in forty-first to subsequent bits (Step SD44123) to thereby acquire ID data from the decode data. The ID analyzing unit 207C proceeds to Step SD44124.

At Step SD44124, the ID analyzing unit 207C returns the acquired ID data to the decoder wrapper 207. When the result of the judgment at Step SD44111 is negative, there is a deficiency in the ID data acquired at Step SD44110. Therefore, the ID analyzing unit 207C returns error information indicating acquisition failure to the decoder wrapper 207 (Step SD44125).

Referring back to FIG. 43, the decoder wrapper 207 receives the ID data (Step SD4412). When the acquisition of the ID data is successful ("YES" at Step SD4413), the decoder wrapper 207 returns the ID data and the header data acquired at Step SD4408 to the print application 100 (Step SD4414). When the error information is received at Step SD4408 and the result of the judgment at Step SD4409 is negative or when the error information is received at Step SD4412 and the result of the judgment at Step SD4413 is negative, the decoder wrapper 207 returns the decode data acquired at Step SD4405 to the scan application 101 (Step SD4415).

Figure 46:
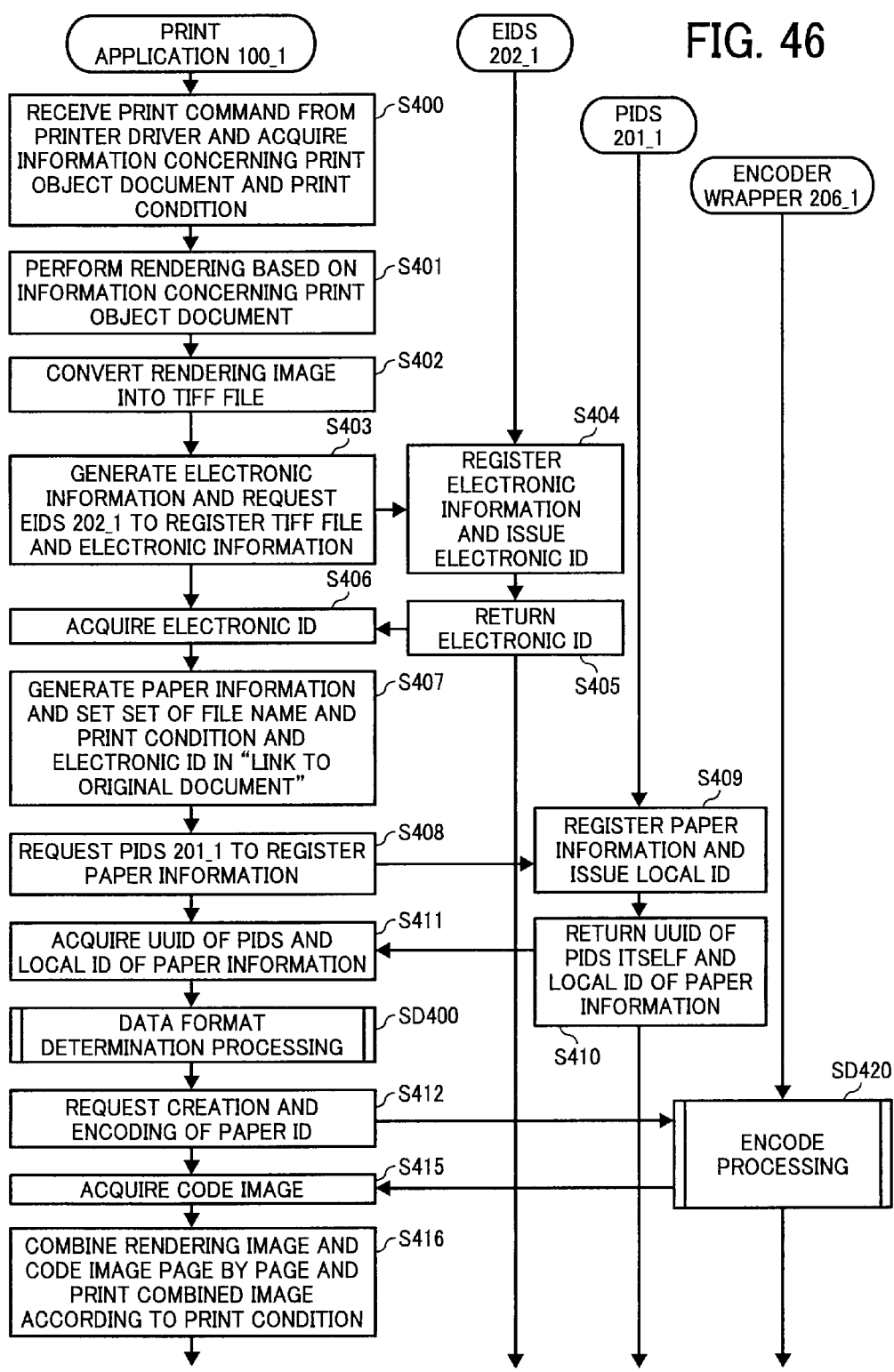
FIG. 46 is a flowchart of a procedure of an operation of a print application 100 by a driver print function according to the embodiment.

The print application 100 includes the driver print function and the scan print function as explained above. FIG. 46 is a flowchart of a procedure of operations of the print application 100 according to the driver print function.

When a user inputs designation of printing of a three-page document and setting of a print condition, the personal computer PC1 receives the designation input. The printer driver of the personal computer PC1 transmits a print command including information concerning the print object document and the print condition to the print application 100_1 of the multifunction peripheral MFP1 through the intranet NT1. A procedure of processing up to this point is a known technology. Various known printer drivers that realize the procedure of such processing can be used.

The print application 100_1 receives a print command from the printer driver of the personal computer PC1 (Step S400), performs rendering using the information concerning the print object document and the print condition included in the print command, and creates an image (a rendering image) representing a print object document (Step S401). The print object document has three pages. Therefore, the print application 100_1 creates rendering images printed on three pieces of paper, respectively. Subsequently, the print application 100_1 converts the created rendering images into an electronic document of a predetermined representation format (Step S402). For example, the electronic document is data of a TIFF format (a TIFF file). This conversion is performed for registering the electronic document in the electronic-document DB 303. The print application 100_1 generates electronic information of an initial state in which the respective kinds of information are not set and sets a file name of the electronic document in "file name" in the generated electronic information. As this file name, when a file name of the electronic document is transmitted from the printer driver, the file name may be set. Alternatively, a file name issued to the electronic document by the print application 100_1 according to a predetermined method may be set. The print application 100_1 passes the generated electronic information and the electronic document to the EIDS 202_1 as parameters (Step S403). The exchange of data between the print application 100_1 and the EIDS 202_1 is performed in the identical multifunction peripheral MFP1. Therefore, the Web service is not used.

The EIDS 202_1 registers the electronic information passed from the print application 100_1 in an electronic-information table 302A_1 of the electronic-information DB 302_1 using the electronic information registration function (Step S404). The EIDS 202_1 registers the electronic document in the electronic-document DB 303_1 using the document registration function of the repository 205 and returns a combination of a value of a UUID of the EIDS 202_1 and a local ID concerning the registered electronic information to the print application 100_1 as an electronic ID (Step S405). The print application 100_1 receives the electronic ID (Step S406). The print application 100_1 generates paper information of an initial state in which the respective kinds of information are not set and sets a file name in "name" in the generated paper information (Step S407). As this file name, when a file name is transmitted from the printer driver, the file name may be set. Alternatively, a file name issued to the electronic document by the print application 100_1 according to the predetermined method may be set. The print application 100_1 sets the print condition transmitted from the printer driver in "print condition" of the paper information and sets a value of the electronic ID (the combination of the UUID of the EIDS 202_2 and the local ID) acquired from the EIDS 202_1 in "link to an original document" of the paper information. There are the print object images for three pages, i.e., three print object images. Therefore, the print application 100_1 generates three kinds of paper information. The print application 100_1 requests the PIDS 201_1 to register paper information and passes the generated paper information to the PIDS 201_1 as a parameter (Step S408). The exchange of data between the print application 100_1 and the PIDS 201_1 is performed in the identical multifunction peripherals MFP1. Therefore, the Web service is not used.

The PIDS 201_1 issues local IDs for the respective kinds of paper information passed from the print application 100_1 and registers the paper information in the paper-information table 301A_1 of the paper-information DB 301_1 using the paper registration function (Step S409). The PIDS 201_1 returns combinations of UUIDs of the PIDS 201_1 and local IDs concerning the respective kinds of registered paper information to the print application 100_1 as paper IDs (Step S410). Because the PIDS 201_1 has registered the three pieces of paper information, a combination of the UUID of the PIDS 201_1 and the local ID is returned to the three print applications 100_1. This combination is the same as a combination of IDs set in the ID data of the data format of type 3. The print application 100_1 receives the three combinations (Step S411). Subsequently, the print application 100_1 performs data format determination processing for determining a type of a data format of a paper ID as an object to be actually encoded (Step SD400).

Figure 47:
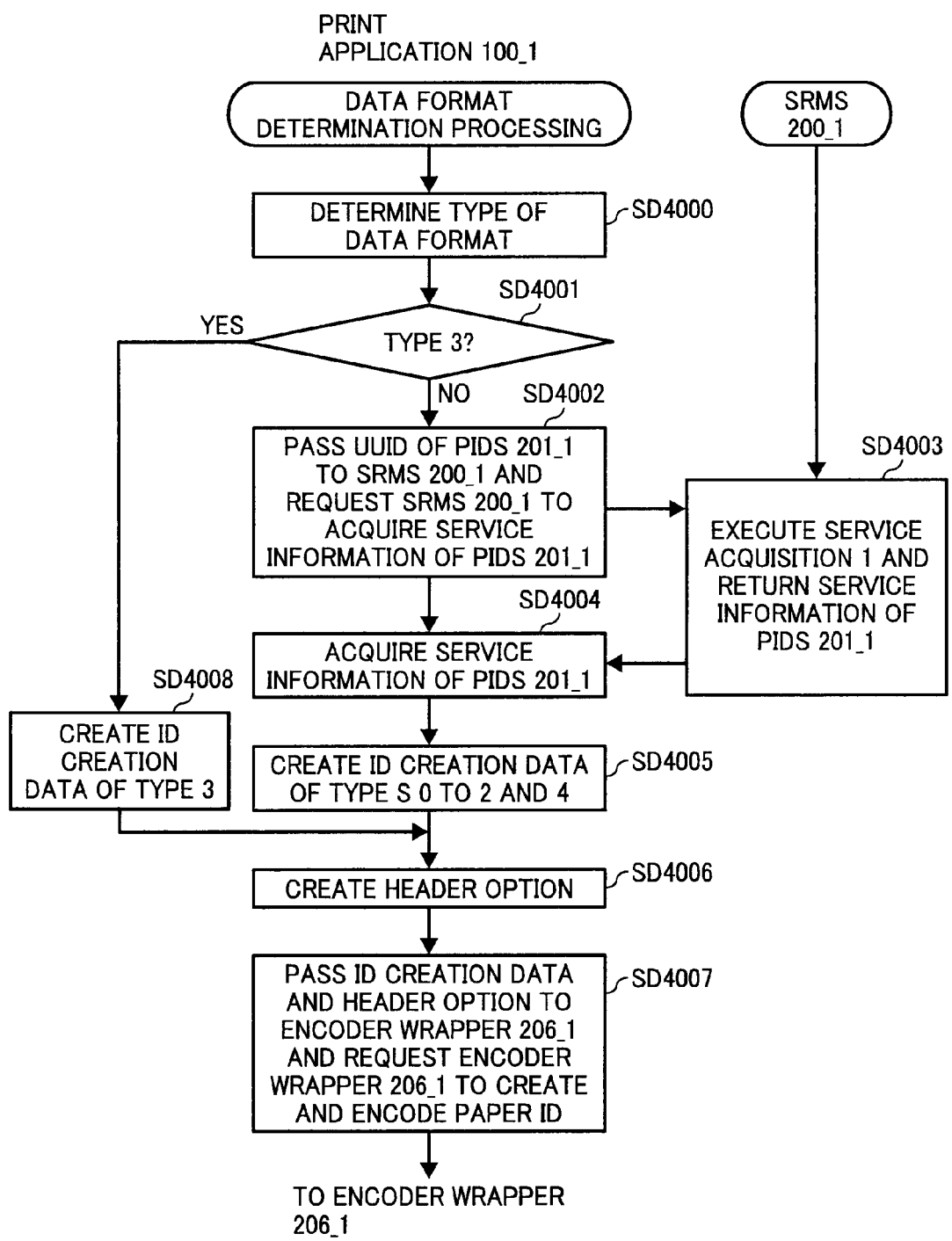
FIG. 47 is a flowchart of a procedure of data format determination processing according to the embodiment.

FIG. 47 is a flowchart of a procedure of the data format determination processing. The print application 100_1 determines a type of a data format referring to the data format flag stored in the HDD 18 (Step SD4000). When a value set in the data format flag is "3" (type 3) ("YES" at Step SD4001), the print application 100_1 creates ID creation data including the UUID of the PIDS 201_1 and the local ID of the paper information received at Step S411 (Step SD4008). The print application 100_1 creates three ID creation data page by page again.

When the value set in the data format flag is a value other than "3" (type 3) ("NO" at Step SD4001), the print application 100_1 accesses the server SV1, passes the UUID of the PIDS 201_1 received at Step S411 to the SRMS 200_1 of the server SV1, and requests the SRMS 200_1 to execute service acquisition 1 to thereby request service information of the PIDS 201_1 (Step SD4002). In response to the request, the SRMS 200_1 executes the service acquisition 1, retrieves service information of the PIDS 201_1, with which a value of the received UUID coincides, and returns relevant service information to the print application 100_1 (Step SD4003).

The print application 100_1 receives the service information of the PIDS 201_1 from the SRMS 200_1 (Step SD4004). The print application 100_1 creates ID creation data of a type (any one of type 0 to 2 and 4) corresponding to the value set in the data format flag (Step SD4005). A method of creating ID creation data according to a type of a data format is shown in FIG. 41. The print application 100_1 creates three ID creation data page by page again. Subsequently, the print application 100_1 creates a header option including "data format type", "priority among carriers during decoding", and "paper ID identification flag" in the header data shown in FIGS. 9 to 13 (Step SD4006). The print application 100_1 sets a value (any one of "0" to "4") corresponding to the type of the data format determined at Step S4000, sets "1" indicating a paper ID in "paper ID identification flag", and sets "0" in "priority among carriers during decoding" as an initial value. The print application 100_1 passes the ID creation data created at Step SD4008 or SD4005 and the header option created at Step SD4006 to the encoder wrapper 206_1 and requests the encoder wrapper 206_1 to create a paper ID corresponding to the determined type of the data format and encode the paper ID (Step SD4007).

Referring back to FIG. 46, the print application 100_1 requests the encoder wrapper 206_1 to create a paper ID and encode the paper ID (Step S412). The encoder wrapper 206_1 performs the encode processing and passes code images created by encoding the paper ID to the print application 100_1 (Step SD420). Three code images, i.e., a code image corresponding to the first page, a code image corresponding to the second page, and a code image corresponding to the third page are created. The print application 100_1 receives the code images from the encoder wrapper 206_1 (Step S415) and combines the created respective code images with respective rendering images corresponding to the respective pages in order. As a method of combining code images with rendering images, various publicly-known technologies can be used. A position where the code images are combined can be a position determined in advance (e.g., a margin on the upper right of paper). Alternatively, it is also possible that a margin in the paper (an area without an image in the rendering image) is found out and the position is set in a position of the margin. The print application 100_1 prints the rendering image obtained by combining the code images on the paper page by page (Step S416). As a result, three print results in which three paper IDs are printed as code images, respectively, are obtained.

Figure 48:
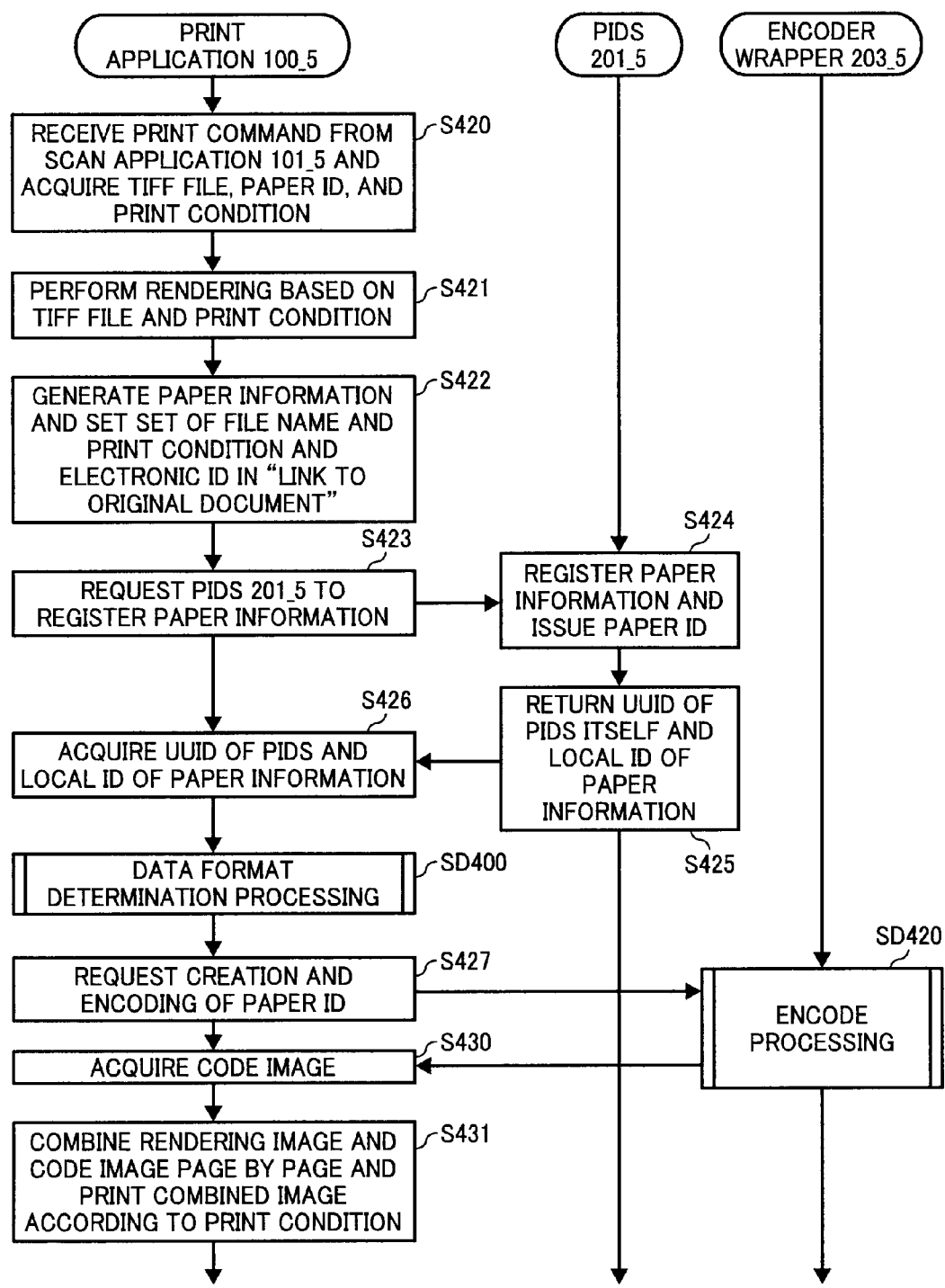
FIG. 48 is a flowchart of a procedure of an operation of the print application 100 by a scan print function according to the embodiment.

As an operation according to the scan print function, for example, the scanning unit scans the paper, which is printed by the multifunction peripheral MFP1 according to the processing explained referring to FIG. 46, according to execution of the scan application 101_5 of the multifunction peripheral MFP5 and reprints the paper according to execution of the print application 100_5 of the multifunction peripheral MFP5. FIG. 48 is a flowchart of a procedure of operations of the print application 100 according to the scan print function.

The user sets copy object paper (the paper printed by the multifunction peripheral MFP1 according to the processing explained referring to FIG. 46) in the multifunction peripheral MFP5, sets a print condition, and instructs the multifunction peripheral MFP5 to print an image. The scan application 101_5 of the multifunction peripheral MFP5 acquires a code image printed on the paper, which is a code image scanned by the scanning unit by scanning the paper. The scan application 101_5 passes a print command including a TIFF file and a paper ID obtained based on a result of the code image acquisition and the print condition set by the user to the print application 100_5. A detailed procedure of operations of the scan application 101_5 is explained later. The TIFF file is a TIFF file stored in the electronic-document DB 303 by the electronic information registration function of the EIDS 202 and acquired from the EIDS 202.

The print application 100_5 receives the print command (Step S420). The print application 100_5 performs rendering based on the TIFF file and the print condition included in the print command and creates images (rendering images) representing a print object document (Step S421). The TIFF file is information representing the three-page document. Therefore, the print application 100_5 performs rendering page by page and creates three rendering images. The print application 100_5 generates paper information of an initial state in which the respective kinds of information are not set, sets a file name in "name" in the generated paper information, sets the print condition passed from the scan application 101_5 in "print condition" of the paper information, and sets the paper ID passed from the scan application 101_5 in "link to an original document" of the paper information (Step S422). The print application 100_5 requests the PIDS 201_5 to register paper information and passes the generated paper information to the PIDS 201_5 as a parameter (Step S423). A procedure of operations at Steps S424 to S426, SD400, S427, SD420, and S430 to S431 is substantially the same as that at Steps S409 to S411, SD400, S412, SD420 and S415 to S416 explained above. Therefore, explanation of the procedure is omitted. However, at Steps S427 to S430, it is an encoder wrapper 203_5 that the print application 100_5 requests to encode the paper IDs.

As in the case of the driver printing, as a result of the processing, three print results in which three paper IDs are printed as code images, respectively, are obtained. The paper IDs are set in "link to an original document" of paper information corresponding to the paper IDs. As explained concerning Step S407, the electronic ID is set in "link to an original document" of the paper information corresponding to each of the paper IDs. Therefore, it is possible to acquire a print object electronic document using the electronic ID. Specifically, if a paper ID of a copy source is linked to a paper ID of a copy destination every time paper is copied, in copying the paper, by tracing a link of the paper information corresponding to the paper IDs, it is possible to reach paper information to which an electronic document as a print source is linked. As a result, it is possible to reach the electronic document. By interposing the paper IDs and the paper information corresponding to the paper IDs in this way, it is also possible to find when and where printing related to the electronic document is performed.

A procedure of operations of the scan application 101 is explained. In the explanation, paper printed by the multifunction peripheral MFP1 is scanned and reprinted by the multifunction peripheral MFP5. Concerning trust relations among the servers SV, it is assumed that the servers SV connected by the dotted lines in FIG. 1 form trust relations.

Figure 49:
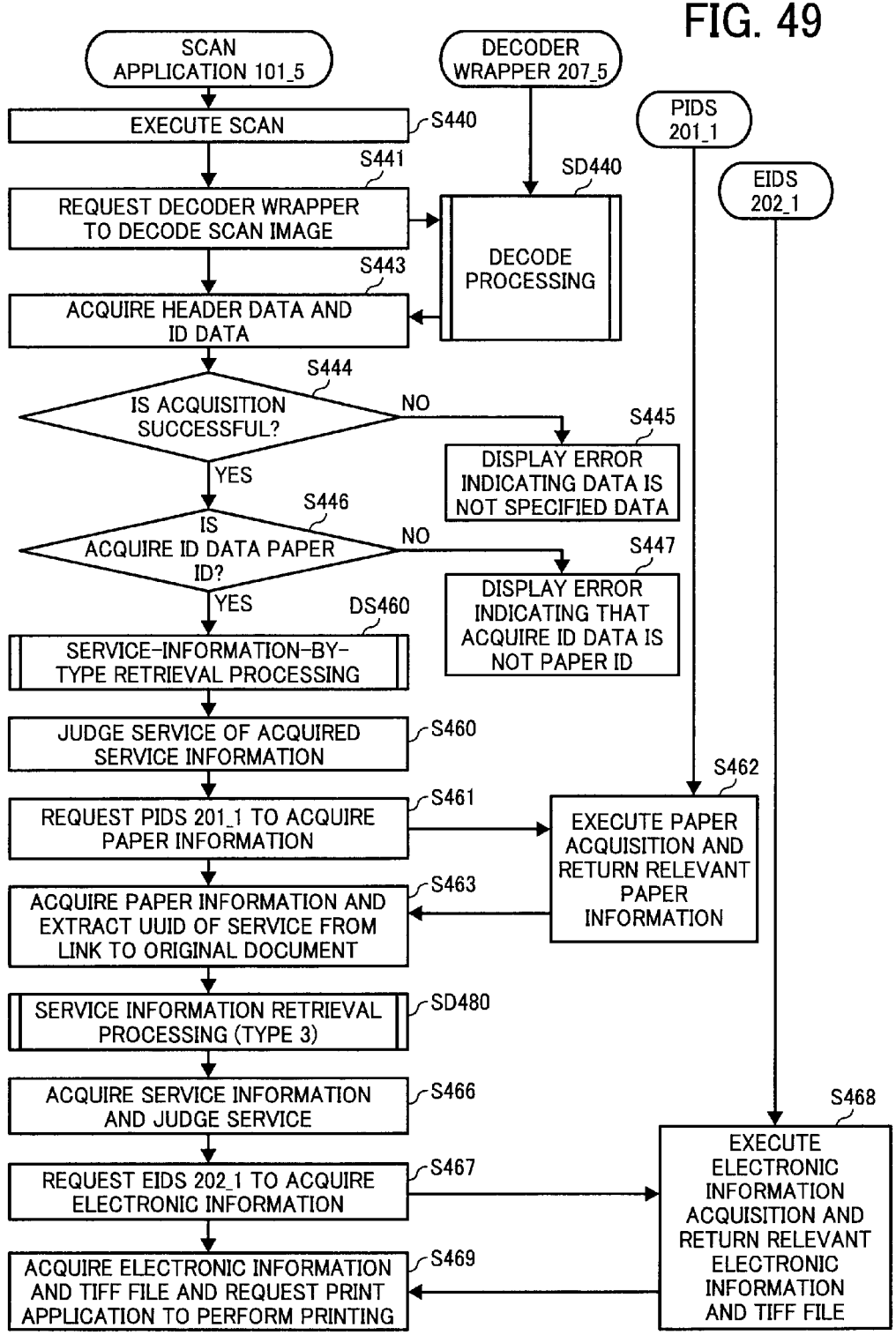
FIG. 49 is a flowchart of a procedure of an operation of a scan application 101_5 in scanning, with a multifunction peripheral MFP5, a second page of paper printed by a multifunction peripheral MFP1 according to the embodiment and reprinting the page.

FIG. 49 is a flowchart of a procedure of operations of the scan application 101_5 in scanning and reprinting, with the multifunction peripheral MFP5, a second page of paper printed by the multifunction peripheral MFP1. The power supply is turned on in the multifunction peripheral MFP5 and the scan application 101_5 is started. The scan application 101_5 causes the operation panel 20 to display items for setting a print condition and a scan button for instructing scanning. The user sets a second page of three pieces of paper printed by the multifunction peripheral MFP1 in a scanning unit (not shown) of the multifunction peripheral MFP5, sets a print condition in the operation panel 20, and depresses the scan button. The scan application 101_5 acquires the print condition and executes scanning of the paper set in the scanning unit (Step S440). The scan application 101_5 passes a scan image obtained as a result of the scanning to the decoder wrapper 207_5 and requests the decoder wrapper 207_5 to decode the scan image (step s441). The decoder wrapper 207_5 applies the decode processing to a code image included in the scan image, acquires a paper ID encoded in the code image, acquires header data and ID data from the paper ID, and passes the header data and the ID data to the scan application 101_5 (Step SD440).

The scan application 101_5 receives the header data and the ID data from the decoder wrapper 207_5 (Step S443). A result of determination at Step S444 is affirmative. Subsequently, the scan application 101_5 judges whether encode object data is a paper ID referring to a value of "paper ID identification flag" included in the header data (Step S446). The scan application 101_5 judges that the encode object data is a paper ID and proceeds to Step SD460. When a result of the determination at Step S446 is negative, the scan application 101_5 displays an error message indicating that the encode object data is not a paper ID on the operation panel 20 (Step S447). When the header data and the ID data cannot be acquired at Step S443 and error information is received ("NO" at Step S444), the scan application 101_5 displays an error message indicating that the encode object data is not specified data (Step S445). Subsequently, at Step SD460, the scan application 101_5 performs service-information-by-type retrieval processing for each of types of data formats. Referring to a value of "data format type" included in the header data received at Step S443. FIGS. 50 to 53 are flowcharts of a procedure of the service-information-by-type retrieval processing.

When the value of "data format type" is "0" (type 0) ("YES" at Step SD4610), because the service information itself of the PIDS 201 is set in "direct reference ID representation" included in the ID data as shown in FIG. 9, the scan application 101_5 acquires the service information of the PIDS 201, causes a cache to store the service information (Step SD4611), and proceeds to Step S460.

When the value of "data format type" is "1" (type 1) ("YES" at Step SD4612), the scan application 101_5 judges whether service information of a PIDS coinciding with a value of "UUID of a PIDS" included in the ID data is stored in the cache (Step SD4613). When a result of the judgment is affirmative, the service information of the PIDS 201 has already been acquired. Therefore, the scan application 101_5 proceeds to Step S460. When the result of the judgment at Step SD4613 is negative, the scan application 101_5 determines whether service information of the SRMS 200 coinciding with a value of "UUID of an SRMS" included in the ID data is stored in the cache (Step SD4614). When a result of the judgment is affirmative, the scan application 101_5 accesses the SRMS 200 of the server SV referring to "URI" included in the service information, passes "UUID of a PIDS" included in the ID data to the SRMS 200, and requests the SRMS 200 to execute the service acquisition 1 (acquisition of service information of the PIDS 201). The SRMS 200 executes the service acquisition 1 according to the request and passes the service information of the PIDS 201 to the scan application 101_5. The scan application 101_5 acquires the service information of the PIDS 201 (Step SD4615), causes the cache to store the service information (Step SD4616), and proceeds to Step S460. When the result of the judgment at Step S4614 is negative, the scan application 101_5 sets the SRMS 200_3 of the server SV3 in the identical in-house system SYM3 as an object SRMS (Step SD4617). The scan application 101_5 passes "UUID of a PIDS" to the object SRMS and requests the object SRMS to execute the service acquisition 1 to thereby request the object SRMS to acquire the service information of the PIDS 201 (Step SD4618). The object SRMS executes the service acquisition 1 according to the request and passes the service information of the PIDS 201 to the scan application 101_5 ("YES" at Step SD4619). The scan application 101_5 causes the cache to store the service information of the PIDS 201 (Step SD4620) and proceeds to Step S460. As a result of the processing at Step SD4618, when the service information of the PIDS 201 cannot be acquired ("NO" at Step SD4619), the scan application 101_5 passes "UUID of an SRMS" to the object SRMS and requests the object SRMS to execute the service acquisition 1 to thereby request the object SRMS to acquire the service information of the SRMSs 200 (Step SD4621). As a result of the processing at Step SD4621, when the service information of the SRMSs 200 can be obtained ("YES" at Step SD4622), the scan application 101_5 acquires the service information of the SRMSs 200 and causes the cache to store the service information (Step SD4623). Subsequently, the scan application 101_5 passes "UUID" of a PIDS" to the SRMS 200 and requests the SRMS 200 to execute the service acquisition 1 to thereby request the SRMS 200 to acquire the service information of the PIDS 201. The scan application 101_5 acquires the service information of the PIDS (Step SD4624) and causes the cache to store the service information (Step SD4625). As a result of the processing at Step SD4621, when the service information of the SRMSs 200 cannot be acquired ("NO" at Step SD4622), the scan application 101_5 requests the object SRMS to execute the service acquisition 3 to thereby request the object SRMS to acquire service information list obtained by forming a list of the service information of the SRMSs 200 (Step SD4626). The object SRMS executes the service acquisition 3 according to the request and passes the service information list to the scan application 101_5. The scan application 101_5 causes the cache to store all the pieces of service information of the SRMSs 200 in the service information list (Step SD4627). Subsequently, the scan application 101_5 sets the SRMS 200 not set as the object SRMS among the SRMSs 200, the service information of which is present in the service information list, as an object SRMS (Step SD4628), proceeds to Step SD4618, and performs the same processing after that.

When a type of a data format is other than "type 0", first, the scan application 101_5 judges, using UUID included in the ID data, whether service information corresponding to the UUID is stored in the cache. When relevant service information is not stored in the cache, the scan application 101_5 executes the service acquisition 1 to thereby retrieve the service information. When the service information is not obtained, the scan application 101_5 executes the service acquisition 3 to thereby retrieve the SRMS 200 that is in a trust relationship. The scan application 101_5 causes the SRMS 200 in the trust relationship to execute the service acquisition 1 and repeats the service acquisition 1 and the service acquisition 3 until relevant service information is obtained.

The scan application 101_5 causes the cache to store the acquired service information to make it possible to use, in print processing in the next and subsequent times, the service information stored in the cache. As a result, it is possible to reduce processing time. When a URI of the PIDS 201 is changed after the scan application 101 acquires the service information, the scan application 101 cannot access the PIDS 201. In such a case, the scan application 101 only has to request the SRMS 200 to acquire latest service information of the PIDS 201, acquires the service information, and updates the service information of the PIDS 201 stored in the cache to latest information. When "data format type" is "0" (type 0), the service information itself of the PIDS 201 is included in the ID data. When a URI of the PIDS 201 is changed after a paper ID including the ID data is encoded into a code image and printed on paper, the scan application 101 cannot access the PIDS 201 using service information included in the paper ID. However, in such a case, the scan application 101 only has to perform processing same as the processing performed when "data format type" is "1" (type 1) using various kinds of information included in the service information (e.g., "UUID of a service" and "master UID).

Figure 50:
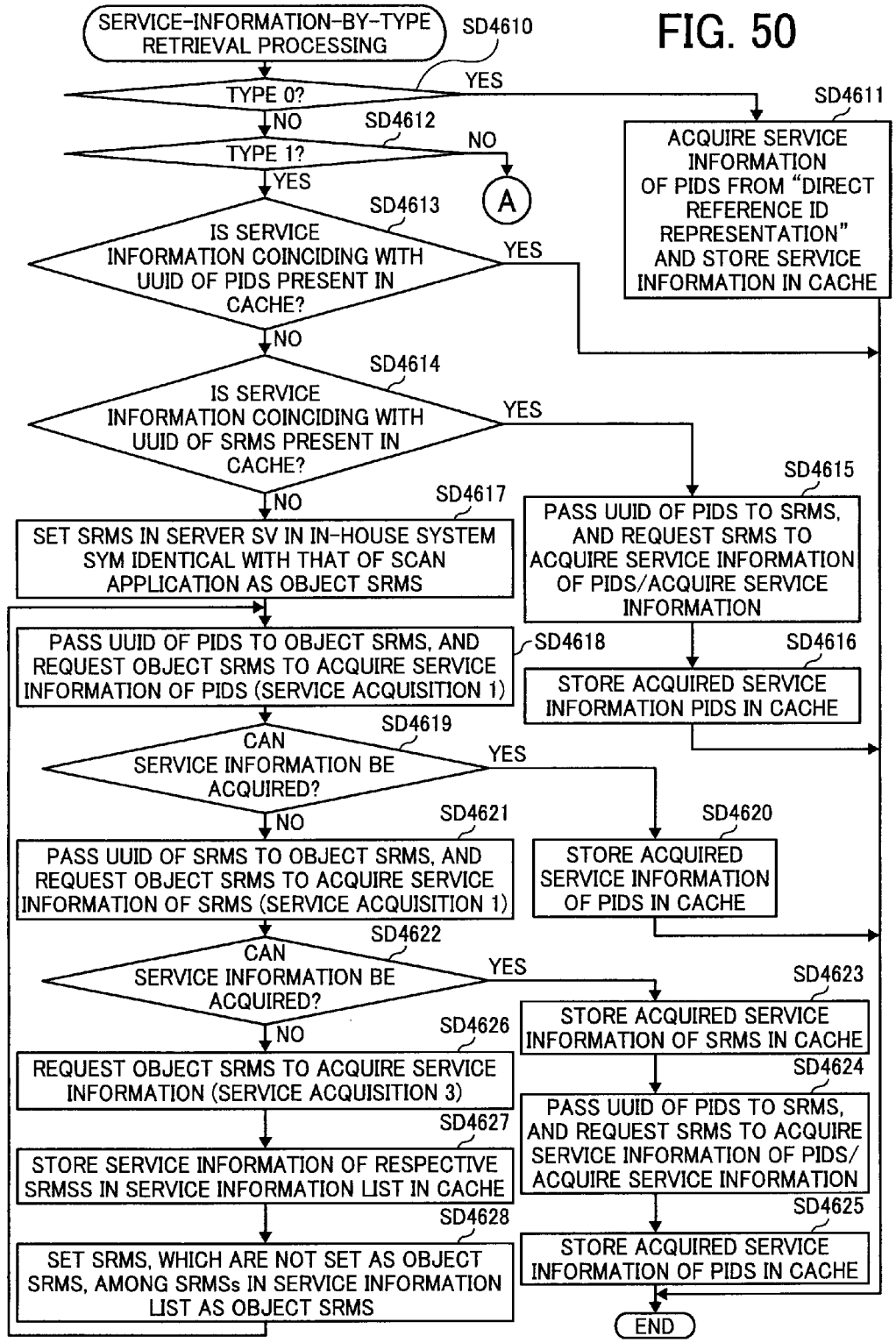
FIG. 50 is a flowchart of a procedure of service-information-by-type retrieval processing according to the embodiment.

In the flowchart shown in FIG. 50, the scan application 101_5 determines, in order of service information coinciding with a value of "UUID of a PIDS" and service information coinciding with value of "UUID of an SRMS", whether the service information is present in the cache. When the service information is not present, the scan application 101_5 requests acquisition of the service information. This is because there are fewer steps in a processing procedure after this when the service information is retrieve in this order. However, the scan application 101_5 can determine, in order of service information coinciding with a value of "UUID of an SRMS" and service information coinciding with a value of "UUID of a PIDS", whether the service information is present in the cache. When the service information is not present, the scan application 101_5 can request acquisition of service information.

Figure 51:
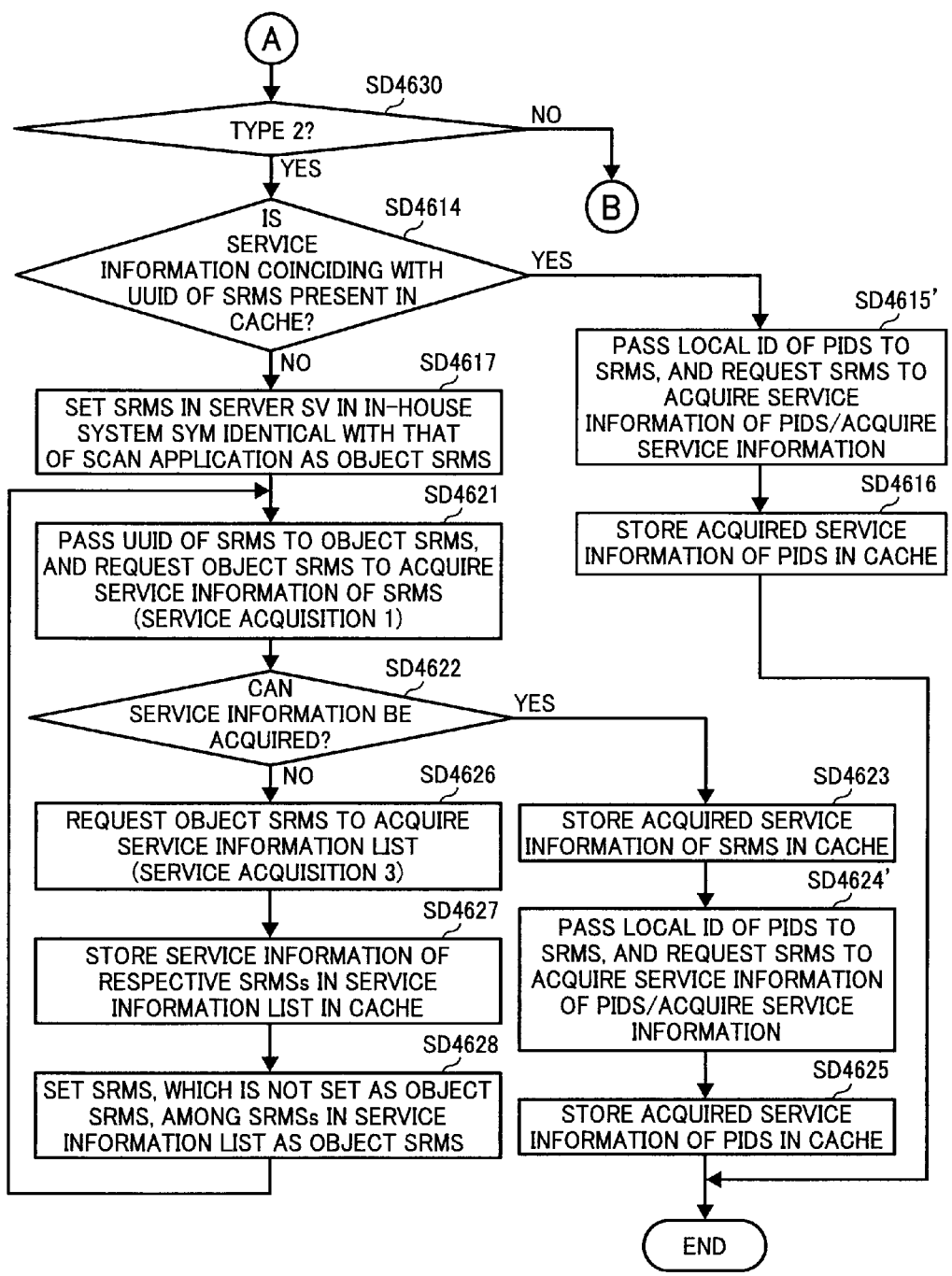
FIG. 51 is a flowchart of the procedure of the service-information-by-type retrieval processing according to the embodiment.

Referring to FIG. 51, the procedure of the service-information-by-type retrieval processing is further explained. When a value of "data format type" is "2" (type 2) ("YES" at Step SD4630), the scan application 101_5 performs the processing at Step SD4613. When the result of the judgment at Step SD4614 is affirmative, the scan application 101_5 performs processing at Step SD4615'. At Step SD4615', in the same manner as Step SD4615, the scan application 101_5 accesses the SRMS 200 of the server SV using the service information stored in the cache. The scan application 101_5 passes "local ID of a PIDS" included in the ID data acquired at Step S443 to the SRMS 200 and requests the SRMS 200 to execute the service acquisition 4 to thereby request the SRMS 200 to acquire service information of the PIDS 201. The SRMS 200 executes the service acquisition 1 according to the request and passes the service information of the PIDS 201 to the scan application 101_5. The scan application 101_5 acquires the service information of the PIDS 201, causes the cache to store the service information (Step SDS4616), and proceeds to Step S460. When the result of the judgment at Step SD4614 is negative, the scan application 101_5 performs the processing at Step SD4617 and SD4621. Thereafter, the scan application 101_5 performs the processing at Step SD4622. When the result of the judgment at Step SD4622 is affirmative, after the processing at Step SD4623, the scan application 101_5 perform processing at Step SD4624'. At Step SD4624', in the same manner as Step SD4615', the scan application 101_5 passes "local ID of a PIDS" included in the ID data acquired at Step S443 to the SRMS 200, requests the SRMS 200 to execute the service acquisition 4, and acquires the service information of the PIDS 201. When the result of the judgment at Step SD4622 is negative, the scan application 101_5 performs the processing at Step SD4626 and subsequent steps and, after Step SD4628, proceeds to Step SD4621 and performs the processing at Step SD4621 and subsequent steps.

Figure 52:
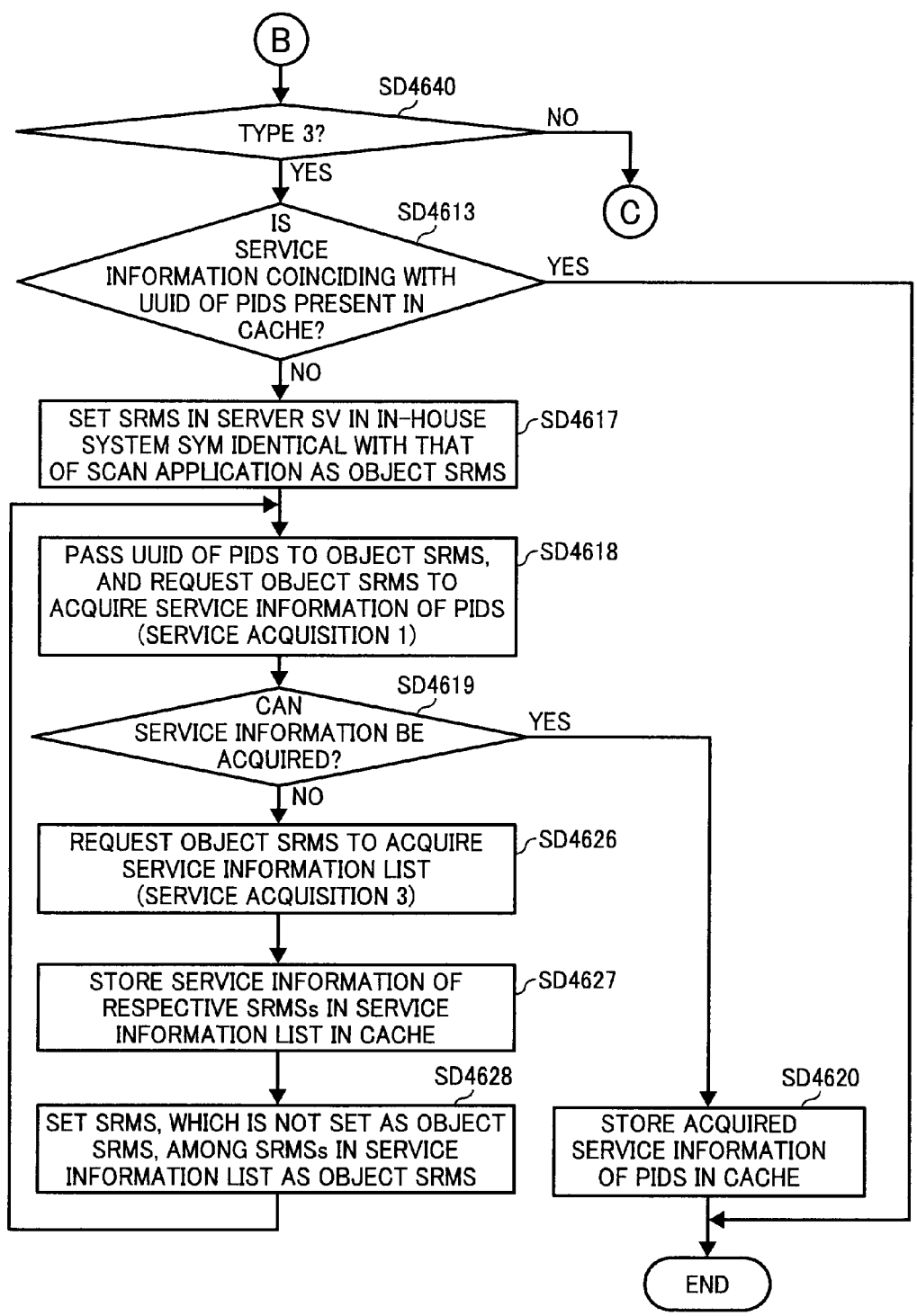
FIG. 52 is a flowchart of the procedure of the service-information-by-type retrieval processing according to the embodiment.

Referring to FIG. 52, the procedure of the service-information-by-type retrieval processing is further explained. When a value of "data format type" is "3" (type 3) ("YES" at Step SD4640), the scan application 101_5 proceeds to the processing at Step SD4613. When the result of the judgment at Step SD4613 is affirmative, the scan application 101_5 proceeds to Step S460. When the result of the judgment at Step SD4613 is negative, the scan application 101_5 performs the processing at Steps SD4617 to SD4619. When the result of the judgment at Step SD4619 is affirmative, the scan application 101_5 proceeds to Step SD4620 and Step S460 in this order. When the result of the judgment at Step SD4619 is negative, the scan application 101_5 performs the processing at Steps SD4625 to SD4627 and, thereafter, performs processing at Step SD4618 and subsequent steps.

Figure 53:
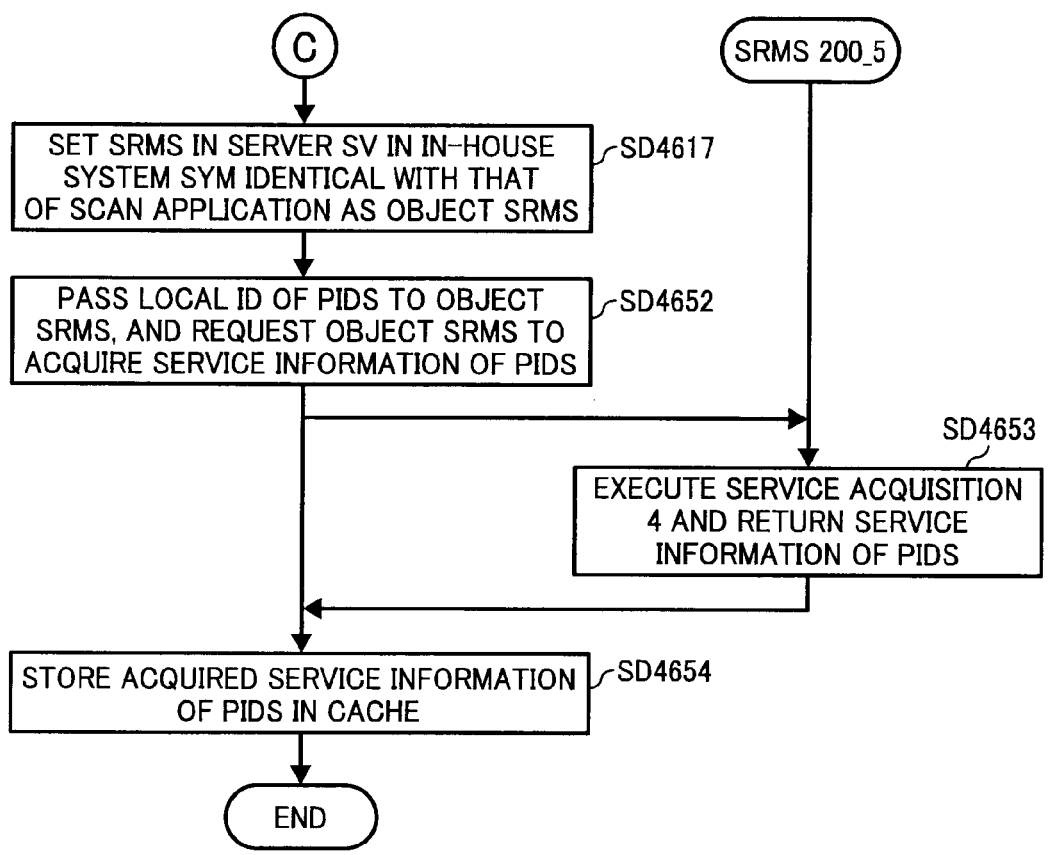
FIG. 53 is a flowchart of the procedure of the service-information-by-type retrieval processing according to the embodiment.

Referring to FIG. 53, the procedure of the service-information-by-type retrieval processing is further explained. When the value of "data format type" is "4" (type 4) ("NO" at Step SD4640 in FIG. 52), the scan application 101_5 performs the processing at Step SD4617. Subsequently, the scan application 101_5 passes "local ID of a PIDS" included in the ID data acquired at Step S443 to the object SRMS (the SRMS 200_5) and requests the object SRMS to execute the service acquisition 4 to thereby request the object SRMS to acquire the service information of the PIDS 201 (Step SD4652). When the SRMS 200_5 is requested to execute the service acquisition 4, the SRMS 200_5 executes the service acquisition 4 and returns the service information of the PIDS 201 to the scan application 101_5 (Step SD4653). The scan application 101_5 receives the service information of the PIDS 201 (Step SD4654), causes the cache to store the service information, and proceeds to Step S460.

Referring back to FIG. 49, at Step S460, the scan application 101_5 judges whether the service information indicates what kind of service referring to "name space" of the acquired service information of the PIDS 201. For example, when "jp.co.ricoh.pids" is set in the name space, the scan application 101_5 judges that the service information indicates a PIDS. When "jp.co.ricoh.eids" is set in the name space, the scan application 101_5 judges that the service information indicates an EIDS. It is assumed that the service information of the PIDS 201_1 is returned and the name space is "jp.co.ricoh.pids". Therefore, the scan application 101_5 judges that a service indicated by the service information is the PIDS 201. When it is judge that the service is the PIDS 201, the scan application 101_5 accesses the PIDS 201_1 referring to "URI" of the service information, passes "local ID of paper information" included in the ID data acquired at Step S444 to the PIDS 201_1, and requests the PIDS 201_1 to acquire paper information (Step S461). The multifunction peripheral MFP5 having the scan application 101_5 is a client as a request source of the processing explained with reference to FIG. 18. The client and the PIDS 201_1 perform SOAP communication using the Web service. The PIDS 201_1 acquires paper information corresponding to a value of "local ID of paper information" referring to the paper-information table 301A_1 stored in the paper-information DB 301_1 and returns the paper information to the scan application 101_5 (Step S462). The scan application 101_5 acquires the paper information and acquires an ID set in "link to an original document" of the paper information. A paper ID is set in "link to an original document" in some case and an electronic ID is set in "link to an original document" in the other. Therefore, at this point, it cannot be judged which of the paper ID and the electronic ID is set. However, the paper ID and the electronic ID are the same in that both the IDs are combinations of UUIDs and local IDs. Therefore, first, the scan application 101_5 extracts a UUID of the service from the ID set in "link to an original document" (Step S463).

Subsequently, the scan application 101_5 performs, with the UUID of the service extracted at Step S463, service information retrieval processing same as that performed when "data format type" is "3" (type 3) in the service-information-by-type retrieval processing (Step SD480). A procedure of the service information retrieval processing is substantially the same as the service information retrieval processing in the case of type 3 shown in FIG. 52. Therefore, the procedure is not shown in a figure. Differences from the procedure described above are explained. Specifically, instead of using the ID data acquired at Step S443 as a retrieval key, the UUID of the service extracted at Step S463 is used as a retrieval key. At Step SD4613, the scan application 101_5 judges whether service information coinciding with the UUID of the service extracted at Step S463 is stored in the cache. At Step SD4618, the scan application 101_5 requests the object SRMS to acquire the service information coinciding with the UUID of the service extracted at Step S463. At Step SD4620, the scan application 101_5 acquires the service information coinciding with the UUID of the service extracted at Step S463 from the object SRMS and causes the cache to store the service information. In this way, the scan application 101_5 performs retrieval of service information using the UUID of the service extracted at Step S463 and acquires relevant service information. It is assumed that an electronic ID is set in "link to an original document" of the paper information acquired at Step S462 and, at Step SD480, the service information of the EIDS 202_1 is acquired.

The scan application 101_5 acquires the service information of the EIDS 202_1. The scan application 101_5 judges, referring to "name space" of the service information, which service the service information indicates (Step S466). The scan application 101_5 judges that a service indicated by the service information is an EIDS because "jp.co.ricoh.eids" is set in the name apace. Then, the scan application 101_5 accesses the EIDS 202_1 referring to "URI" of the service information, passes the ID (the electronic ID) acquired at Step S463 to the EIDS 202_1, and requests the EIDS 202_1 to execute acquisition of electronic information (Step S467). The multifunction peripheral MFP5 having the scan application 101_5 is a client as a request source of the processing explained in FIG. 18. The client and the EIDS 202_1 perform SOAP communication using the Web service. The EIDS 202_1 acquires electronic information corresponding to the electronic ID referring to the electronic-information table 302A_1 stored in the electronic-information DB 302_1. The EIDS 202_1 acquires an electronic document (a TIFF file) stored in the electronic-document DB 303_1 using the document acquisition function of the repository 205_1 and returns the TIFF file to the scan application 101_5 together with the electronic information (Step S468). The scan application 101_5 acquires the electronic information and the TIFF file. The scan application 101_5 passes a print command including the TIFF file, the paper ID 1-2 obtained from the scan image at Step S443, and the print condition set by the user on the operation panel 20 to the print application 100_5 (Step S469). Then, the print application 100_5 can execute the processing at Steps S420 to S431 and obtain a print result of three pieces of paper. It is assumed that code images representing the paper ID 5-1, the paper ID 5-2, and the paper ID 5-3 are printed on the pieces of paper of the print result, respectively, in order of pages.

Effects realized by the data formats for the respective types of paper IDs, i.e., the data formats type 0 to type 4 are explained in three cases. In all the cases, the multifunction peripheral MFP5 performs reprinting.

a) The multifunction peripheral MFP5 scans and reprints a second page (corresponding to the local ID "2" of the paper information managed by the PIDS 201_1) of paper (a word document of three pages in total) printed by the multifunction peripheral MFP1.

b) After the processing in a), the multifunction peripheral MFP5 scans and reprints a first page (corresponding to the local ID "1" of the paper information managed by the PIDS 201_3) of paper (a word document of three pages in total) printed by the multifunction peripheral MFP3.

c) After the processing in b), the multifunction peripheral MFP5 scans and reprints a second page (corresponding to the local ID "5" of the paper information managed by the PIDS 201_5) of paper (a PDF document of two pages in total) printed by the multifunction peripheral MFP1.

FIG. 54 is a diagram of an example of the data structure of the paper-information table 301A_1 held by the multifunction peripheral MFP1 in the case a). FIG. 55 is a diagram of an example of the data structure of the electronic-information table 302A_1 held by the multifunction peripheral MFP1 in the case a). FIG. 56 is a diagram of an example of the paper-information table 301A_3 held by the multifunction peripheral MFP3 in the case b). FIG. 57 is a diagram of an example of the data structure of the electronic-information table 302A_3 held by the multifunction peripheral MFP3 in the case b). FIG. 58 is a diagram of an example of the data structure of the paper-information table 301A_1 held by the multifunction peripheral MFP1 in the case c). FIG. 59 is a diagram of an example of the data structure of the electronic-information table 302A_1 held by the multifunction peripheral MFP1 in the case c).

In the respective cases, values of data set in ID data are as described below. First, the data formats type 0 to type 3 are explained. In the case a), when "data format type" is "0" (type 0), the service information of the PIDS 201_1 and "2" as "local ID of paper information" are set in the ID data. When "data format type" is "1" (type 1), "S001" as "UUID of an SRMS", "P001" as "UUID of a PIDS", and "2" as "local ID of paper information" are set in the ID data. When "data format type" is "2" (type 2), "S001" as "UUID of an SRMS2, "2" as "local ID of a PIDS", and "2" as "local ID of paper information" are set in the ID data. When "data format type" is "3" (type 3), "P001" and "2" as "local ID of paper information" are set in the ID data.

In the case b), when "data format type" is "0" (type 0), the service information of the PIDS 201_3 and "1" as "local ID of paper information are set in the ID data. When "data format type" is "1" (type 1), "S002" as "UUID of an SRMS", "P003" as "UUID of a PIDS", and "1" as "local ID of paper information" are set in the ID data. When "data format type" is "2" (type 2), "S001" as "UUID of an SRMS", "2" as "local ID of a PIDS", and "1" as "local ID of paper information" are set in the ID data. When "data format type" is "3" (type 3), "P003" as "UUID of a PIDS" and "1" as "local ID of paper information" are set in the ID data.

In the case c), when "data format type" is "0" (type 0), the service information of the PIDS 201_1 and "5" as "local ID of paper information" are set in the ID data. When "data format type" is "1" (type 1), "S001" as "UUID of an SRMS", "P001" as "UUID of a PIDS", and "5" as "local ID of paper information" are set in the ID data. When "data format type" is "2" (type 2), "S001" as "UUID of an SRMS", "2" as "local ID of a PIDS", and "5" as "local ID of paper information" are set in the ID data. When "data format type" is "3" (type 3), "P001" as "UUID of PIDS" and "5" as "local ID of paper information" are set in the ID data.

In the data structure described above, in the case a), it is assumed that none of the service information of the SRMS 200, the PIDS 201, and the EIDS 202 is stored in the cache of the multifunction peripheral MFP5 before the print object paper is printed. In this case, in all the data formats type 1 to type 3, it is necessary to acquire at least the service information of the PIDS 201. In some case, it is necessary to perform retrieval of service information based on the service information list for the acquisition of the service information. Therefore, it is considered that there is no large difference in processing time and processing efficiency due to a difference among the data formats type 1 to type 3 other than the data format type 0.

In the case a), after paper is printed, service information of a service with a UUID coinciding with "S004" (the service information of the SRMS 200_4), service information of a service with a UUID coinciding with "S002" (the service information of the SRMS 200_2), service information of a service with a UUID coinciding with "P001" (the service information of the PIDS 201_1), and service information of a service of a service with a UUID corresponding to "E001" (the service information of the EIDS 201_1) are stored in the cache of the multifunction peripheral MFP5. Therefore, in the case b), when "data format type" is "1" (type 1) or "2" (type 2), because service information of a service with a UUID coinciding with "S002" (the service information of the SRMS 200_2) is stored in the cache, the result of the judgment at Step SD4614 is affirmative. It is possible to acquire, using the service information, the service information of the PIDS 201. Therefore, time for the service information retrieval processing is reduced.

In the case c), when "data format type" is "1" (type 1) or "3" (type 3), because service information of a service with a UUID coinciding with "P001" (the service information of the PIDS 201_1) is stored in the cache of the multifunction peripheral MFP5, the result of the judgment at Step SD4613 is affirmative. It is possible to immediately finish the service information retrieval processing.

Consequently, when likelihood of availability of service information stored in the cache is higher in order of the data formats type 1 to type 3 and relevant service information is stored in the cache, it is possible to use processing using the service information. Therefore, it is possible to substantially reduce processing time. Likelihood of availability of service information stored in the cache is higher in the data format of type 2 than the data format of type 3 because the number of pieces of service information of the SRMS 00 is smaller than the number of pieces of service information of the PIDS 201 or the number of pieces of service information of the EIDS 202.

A data amount of ID data forming a paper ID increases in order of type 3, type 2, type 1, and type 0 as the types of the data formats. Because speed of processing performed by the scan application 101 is increased and the number of times of request for acquisition of service information is reduced, network loads can be reduced. Therefore, the user can set a type of the paper ID and set a type of a data format taking into account a balance of the data amount of the paper ID and processing efficiency.

When "data format type" is "4" (type 4), a retrieval key for acquiring the service information of the PIDS 201 is only "local ID of a PIDS". "Local ID of a PIDS" can retain uniqueness thereof only in the service-information table 300A held by the SRMS 200 that directly manages the service information of the PIDS 201 corresponding "local ID of a PIDS". Therefore, only when printing is performed in the multifunction peripheral MFP including the SRMS 200 that directly manages the service information of the PIDS 201, the scan application 101 can correctly acquire the service information of the PIDS 201. However, because it is possible to set a data amount of a paper ID extremely small by creating the paper ID in the data format of type 4, for example, it is possible to encode the paper ID into a one-dimensional barcode. Therefore, the data format of type 4 is useful when it is desired to control a data amount in encoding the paper ID into a code image The present invention is not limited to the embodiment explained above. Various modifications explained below as examples are possible.

The various programs executed by the multifunction peripheral MFP explained above may be stored in the HDD 18 instead of the ROM 12a. The various programs may be stored on a computer connected to a network such as the Internet and provided by being downloaded through the network. The various programs may be provided by being recorded in computer-readable recording media such as a compact disk-read only memory (CD-ROM), a flexible disk (FD), a compact disk-recordable (CD-R), and a digital versatile disk (DVD) as files of an installable format or an executable format.

Functions of the print application 100, the scan application 101, the encoder wrapper 206, the decoder wrapper 207, and the repository 205 explained as the functions of the multifunction peripheral MFP in the embodiment are not limited to those explained above. At least two of these functions may be combined, a part of at least one of the functions may be incorporated in the other functions, or the function may be subdivided.

According to the embodiment, a different local ID is issued for each page and a code image of a paper ID including the different local ID is created for each page. However, the same local ID may be issued to all pages included in one electronic document to issue a paper ID including the local ID. A paper ID may be issued for each predetermined number of pages. A code image may be printed on at least one piece of paper among a plurality of pieces of paper. A code image may be printed only on a first page or a specific page. An identical code image may be printed on respective pages.

The service DB 300, the paper-information DB 301, the electronic-information DB 302, and the electronic-document 303 included in the multifunction peripheral MFP in the embodiment may be stored in a storage device such as a hard disk or may be stored in recording media such as a CD-ROM, an FD, a CD-R, and a DVD detachably insertable in the multifunction peripheral MFP. The same holds true for the service DB 300 included in the server SV.

In the embodiments described above, the data formats type 0 to type 4 shown in FIGS. 9 to 13 are treated. However, the present invention is not limited to this. The respective data formats are formed by the header data and the ID data. However, data formats are not limited to these data formats. The data structure of the header data and the data structure of the ID data are not limited to those described above.

In the embodiments, the print application 100 judges, using the data format flag determined in advance, which of the data formats is used in creation of a paper ID. However, for example, it is also possible that, for example, a user performs operation input for determining a type of a data format in a personal computer PC, a printer driver of the personal computer PC transmits information for designating a type of a data format to the multifunction peripheral MFP, and the multifunction peripheral MFP receives the information for designating the type of the data format and determines a data format of a paper ID using the information.

In the embodiments, a plurality of kinds of data formats are present for a paper ID to be encoded into a code image. However, the present invention is not limited to this. An electronic ID set in "link of an original document" included in paper information can also be represented by using a plurality of kinds of data formats.

In the embodiments, all the multifunction peripherals MFP configuring in the image processing system include the IDSs 201 and the EIDSs 202 and all the servers SV include the SRMSs 200. However, at least one multifunction peripheral MFP configuring the image processing system can include at least one of the PIDS 201 and the EIDS 202. At least one server SV configuring the image processing system can include at least one of the PIDS 201 and the EIDS 202.

A plurality of kinds of paper identification information encoded into a code image to specify a print object electronic document can be treated. This makes it possible to set the kinds of the paper identification information taking into account a balance between a data amount and processing efficiency. Therefore, it is possible to cope with various network connection environments and processing environments.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a reading unit that acquires an image read by scanning a first paper medium with a scanning unit;
a code acquiring unit that extracts a predetermined code image from the image acquired by the reading unit, decodes the code image, and acquires paper identification information for identifying the first paper medium;
a communication unit that performs data communication with a server apparatus that includes a service-information storing unit and a service-information control unit, the service-information storing unit storing first service information for specifying an electronic-information control unit that manages electronic information for specifying a print object electronic document stored in an electronic-document storing unit, the electronic information being stored in an electronic-information storing unit in association with electronic identification information for identifying the electronic information, and second service information for specifying a paper-information control unit that manages paper information including print source information for specifying a print source of the first paper medium and stored in a paper-information storing unit in association with paper identification information for identifying a print object paper medium, the service-information control unit managing the first service information and the second service information;
a paper-information acquiring unit that judges, based on the paper identification information acquired by the code acquiring unit, types of the paper identification information, acquires, according to the types, the second service information for specifying the paper-information control unit that manages the paper information stored in the paper-information storing unit in association with the paper identification information, accesses the paper-information control unit using the second service information, and acquires the paper information from the paper-information control unit;
an electronic-document acquiring unit that acquires, using the print source information included in the paper information acquired by the paper-information acquiring unit, the first service information for specifying the electronic-information control unit that manages the electronic information for specifying the print object electronic document from the service-information control unit of the server apparatus via the communication unit, accesses the electronic-information control unit using the first service information, acquires the electronic information from the electronic-information control unit, and acquires the electronic document specified by the electronic information; and
a printing unit that forms a print image using the electronic document acquired by the electronic-document acquiring unit and prints the print image on a second paper medium.

2. The image processing apparatus according to claim 1, wherein
the paper identification information of a first type among the types includes the second service information and second paper identification information for identifying the paper information, and
the paper-information acquiring unit acquires, when it is judged that a type of the paper identification information acquired by the code acquiring unit is the first type, the second service information included in the paper identification information, accesses the paper-information control unit using the second service information, and acquires the paper information from the paper-information control unit using the second paper identification information.

3. The image processing apparatus according to claim 1, wherein
the second service information includes second control identification information that ca identify the paper-information control unit,
the paper identification information of a second type among the types includes the second control identification information and second paper identification information for identifying the paper information, and the paper-information acquiring unit acquires, when it is judged that a type of the paper identification information acquired by the code acquiring unit is the second type, the second service information for specifying the paper-information control unit identified by the second control identification information included in the paper identification information, accesses the paper-information control unit using the second service information, and acquires the paper information from the paper-information control unit using the second paper identification information.

4. The image processing apparatus according to claim 3, further comprising a storing unit that stores the second service information, wherein the paper-information acquiring unit judges whether the second service information for specifying the paper-information control unit identified by the second control identification information included in the paper identification information is stored in the storing unit and, when a result of the judgment is affirmative, accesses the paper-information control unit using the second service information and acquires the paper information from the paper-information control unit using the second paper identification information.

5. The image processing apparatus according to claim 1, further comprising a storing unit that stores at least one of the second service information and third service information for specifying the service-information control unit, wherein
the second service information includes second control identification information for identifying the paper-information control unit and third control identification information for identifying the service-information control unit that directly manages the second service information,
the paper identification information of a third type among the types includes the third control identification information, the second control identification information, and second paper identification information for identifying the paper information, and
the paper-information acquiring unit judges, when it is judged that a type of the paper identification information acquired by the code acquiring unit is the third type, whether the second service information for specifying the paper-information control unit identified by the second control identification information included in the paper identification information is stored in the storing unit and, when a result of the judgment is negative and when the third service information for specifying the service-information control unit identified by the third identification information included in the paper identification information is stored in the storing unit, accesses the service-information control unit using the third service information via the communication unit and acquires the second service information from the service-information control unit using the second control identification information.

6. The image processing apparatus according to claim 5, wherein the paper-information acquiring unit acquires, when the second service information for specifying the paper-information control unit identified by the second control identification information included in the paper identification information is not stored in the storing unit and when the second service information cannot be acquired from the service-information control unit, another piece of third service information for specifying another service-information control unit stored in the service-information storing unit from the service information control unit of the server apparatus via the communication unit, accesses the another service information control unit specified by the another piece of third service information via the communication unit, and acquires the second service information from the another service-information control unit using the second control identification information.

7. The image processing apparatus according to claim 1, wherein
the paper identification information includes type information indicating the types, and
the paper-information acquiring unit judges a type of the paper identification information using the type information included in the paper identification information acquired by the code acquiring unit, acquires, according to the types, the second service information for specifying the paper-information control unit, which manages the paper information stored in the paper-information storing unit in association with the paper identification information, from the service-information control unit via the communication unit, accesses the paper-information control unit using the second service information, and acquires the paper information from the paper-information control unit.

8. The image processing apparatus according to claim 5, further comprising:
the paper-information control unit; and
a paper-information storing unit that stores the paper information, wherein
the paper-information control unit creates new paper information including, as the print source information, second paper identification information for identifying the paper information corresponding to the first paper medium and issues new second paper identification information to the new paper information, and
the printing unit includes
an identification-information acquiring unit that acquires the new second paper identification information issued by the paper-information control unit and second control identification information for identifying the paper-information control unit,
a type determining unit that determines a type of the paper identification information created as information for specifying the paper information,
a paper-identification-information creating unit that creates the paper identification information of the type determined by the type determining unit using the new second identification information and the second control identification information acquired by the identification-information acquiring unit,
a code-image creating unit that creates a code image created by encoding the paper identification information created by the paper-identification-information creating unit, and
an image processing unit that creates a print image using an electronic document acquired by the electronic-document acquiring unit and prints the code image created by the code-image creating unit on the second paper medium together with the print image.

9. An image processing method comprising:
reading including acquiring an image read by scanning a first paper medium with a scanning unit;
code acquiring including
extracting a predetermined code image from the image acquired at the reading,
decoding the code image, and
acquiring paper identification information for identifying the first paper medium;

performing data communication using a communication unit with a server apparatus that includes a service-information storing unit and a service-information control unit, the service-information storing unit storing first service information for specifying an electronic-information control unit that manages electronic information for specifying a print object electronic document stored in an electronic-document storing unit, the electronic information being stored in an electronic-information storing unit in association with electronic identification information for identifying the electronic information, and second service information for specifying a paper-information control unit that manages paper information including print source information for specifying a print source of the first paper medium and stored in a paper-information storing unit in association with paper identification information for identifying a print object paper medium, the service-information control unit managing the first service information and the second service information;

paper-information acquiring including
- judging, based on the paper identification information acquired at the code acquiring, types of the paper identification information,
- acquiring, according to the types, the second service information for specifying the paper-information control unit that manages the paper information stored in the paper-information storing unit in association with the paper identification information,
- accessing the paper-information control unit using the second service information, and
- acquiring the paper information from the paper-information control unit;

electronic-document acquiring including
- acquiring, using the print source information included in the paper information acquired at the paper-information acquiring, the first service information for specifying the electronic-information control unit that manages the electronic information for specifying the print object electronic document from the service-information control unit of the server apparatus via the communication unit,
- accessing the electronic-information control unit using the first service information,
- acquiring the electronic information from the electronic-information control unit, and
- acquiring the electronic document specified by the electronic information; and printing including
- forming a print image using the electronic document acquired at the electronic-document acquiring, and
- printing the print image on a second paper medium.

10. The image processing method according to claim 9, wherein
the paper identification information of a first type among the types includes the second service information and second paper identification information for identifying the paper information, and
the paper-information acquiring includes
acquiring, when it is judged that a type of the paper identification information acquired at the code acquiring is the first type, the second service information included in the paper identification information,
accessing the paper-information control unit using the second service information, and
acquiring the paper information from the paper-information control unit using the second paper identification information.

11. The image processing method according to claim 9, wherein
the second service information includes second control identification information that ca identify the paper-information control unit,
the paper identification information of a second type among the types includes the second control identification information and second paper identification information for identifying the paper information, and
the paper-information acquiring includes
acquiring, when it is judged that a type of the paper identification information acquired at the code acquiring is the second type, the second service information for specifying the paper-information control unit identified by the second control identification information included in the paper identification information,
accessing the paper-information control unit using the second service information, and
acquiring the paper information from the paper-information control unit using the second paper identification information.

12. The image processing method according to claim 11, further comprising storing the second service information, wherein
the paper-information acquiring includes
judging whether the second service information for specifying the paper-information control unit identified by the second control identification information included in the paper identification information is stored at the storing,
accessing, when a result of the judgment is affirmative, the paper-information control unit using the second service information, and
acquiring the paper information from the paper-information control unit using the second paper identification information.

13. The image processing method according to claim 9, further comprising storing at least one of the second service information and third service information for specifying the service-information control unit, wherein
the second service information includes second control identification information for identifying the paper-information control unit and third control identification information for identifying the service-information control unit that directly manages the second service information,
the paper identification information of a third type among the types includes the third control identification information, the second control identification information, and second paper identification information for identifying the paper information, and
the paper-information acquiring includes
judging, when it is judged that a type of the paper identification information acquired at the code acquiring is the third type, whether the second service information for specifying the paper-information control unit identified by the second control identification information included in the paper identification information is stored at the storing,
accessing, when a result of the judgment is negative and when the third service information for specifying the service-information control unit identified by the third identification information included in the paper identification information is stored at the storing, the service-information control unit using the third service information via the communication unit, and acquiring the second service information from the service-information control unit using the second control identification information.

14. The image processing method according to claim 13, wherein the paper-information acquiring includes acquiring, when the second service information for specifying the paper-information control unit identified by the second control identification information included in the paper identification information is not stored at the storing, and when the second service information cannot be acquired from the service-information control unit, another piece of third service information for specifying another service-information control unit stored in the service-information storing unit from the service information control unit of the server apparatus via the communication unit, accessing the another service information control unit specified by the another piece of third service information via the communication unit, and acquiring the second service information from the another service-information control unit using the second control identification information.

15. The image processing method according to claim 9, wherein the paper identification information includes type information indicating the types, and the paper-information acquiring includes judging a type of the paper identification information using the type information included in the paper identification information acquired at the code acquiring, acquiring, according to the types, the second service information for specifying the paper-information control unit, which manages the paper information stored in the paper-information storing unit in association with the paper identification information, from the service-information control unit via the communication unit, accesses the paper-information control unit using the second service information, and acquiring the paper information from the paper-information control unit.

16. The image processing method according to claim 13, further comprising:

paper-information storing including storing the paper information;

creating new paper information including, as the print source information, second paper identification information for identifying the paper information corresponding to the first paper medium; and issuing new second paper identification information to the new paper information, wherein the printing unit includes identification-information acquiring including acquiring the new second paper identification information issued at the issuing and second control identification information for identifying the paper-information control unit, type determining including determining a type of the paper identification information created as information for specifying the paper information, paper-identification-information creating including creating the paper identification information of the type determined at the type determining using the new second identification information and the second control identification information acquired at the identification-information acquiring, code-image creating including creating a code image created by encoding the paper identification information created at the paper-identification-information creating, and image processing including creating a print image using an electronic document acquired at the electronic-document acquiring, and printing the code image created at the code-image creating on the second paper medium together with the print image.

17. A computer program product comprising a computer-usable medium having computer-readable program codes embodied in the medium that when executed cause a computer to execute:

reading including acquiring an image read by scanning a first paper medium with a scanning unit;

code acquiring including extracting a predetermined code image from the image acquired at the reading, decoding the code image, and acquiring paper identification information for identifying the first paper medium;

performing data communication using a communication unit with a server apparatus that includes a service-information storing unit and a service-information control unit, the service-information storing unit storing first service information for specifying an electronic-information control unit that manages electronic information for specifying a print object electronic document stored in an electronic-document storing unit, the electronic information being stored in an electronic-information storing unit in association with electronic identification information for identifying the electronic information, and second service information for specifying a paper-information control unit that manages paper information including print source information for specifying a print source of the first paper medium and stored in a paper-information storing unit in association with paper identification information for identifying a print object paper medium, the service-information control unit managing the first service information and the second service information;

paper-information acquiring including judging, based on the paper identification information acquired at the code acquiring, types of the paper identification information, acquiring, according to the types, the second service information for specifying the paper-information control unit that manages the paper information stored in the paper-information storing unit in association with the paper identification information, accessing the paper-information control unit using the second service information, and acquiring the paper information from the paper-information control unit;

electronic-document acquiring including acquiring, using the print source information included in the paper information acquired at the paper-information acquiring, the first service information for specifying the electronic-information control unit that manages the electronic information for specifying the print object electronic document from the service-information control unit of the server apparatus via the communication unit, accessing the electronic-information control unit using the first service information,
acquiring the electronic information from the electronic-information control unit, and
acquiring the electronic document specified by the electronic information; and printing including
  forming a print image using the electronic document acquired at the electronic-document acquiring, and
  printing the print image on a second paper medium.

* * * * *